US010305630B2

(12) United States Patent
Sudo et al.

(10) Patent No.: US 10,305,630 B2
(45) Date of Patent: May 28, 2019

(54) BASE STATION, CONTROLLER, COMMUNICATION SYSTEM, AND INTERFERENCE AVOIDANCE METHOD

(71) Applicant: PANASONIC CORPORATION, Osaka (JP)

(72) Inventors: Hiroaki Sudo, Kanagawa (JP); Mitsuru Uesugi, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 138 days.

(21) Appl. No.: 15/332,351

(22) Filed: Oct. 24, 2016

(65) Prior Publication Data
US 2017/0127425 A1    May 4, 2017

(30) Foreign Application Priority Data

| Oct. 30, 2015 | (JP) | 2015-214915 |
| Nov. 9, 2015  | (JP) | 2015-219645 |
| Feb. 23, 2016 | (JP) | 2016-032416 |

(51) Int. Cl.
| H04L 1/00  | (2006.01) |
| H04L 1/18  | (2006.01) |
| H04L 5/00  | (2006.01) |
| H04W 88/08 | (2009.01) |

(52) U.S. Cl.
CPC .......... *H04L 1/0056* (2013.01); *H04L 1/1893* (2013.01); *H04L 5/006* (2013.01); *H04L 5/0044* (2013.01); *H04L 1/0066* (2013.01); *H04L 5/0023* (2013.01); *H04W 88/08* (2013.01)

(58) Field of Classification Search
None
See application file for complete search history.

(56) References Cited

U.S. PATENT DOCUMENTS

| 7,529,315 B2     | 5/2009 | Sudo |              |
| 2006/0160498 A1* | 7/2006 | Sudo | ... H03M 13/37 |
|                  |        |      | 455/103       |

(Continued)

FOREIGN PATENT DOCUMENTS

| JP | 2004-187257 | 7/2004 |
| WO | 2010/070898 | 6/2010 |

*Primary Examiner* — Nicholas Sloms
(74) *Attorney, Agent, or Firm* — Greenblum & Bernstein, P.L.C.

(57) ABSTRACT

An object is to suppress a decrease in communication quality and improve the communication quality even when interference is present in some of a frequency band in use in a case where a turbo coding scheme is combined with multicarrier communication using some of a frequency band shared with another system. A frequency selector (107) selects a band not used by another system, based on a measurement value of a reception level, then selects a subband for systematic-bit mapping from among subbands having a measurement value of the reception level lower than a threshold, and selects a subband for parity-bit mapping from among subbands other than the subband for systematic-bit mapping, for each subband (carrier frequency) of the selected band. A carrier-mapper (110) maps a systematic bit and parity bit to each subband based on the result of selection by the frequency selector (107).

3 Claims, 42 Drawing Sheets

(56) References Cited

U.S. PATENT DOCUMENTS

2010/0210213 A1\* 8/2010 Pawar ................... H04L 5/0044
    455/62
2011/0249569 A1\* 10/2011 Mashino .............. H04J 11/0023
    11/23
2012/0114049 A1\* 5/2012 Hannuksela .......... H04L 1/0041
    375/240.27

\* cited by examiner

FIG. 5A

| Ack/Nack | MSC INFORMATION | MIMO RELATION INFORMATION | OTHER CONTROL INFORMATION |

FIG. 5B

| Ack/Nack | MSC INFORMATION | MIMO RELATION INFORMATION | OTHER CONTROL INFORMATION | BAND-DIVISION-COUNT INFORMATION | SIGNAL-TYPE INFORMATION |

K1 — BAND-DIVISION-COUNT INFORMATION
K2 — SIGNAL-TYPE INFORMATION

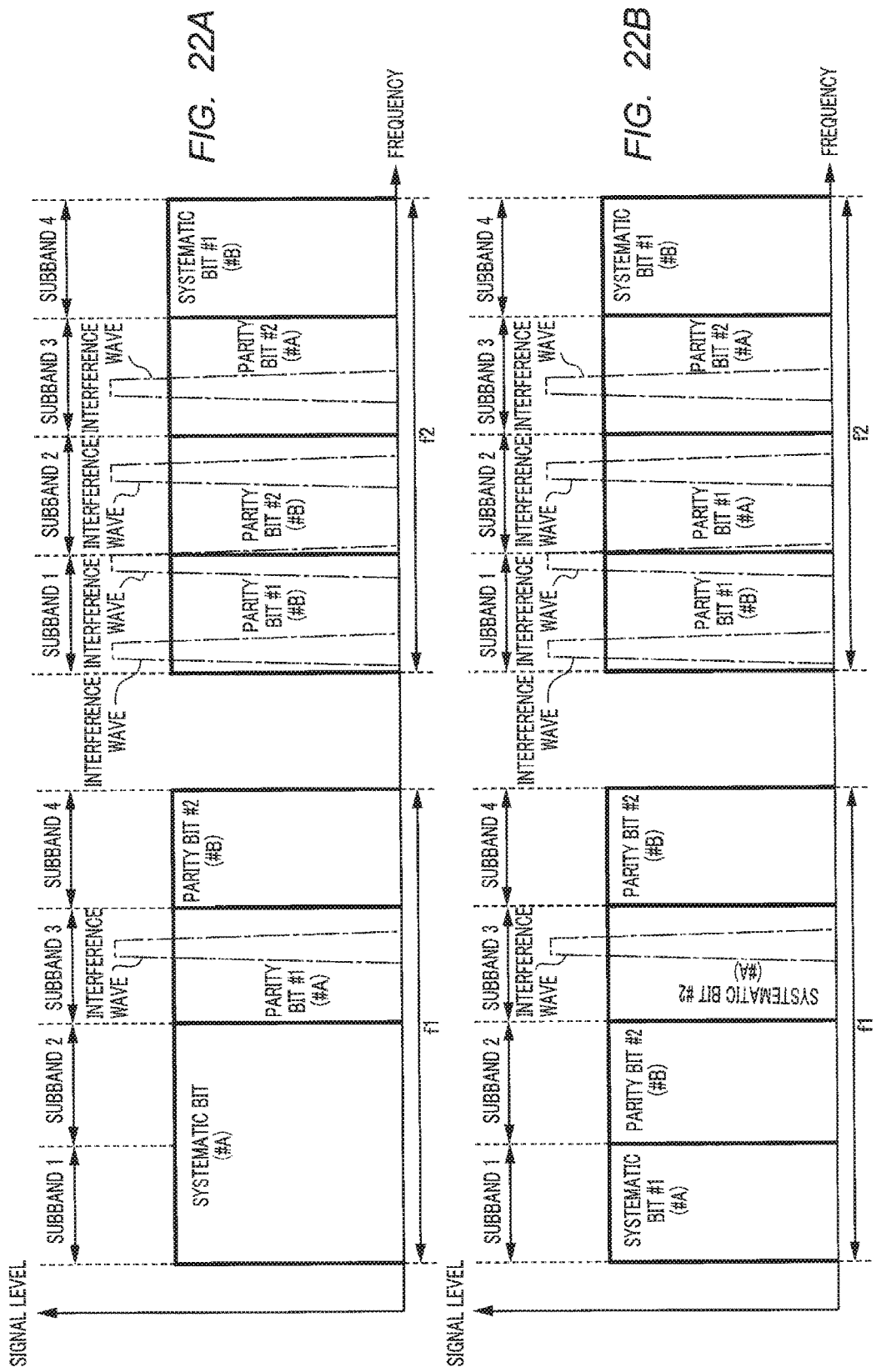

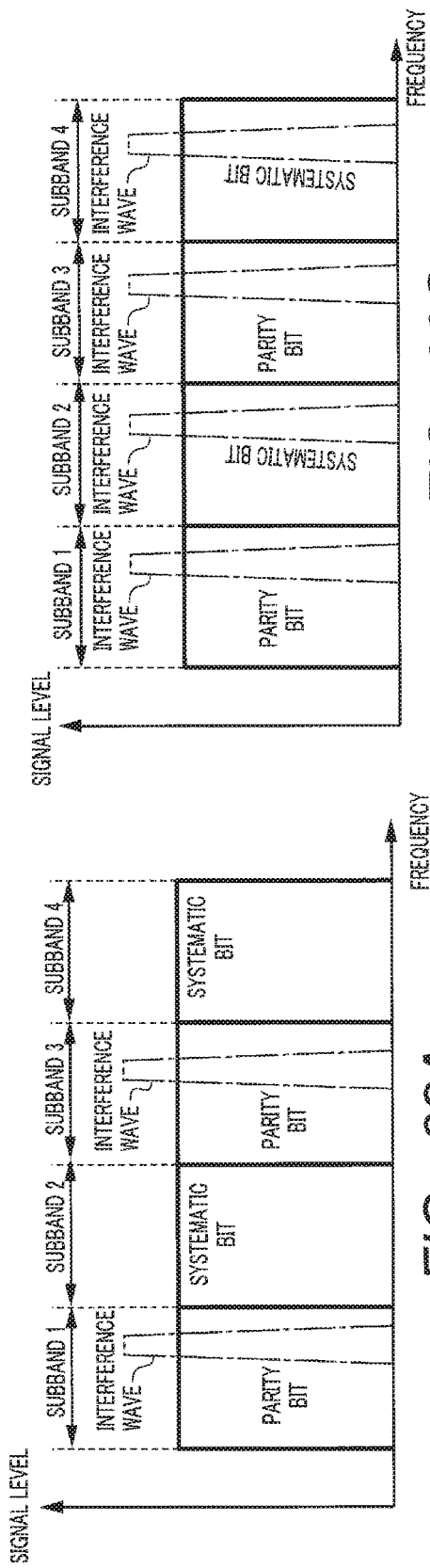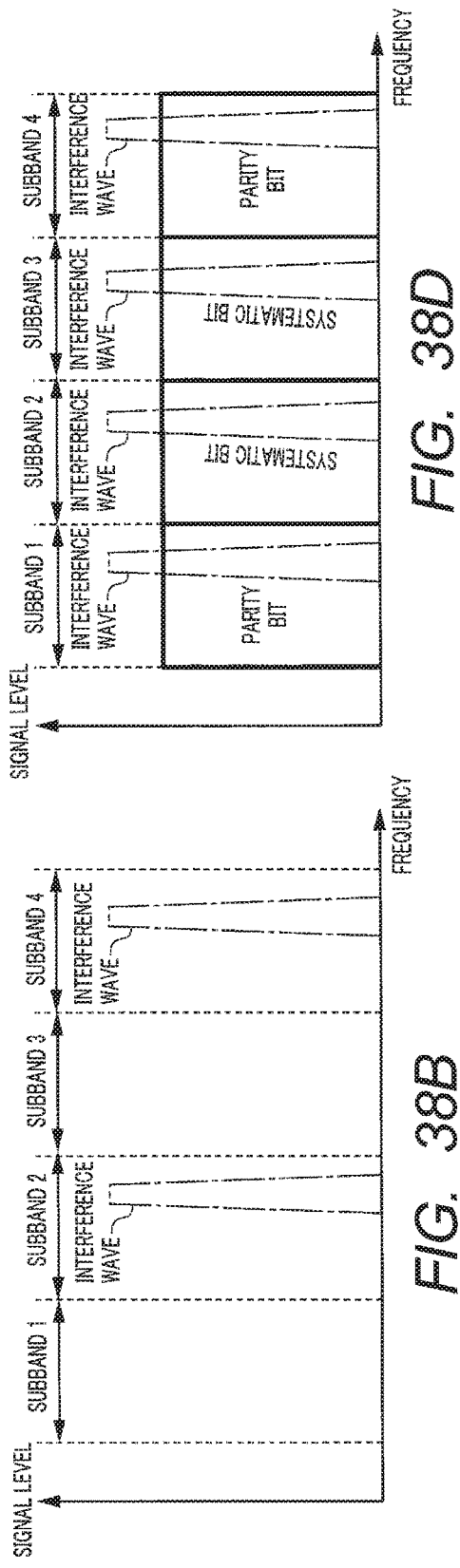

BASE STATION, CONTROLLER, COMMUNICATION SYSTEM, AND INTERFERENCE AVOIDANCE METHOD

CROSS REFERENCE TO RELATED APPLICATIONS

This application is entitled to and claims benefits from Japanese Patent Application No. 2015-214915, filed on Oct. 30, 2015, Japanese Patent Application No. 2015-219645, filed on Nov. 9, 2015, and Japanese Patent Application No. 2016-032416, filed on Feb. 23, 2016. The contents of the specifications and drawings of these applications are incorporated herein by reference in their entirety.

TECHNICAL FIELD

The present invention relates to a base station performing multicarrier communication using some carrier frequencies of a frequency band shared with another system, and also relates to a controller, a communication system, and an interference avoidance method.

BACKGROUND ART

Heretofore, field pick-up units (FPUs) have been known as an apparatus used in a radio communication system performing video transmission such as live broadcasting or emergency broadcasting of television. This FPU is used for material transmission in the broadcasting sector and performs radio communication using some of a frequency band shared with another system such as a transceiver. For this reason, it is necessary to always monitor the presence or absence of interference in the frequency band in use and to prevent interference with another system in FPUs. An FPU base station measures a reception level (interference amount), and when the reception level exceeds a predetermined threshold, the base station determines that another system has started using the frequency band (interference has occurred) and stops using the frequency band.

Meanwhile, a communication system has been known in which a turbo coding scheme and an orthogonal frequency division multiplexing (OFDM) communication scheme are combined and a multicarrier transmission apparatus maps systematic bits and parity bits to different subcarriers (see Patent Literature (hereinafter, referred to as "PTL") 1).

CITATION LIST

Patent Literature

PTL 1
Japanese Patent Application Laid-open No. 2004-187257

SUMMARY OF INVENTION

Technical Problem

However, no disclosure has been made on any technique that combines turbo coding with the multicarrier communication using some of the frequency band shared with another system as in FPUs.

The present invention aims to provide a base station, a controller, a communication system, and an interference avoidance method each making it possible to suppress degradation of communication quality and thus to improve the communication quality even when interference is present in some of the frequency band in use in a case where a turbo coding scheme is combined with multicarrier communication using some of a frequency band shared with another system.

Solution to Problem

A base station according to an aspect of the present invention is a base station that transmits an OFDM signal to a mobile station, using some carrier frequencies of a frequency band shared with another system, the base station including: a frequency selector that selects an unused frequency band not used by the other system in the frequency band, based on an interference level of the frequency band, selects a carrier frequency for systematic-bit mapping from among carrier frequencies each having the interference level lower than a threshold and selects a carrier frequency for parity-bit mapping from among carrier frequencies other than the carrier frequency for systematic-bit mapping in carrier frequencies of the unused frequency band; a turbo coder that performs turbo coding processing on transmission data and outputs a systematic bit and a parity bit; a carrier-mapper that maps the systematic bit to the carrier frequency for systematic-bit mapping and maps the parity bit to the carrier frequency for parity-bit mapping; a control-signal generator that generates a control signal containing frequency information indicating the carrier frequency for systematic-bit mapping and the carrier frequency for parity-bit mapping; an orthogonal frequency division multiplexer that generates the OFDM signal by performing orthogonal frequency division multiplexing processing on the systematic bit and the parity bit mapped to the carrier frequencies, and the control signal; and a transmitter that transmits the OFDM signal to the mobile station.

A controller according to an aspect of the present invention is a controller that controls a plurality of base stations each configured to communicate with a mobile station, using some carrier frequencies of a frequency band shared with another system, the controller including: a receiver that receives first frequency information from a first base station in communication with the mobile station and second frequency information from a second base station, the first frequency information indicating a carrier frequency having an interference level lower than a threshold in an unused frequency band, a carrier frequency to which a systematic bit is mapped, and a carrier frequency to which a parity bit is mapped, the second frequency information indicating a carrier frequency having an interference level lower than the threshold in carrier frequencies of an unused frequency band, the second base station being a handover destination; a frequency selector that selects a carrier frequency for systematic-bit mapping and a carrier frequency for parity-bit mapping based on the first frequency information and the second frequency information; a signal-assignment-information generator that generates signal assignment information indicating the carrier frequency for systematic-bit mapping and the carrier frequency for parity-bit mapping; and a transmitter that transmits the signal assignment information to the first and the second base stations.

A communication system according to an aspect of the present invention is a communication system that transmits an OFDM signal from a mobile station to a base station, using some carrier frequencies of a frequency band shared with another system, in which the base station includes: a frequency selector that selects an unused frequency band not used by the other system in the frequency band, based on an interference level of the frequency band, selects a carrier frequency for systematic-bit mapping from among carrier frequencies each having the interference level lower than a threshold and selects a carrier frequency for parity-bit mapping from among carrier frequencies other than the carrier frequency for systematic-bit mapping in carrier frequencies of the unused frequency band-a control-signal generator that generates a control signal containing frequency information indicating the carrier frequency for systematic-bit mapping and the carrier frequency for parity-bit mapping; and a transmitter that transmits the control signal to the mobile station, and the mobile station includes: a receiver that receives the control signal; a turbo coder that performs turbo coding processing on transmission data and outputs a systematic bit and a parity bit; a carrier-mapper that maps the systematic bit to the carrier frequency for systematic-bit mapping and maps the parity bit to the carrier frequency for parity-bit mapping based on the frequency information contained in the control signal; an orthogonal frequency division multiplexer that generates the OFDM signal by performing orthogonal frequency division multiplexing processing on the systematic bit and the parity bit mapped to the carrier frequencies; and a transmitter that transmits the OFDM signal to the base station.

An interference avoidance method according to an aspect of the present invention is a method in a base station that transmits an OFDM signal to a mobile station, using some carrier frequencies of a frequency band shared with another system, the method includes: selecting an unused frequency band not used by the other system in the frequency band, based on an interference level of the frequency band, selecting a carrier frequency for systematic-bit mapping from among carrier frequencies having the interference level lower than a threshold and selecting a carrier frequency for parity-bit mapping from among carrier frequencies other than the carrier frequency for systematic-bit mapping in carrier frequencies of the unused frequency band; performing turbo coding processing on transmission data and outputting a systematic bit and a parity bit; mapping the systematic bit to the carrier frequency for systematic-bit mapping and mapping the parity bit to the carrier frequency for parity-bit mapping; generating a control signal containing frequency information indicating the carrier frequency for systematic-bit mapping and the carrier frequency for parity-bit mapping; generating the OFDM signal by performing orthogonal frequency division multiplexing processing on the systematic bit and the parity bit mapped to the carrier frequencies, and the control signal; and transmitting the OFDM signal to the mobile station.

Advantageous Effects of Invention

According to the present invention, it is made possible to suppress degradation of communication quality and thus to improve the communication quality even when interference is present in some of a frequency band in use in a case where a turbo coding scheme is combined with multicarrier communication using some of a frequency band shared with another system.

BRIEF DESCRIPTION OF DRAWINGS

FIGS. 5A and 5B are diagrams each illustrating a control signal format according to Embodiment 1 of the present invention;

FIGS. 22A and 22B illustrate a specific example of the carrier mapping according to Embodiment 7 of the present invention;

FIGS. 38A, 38B, 38C, and 38D illustrate a specific example of subband assignment according to Embodiment 10 of the present invention;

DESCRIPTION OF EMBODIMENTS

Figure 1:
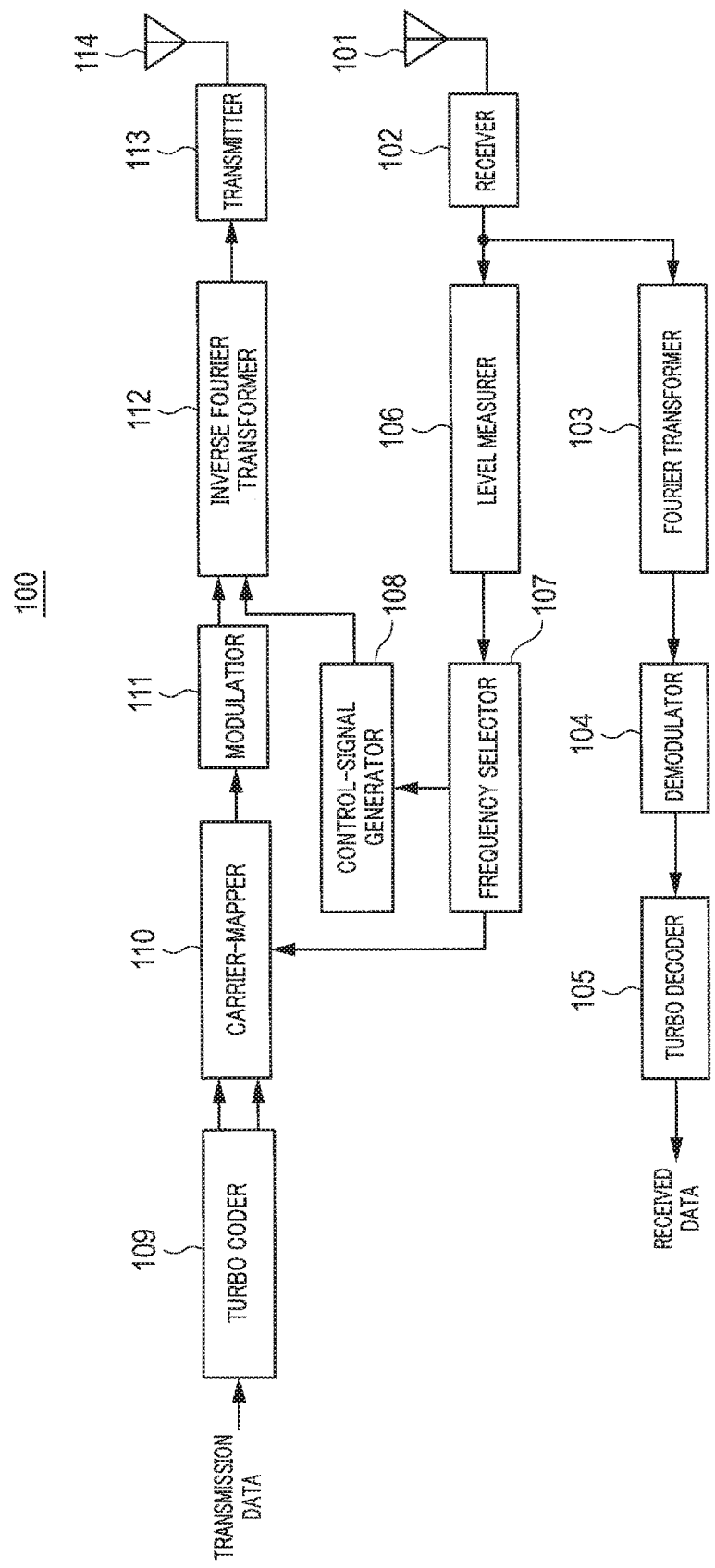
FIG. 1 is a block diagram illustrating a configuration of a base station according to Embodiment 1 of the present invention.

Hereinafter, a detailed description will be given of embodiments of the present invention with reference to the accompanying drawings as appropriate.

Embodiment 1

[Configuration of Base Station]

Hereinafter, a detailed description will be given of a configuration of base station 100 according to Embodiment 1 of the present invention with reference to FIG. 1. Base station 100 is an OFDM transmission apparatus that transmits an OFDM signal to mobile station 200 (see FIG. 2) using some subbands of a frequency band shared with another system.

Base station 100 includes antenna 101, receiver 102, Fourier transformer 103, demodulator 104, turbo decoder 105, level measurer 106, frequency selector 107, control-signal generator 108, turbo coder 109, carrier-mapper 110, modulator 111, inverse Fourier transformer 112, transmitter 113, and antenna 114.

Receiver 102 receives a signal via antenna 101, performs radio reception processing such as amplification, filtering, and/or down-conversion on the received signal, and outputs the received signal after the radio reception processing to Fourier transformer 103 and level measurer 106.

Fourier transformer 103 performs Fourier transform processing on the received signal outputted from receiver 102 and outputs the resultant signal to demodulator 104.

Demodulator 104 demodulates the signal outputted from Fourier transformer 103 to acquire demodulated data (parity bits and systematic bits) and outputs the bits to turbo decoder 105.

Turbo decoder 105 performs turbo decoding processing using the parity bits and systematic bits outputted from demodulator 104 to acquire the received data.

Level measurer 106 measures the reception level of the received signal outputted from receiver 102 and outputs the measurement value to frequency selector 107.

Frequency selector 107 selects a band not used by another system based on the measurement level of the reception level inputted from level measurer 106. The band to be selected herein is a frequency band shared with another system and is an unused frequency band not used by the other system. Frequency selector 107 compares the measurement value of the reception level inputted from level measurer 106 with a predetermined threshold to find out their magnitude relationship for each subband (carrier frequency) of the selected band and selects a subband for mapping systematic bits (systematic-bit mapping subband) from among subbands each having a measurement value lower than the threshold. Moreover, frequency selector 107 selects a subband for mapping parity bits (parity-bit mapping subband) from among subbands other than the systematic-bit mapping subband. Frequency selector 107 outputs the frequency information indicating the selected band, the systematic-bit mapping subband, and the parity-bit mapping subband to control-signal generator 108 and carrier-mapper 110.

Control-signal generator 108 generates a control signal containing the frequency information inputted from frequency selector 107 and outputs the control signal to inverse Fourier transformer 112.

Turbo coder 109 performs turbo coding processing on transmission data to generate parity bits and systematic bits and outputs the bits to carrier-mapper 110.

Carrier-mapper 110 maps the systematic bits and parity bits to the subbands based on the frequency information inputted from frequency selector 107 and outputs the bits to modulator 111.

Modulator 111 modulates the systematic bits and parity bits outputted from carrier-mapper 110 and outputs the modulation signal to inverse Fourier transformer 112.

Inverse Fourier transformer 112, which is an orthogonal frequency division multiplexer, performs inverse Fourier transform processing, which is orthogonal frequency division multiplexing processing, on the control signal outputted from control-signal generator 108 and the modulation signal outputted from modulator 111 to generate an OFDM signal and outputs the OFDM signal to transmitter 113.

Transmitter 113 performs radio transmission processing such as amplification, filtering, and/or up-conversion on the OFDM signal outputted from inverse Fourier transformer 112 and transmits the resultant signal via antenna 114.

[Configuration of Mobile Station]

Hereinafter, a detailed description will be given of a configuration of mobile station 200 according to Embodiment 1 with reference to FIG. 2.

Mobile station 200 includes antenna 201, receiver 202, Fourier transformer 203, demodulator 204, turbo decoder 205, control-signal extractor 206, turbo coder 207, carrier-mapper 208, modulator 209, inverse Fourier transformer 210, transmitter 211, and antenna 212.

Receiver 202 receives a signal via antenna 201, then performs radio reception processing such as amplification, filtering, and/or down-conversion on the received signal, and outputs the received signal after the radio reception processing to Fourier transformer 203.

Fourier transformer 203 performs Fourier transform processing on the received signal outputted from receiver 202 and outputs the resultant signal to demodulator 204.

Demodulator 204 demodulates the signal outputted from Fourier transformer 203 to acquire a control signal and demodulated data (parity bits and systematic bits). Demodulator 204 outputs the parity bits and systematic bits to turbo decoder 205 and outputs the control signal to control-signal extractor 206.

Turbo decoder 205 performs turbo decoding processing using the parity bits and systematic bits outputted from demodulator 204 to acquire the received data.

Control-signal extractor 206 extracts the frequency information contained in the control signal outputted from demodulator 204 and outputs the frequency information to carrier-mapper 208.

Turbo coder 207 performs turbo coding processing on the transmission data to generate parity bits and systematic bits and outputs the bits to carrier-mapper 208.

Carrier-mapper 208 maps the systematic bits and parity bits to the subbands based on the frequency information inputted from control-signal extractor 206 and outputs the bits to modulator 209.

Modulator 209 modulates the systematic bits and parity bits outputted from carrier-mapper 208 and outputs the modulated signal to inverse Fourier transformer 210.

Inverse Fourier transformer 210 performs inverse Fourier transform processing on the modulated signal outputted from modulator 209 to generate an OFDM signal and outputs the OFDM signal to transmitter 211.

Transmitter 211 performs radio transmission processing such as amplification, filtering, and/or up-conversion on the OFDM signal outputted from inverse Fourier transformer 210 and outputs the resultant signal via antenna 212.

[Operation of Base Station]

Hereinafter, a detailed description will be given of an operation of base station 100 according to Embodiment 1 with reference to FIG. 3.

Level measurer 106 measures a reception level (interference level) of each of a plurality of subbands of each band. Frequency selector 107 selects a band not used by another system based on the measurement value of the reception level inputted from level measurer 106 (S1).

Next, frequency selector 107 determines whether the reception level is lower than a predetermined value for subband i ("i" is an integer from one to "n" ("n" is an integer equal to or greater than two)) of the selected band (S2).

Frequency selector 107 selects systematic bits for subband i (S3) when the reception level of subband i is lower than the predetermined value (S2: YES). Stated differently, subband i is selected as a systematic-bit mapping subband.

Meanwhile, frequency selector 107 selects parity bits for subband i (S4) when the reception level of subband i is equal to or greater than the predetermined value (S2: NO). Stated differently, subband i is selected as a parity-bit mapping subband.

Next, frequency selector 107 determines whether systematic bit selection has been completed (S5).

Frequency selector 107 returns the flow to S2 when systematic bit selection has not been completed (S5: NO).

Meanwhile, frequency selector 107 selects parity bits for subband i which has not been selected yet (S6) when systematic bit selection has been completed (S5: YES).

Next, carrier-mapper 110 determines whether systematic bits have been inputted from turbo coder 109 (S7).

When systematic bits have been inputted (S7: YES), carrier-mapper 110 maps the systematic bits to the subband selected for systematic-bit mapping (S8).

Meanwhile, when parity bits have been inputted (S7: NO), carrier-mapper 110 maps the parity bits to the subband selected for parity-bit mapping (S9).

Next, carrier-mapper 110 determines whether mapping to all subbands has been completed (S10).

When the mapping has not been completed (S10: NO), carrier-mapper 110 returns the flow to S7.

Meanwhile, when the mapping has been completed (S10: YES), carrier-mapper 110 advances the flow to S11.

Control-signal generator 108 generates a control signal containing frequency information (S11).

[Specific Example of Carrier Mapping]

Figure 4:
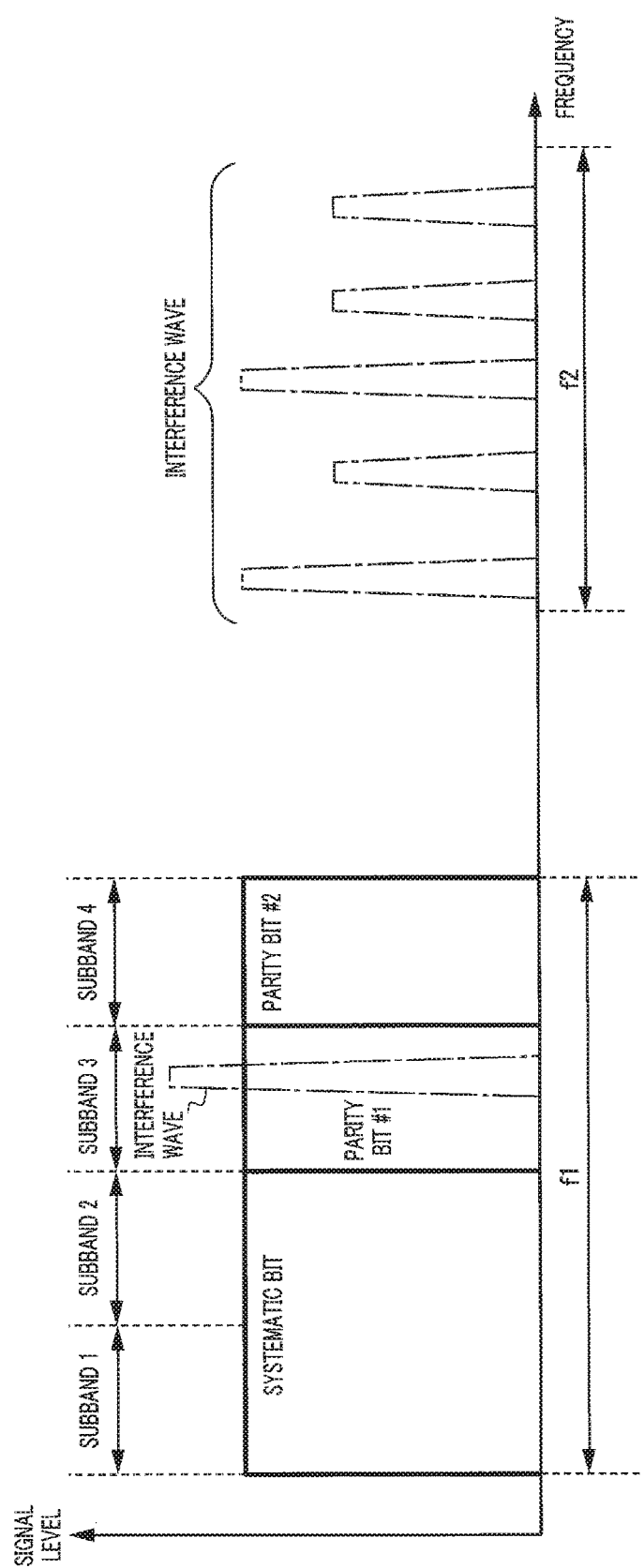
FIG. 4 illustrates a specific example of carrier mapping according to Embodiment 1 of the present invention.

Next, a description will be given of a specific example of carrier mapping in base station 100 according to Embodiment 1 with reference to FIG. 4. The example in FIG. 4 illustrates a case where bands f1 and f2 to which a transmission stream can be assigned are present and the total number, "n" subbands of each band is four.

Base station 100 selects band f1 having a small interference wave (not used by anther system) as a band for assigning a transmission stream.

Next, base station 100 performs the processing of S2 to S6 mentioned above in order of subbands 1 to 4 in sequence. As a result, base station 100 selects systematic bits for subbands 1 and 2, each having a reception level lower than a predetermined value, and small interference. Moreover, base station 100 selects parity bit #1 for subband 3 having a reception level equal to or greater than a predetermined value, and large interference. Moreover, base station 100 selects parity bit #2 for subband 4 which has not been selected yet.

Base station 100 maps systematic bits to subbands 1 and 2 by performing the processing of S7 to S10 in sequence and maps parity bits #1 and #2 to subbands 3 and 4, respectively.

Although the case has been described where the number of subbands to which systematic bits are mapped and the number of subbands to which parity bits are mapped are the same, the present invention is not limited to this case, and any number of subbands to which systematic bits or parity bits are mapped can be set.

[Configuration of Control Signal]

Next, a description will be given of a configuration of a control signal transmitted by base station 100 according to Embodiment 1 with reference to FIG. 5. The control signal is transmitted periodically, i.e., once in every n frames (where "n" is an integer equal to or greater than two, for example).

The control signal is generated in the format illustrated in FIG. 5A when there is no change in carrier mapping, but is generated in the format illustrated in FIG. 5B when there is a change in carrier mapping.

The control signals in the formats in FIGS. 5A and 5B both include Ack/Nack information, MSC information, MIMO relationship information, and other control information.

The control signal in the format in FIG. 5B further includes band-division-count information K1, which indicates the number of subbands into which a band is divided, and signal-type information K2, which indicates a signal type for every subband to indicate whether the signal to be mapped is systematic bits or parity bits. For example, band-division-count information K1 and signal-type information K2 are frequency information. For example, in the case of FIG. 4, band-division-count information K1 requires two bits since each band is divided into four subbands, while signal-type information K2 requires four bits resulting from multiplication of one bit indicating two signal types, by the number of subbands, which is four.

Note that, the case has been described where the control signal is transmitted periodically, i.e., once in n frames ("n" is an integer equal to or greater than two, for example), but the present invention is not limited to this, and the transmission frequency of the control signal can be optionally configured.

As described above, in Embodiment 1, when radio communication is performed with a combination of a turbo coding scheme and an OFDM communication scheme using some of a frequency band shared with another system, systematic bits are mapped to a subband having an interference level lower than a threshold and parity bits are mapped to a subband to which no systematic bits are mapped among subbands of a selected band.

Accordingly, when the frequency band to be used has interference, it is possible to suppress degradation in communication quality and improve the communication quality.

According to Embodiment 1, the control signal in the format illustrated in FIG. 5B is transmitted only when interference is detected. Thus, it is possible to suppress the throughput reduction associated with the transmission of the control signal.

Embodiment 2

In Embodiment 1, the case has been described where both base station 100 and mobile station 200 transmit data pieces (OFDM signals), respectively. In contrast to this, in Embodiment 2, a case will be described where a base station transmits no data but transmits only a control signal to a mobile station.

[Configuration of Base Station]

Figure 6:
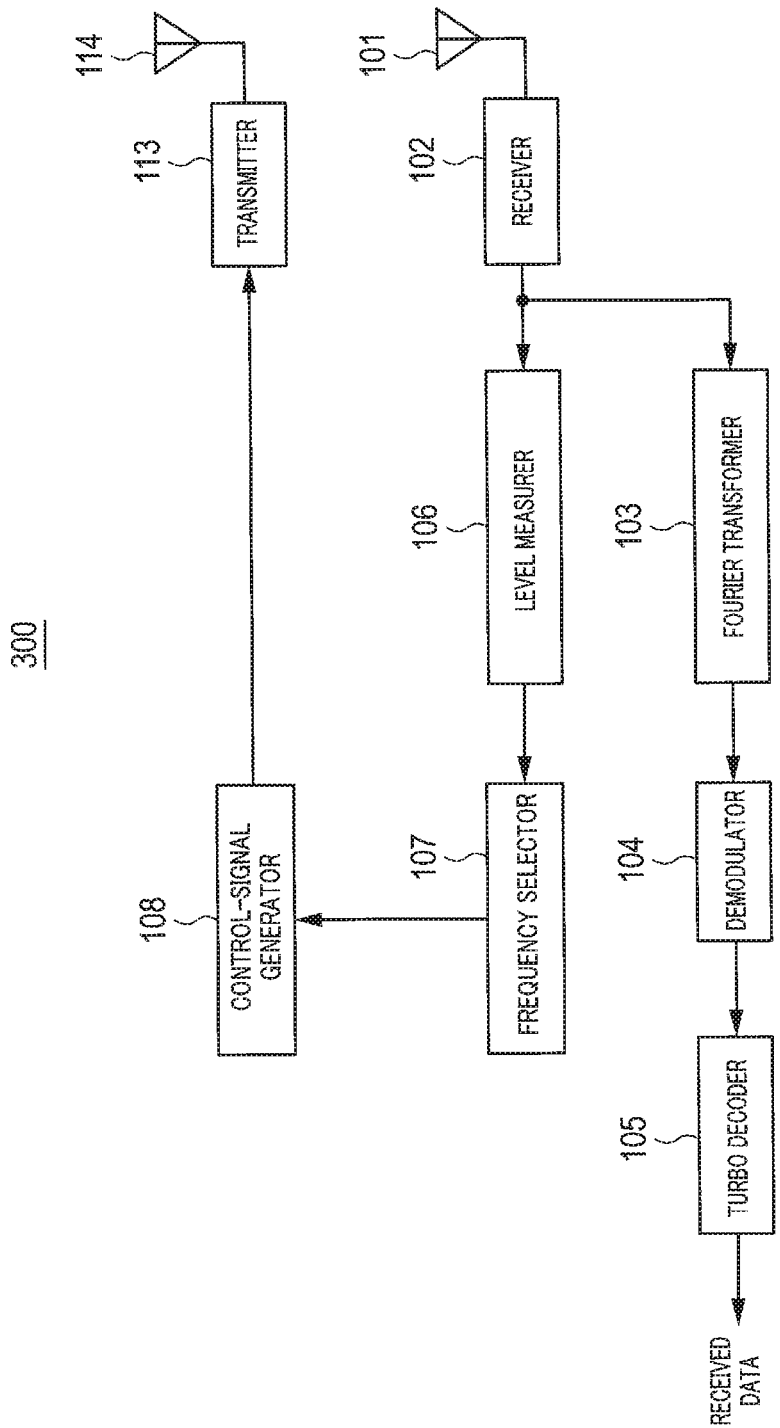
FIG. 6 is a block diagram illustrating a configuration of a base station according to Embodiment 2 of the present invention.

First of all, a configuration of base station 300 according to Embodiment 2 will be described hereinafter in detail with reference to FIG. 6. In FIG. 6, the configuration portions common to those illustrated in FIG. 1 are assigned the reference numerals identical to those in FIG. 1 and thus will not be described herein.

Base station 300 illustrated in FIG. 6 adopts a configuration obtained by removing turbo coder 109, carrier-mapper 110, modulator 111, and inverse Fourier transformer 112 from the configuration of base station 100 illustrated in FIG. 1.

Control-signal generator 108 generates a control signal containing frequency information and outputs the control signal to transmitter 113.

Transmitter 113 performs radio transmission processing such as amplification, filtering, and/or up-conversion on the control signal outputted from control-signal generator 108.

[Configuration of Mobile Station]

Figure 7:
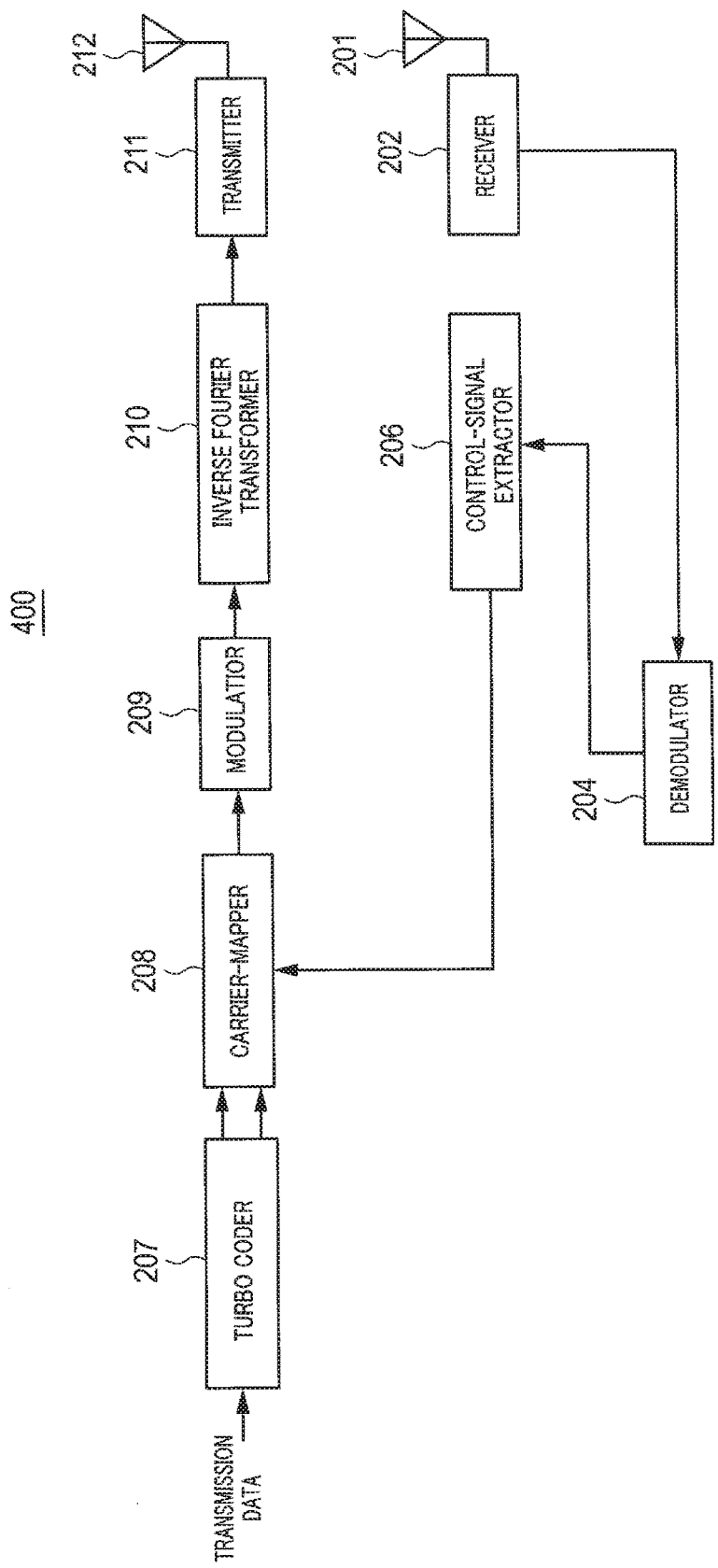
FIG. 7 is a diagram illustrating a configuration of a mobile station according to Embodiment 2 of the present invention.

Next, a detailed description will be hereinafter given of a configuration of mobile station 400 according to Embodiment 2 with reference to FIG. 7. In FIG. 7, the configuration portions common to those illustrated in FIG. 2 are assigned the reference numerals identical to those in FIG. 2 and thus will not be described herein.

Figure 2:
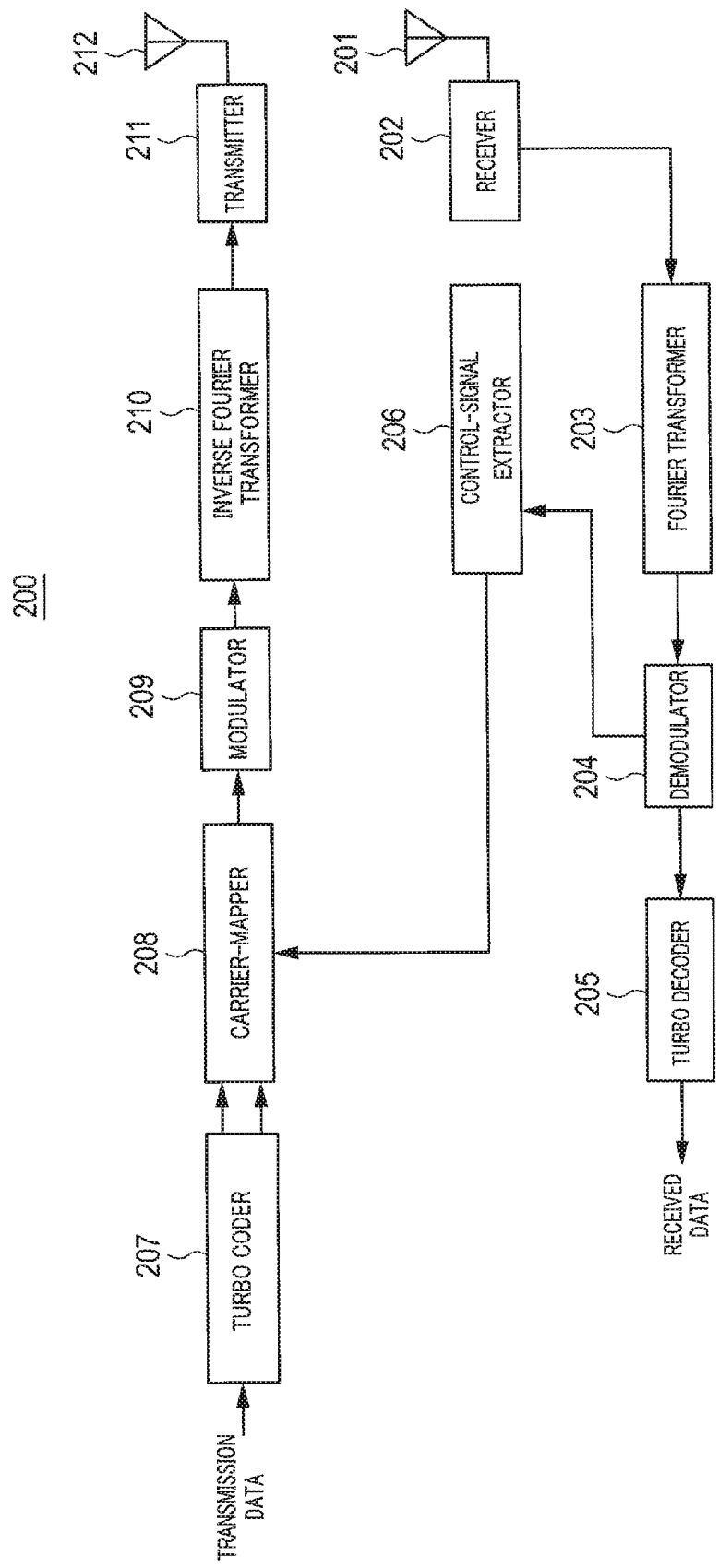
FIG. 2 is a block diagram illustrating a configuration of a mobile station according to Embodiment 1 of the present invention.

Mobile station 400 illustrated in FIG. 7 adopts a configuration obtained by removing Fourier transformer 203 and turbo decoder 205 from the configuration of mobile station 200 illustrated in FIG. 2.

Receiver 202 outputs a received signal after performing radio reception processing on the signal and outputs the received signal to demodulator 204.

Demodulator 204 acquires a control signal by demodulating the signal outputted from receiver 202 and outputs the control signal to control-signal extractor 206.

[Operation of Base Station]

Figure 3:
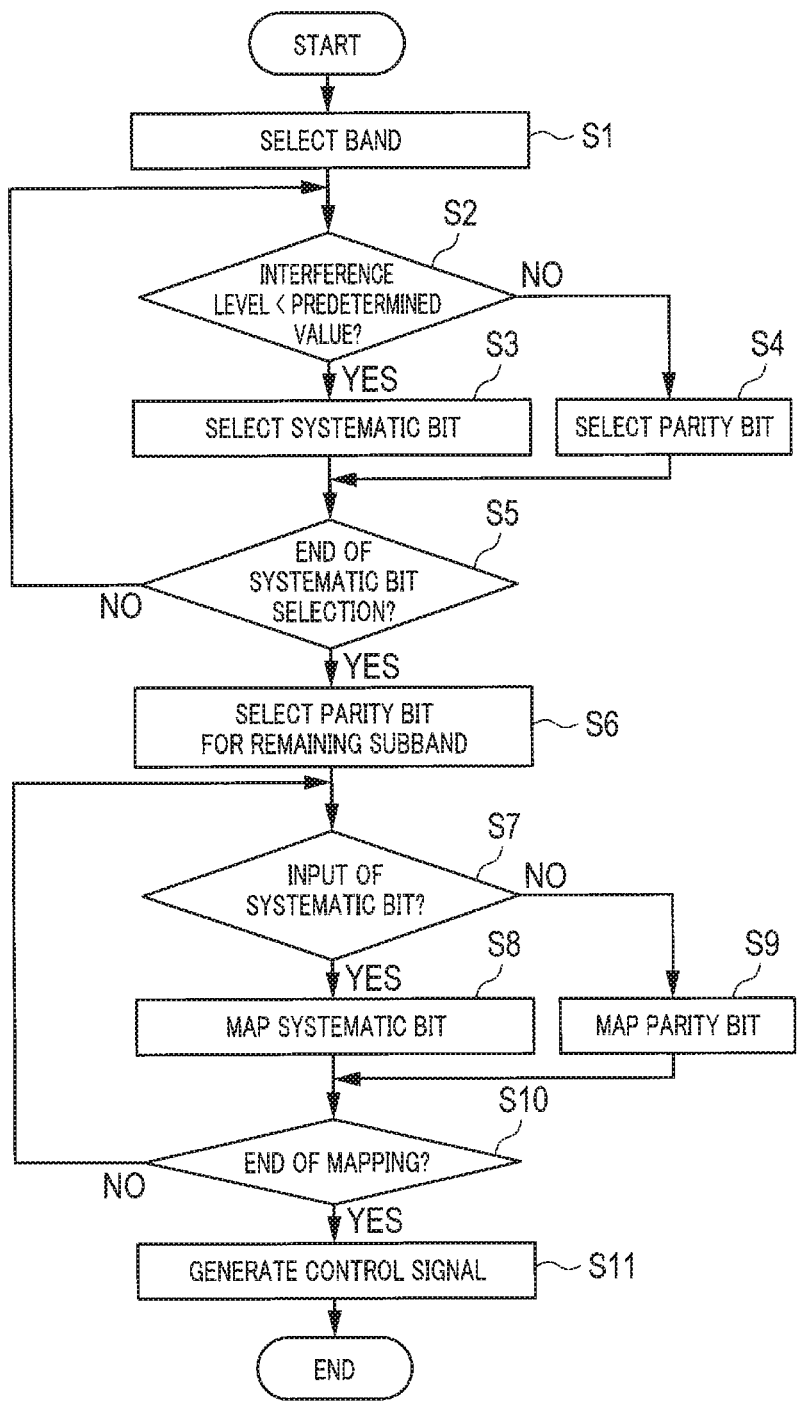
FIG. 3 is a flowchart illustrating an operation of the base station according to Embodiment 1 of the present invention.

The operation of base station 300 according to Embodiment 2 will be the operation obtained by removing steps S7 to S10 from FIG. 3.

As described above, in Embodiment 2, effects similar to those obtained in Embodiment 1 can be obtained.

Embodiment 3

Next, Embodiment 3 of the present invention will be described. The configurations of a base station and mobile station according to Embodiment 3 are identical to those illustrated in FIGS. 1 and 2 and thus will not be described herein.

[Operation of Base Station]

Figure 8:
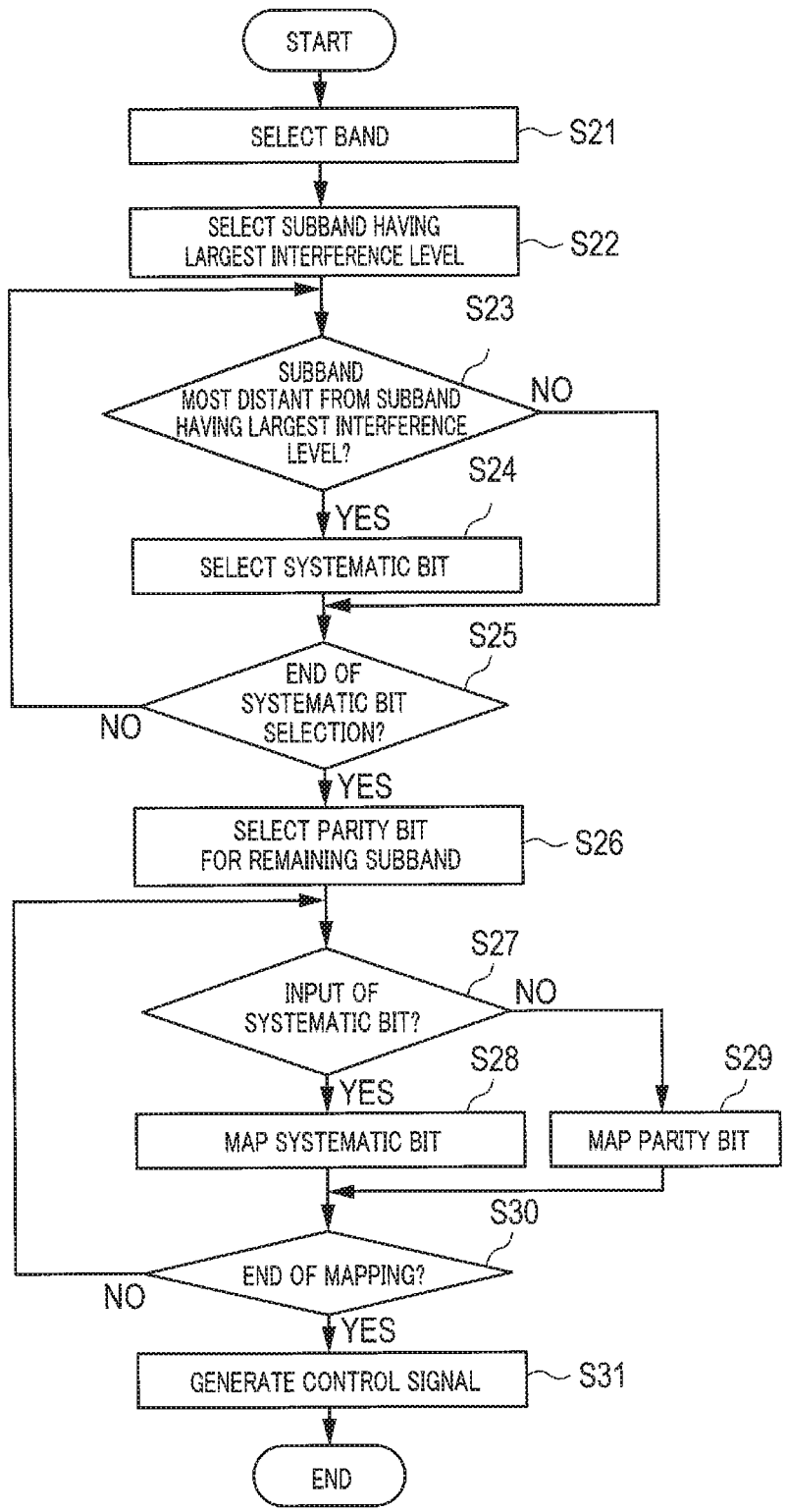
FIG. 8 is a flowchart illustrating an operation of a base station according to Embodiment 3 of the present invention.

Hereinafter, an operation of base station 100 according to Embodiment 3 will be described in detail with reference to FIG. 8.

Level measurer 106 measures the reception level (interference level) for each of a plurality of subbands of each band. Frequency selector 107 selects a band not used by another system based on the measurement value of the reception level inputted from level measurer 106 (S21).

Next, frequency selector 107 selects a subband having the highest reception level for subband i of the selected band (S22).

Next, frequency selector 107 determines, for subband i for which no systematic bits have been selected yet, whether the subband is most distant from the subband having the highest reception level (subband having the largest interference) (S23).

When the subband is one that is most distant from the subband having the highest reception level (323: YES), frequency selector 107 selects systematic bits for the most distant subband (S24).

Frequency selector 107 skips the processing of S24 when the subband is not most distant from the subband having the highest reception level (S23: NO).

Next, frequency selector 107 determines whether selection of systematic bits has been completed (S25).

When selection of systematic bits has not been completed (S25: NO), frequency selector 107 returns the flow to S23.

Meanwhile, when selection of systematic bits has been completed (S25: YES), frequency selector 107 selects parity bits for the remaining subband (S26).

Next, carrier-mapper 110 determines whether systematic bits have been inputted from turbo coder 109 (S27).

When systematic bits have been inputted (S27: YES), carrier-mapper 110 maps systematic bits to a subband selected for systematic-bit mapping (S28).

Meanwhile, when parity bits have been inputted (S27: NO), carrier-mapper 110 maps parity bits to the subband selected for parity-bit mapping (S29).

Next, carrier-mapper 110 determines whether mapping for all subbands have been completed (S30).

When the mapping has not been completed (S30: NO), carrier-mapper 110 returns the flow to S27.

Meanwhile, when the mapping has been completed (S30: YES), carrier-mapper 110 advances the flow to S31.

Control-signal generator 108 generates a control signal containing frequency information (S31).

[Specific Example of Carrier Mapping]

Figure 9:
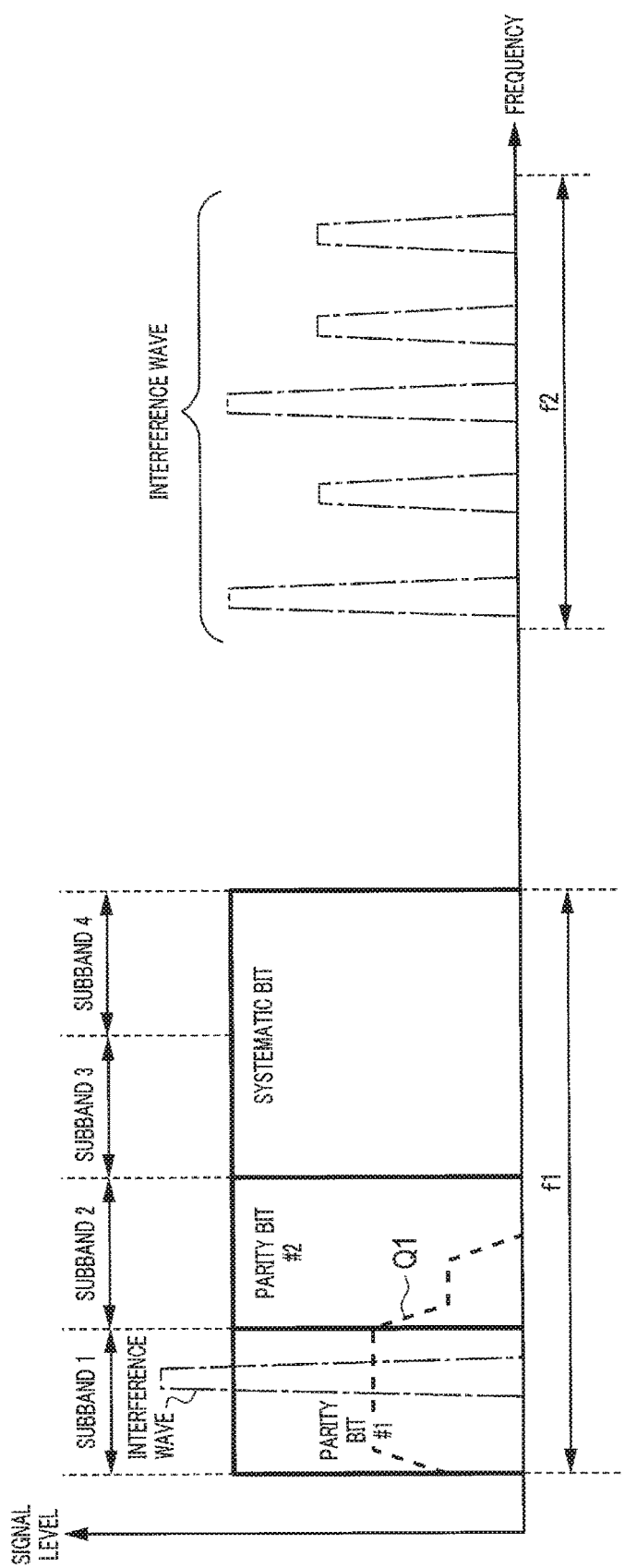
FIG. 9 is a specific example of carrier mapping according to Embodiment 3 of the present invention.

Next, a specific example of carrier mapping in base station 100 according to Embodiment 3 will be described with reference to FIG. 9. The example in FIG. 9 illustrates a case where bands f1 and f2 to which a transmission stream can be assigned are present and the total number, "n" subbands of each band is four. Moreover, Q1 in FIG. 9 indicates a component that leaks from the interference wave present in subband 1. Component Q1 has an impact on subband 2, which is adjacent to subband 1.

First, base station 100 selects band f1 having a small interference wave (not used by another system) as a band for assigning a transmission stream.

Next, base station 100 selects subband f1 having the highest reception level (interference level) among subbands of band f1. Base station 100 selects systematic bits for subbands 3 and 4 distant from subband 1 by the processing of S22 to S26. Base station 100 selects parity bit #1 for subband 1 and selects parity bit #2 for subband 2.

Base station 100 maps systematic bits to subbands 3 and 4 by performing the processing of S27 to S30 in sequence and maps parity bit #1 to subband 1 and maps parity bit #2 to subband 2.

As described above, according to Embodiment 3, in addition to the effects obtained in Embodiment 1, it is made possible to surely prevent interference to systematic bits by mapping systematic bits to a subband as distant from the subband having an interference wave as possible even when out-of-band leakage from the interference wave is present.

Embodiment 4

Next, a description will be given of Embodiment 4 of the present invention. In Embodiment 4, a case where multiple streams are transmitted will be described. The configurations of a base station and mobile station according to Embodiment 4 are identical to those illustrated in FIGS. 1 and 2 and thus will not be described herein. Moreover, the operation of the base station according to Embodiment 4 is identical to that in FIG. 3 and will not be described herein.

[Specific Example of Carrier Mapping]

Figure 10:
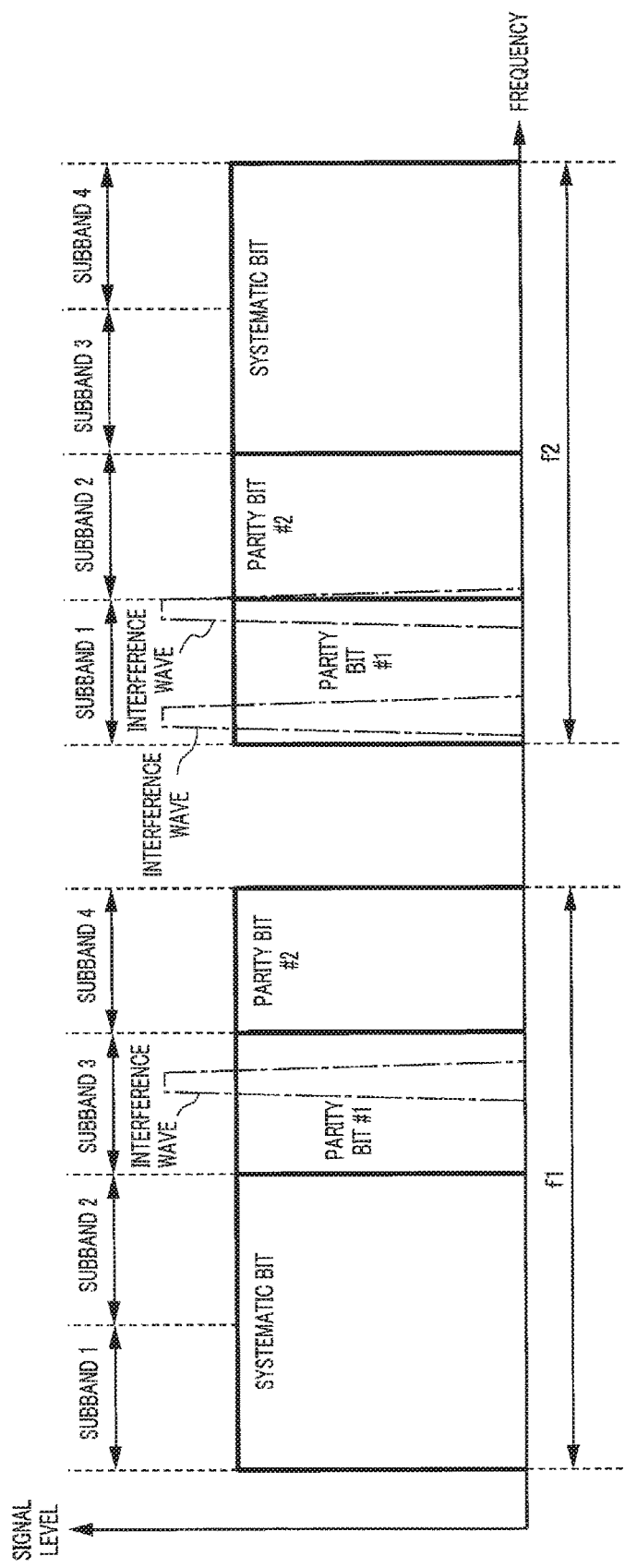
FIG. 10 is a specific example of carrier mapping according to Embodiment 4 of the present invention.

Next, a specific example of carrier mapping in base station 100 according to Embodiment 4 will be described with reference to FIG. 10. The example in FIG. 10 illustrates a case where bands f1 and f2 to which a transmission stream can be assigned are present and the total number, "n" subbands of each band is four.

First, base station 100 selects band f1 as the band for assigning transmission stream #A and selects band f2 as the band for assigning transmission stream #B.

Next, base station 100 performs the processing of S2 to S6 in FIG. 3 in order of subbands 1 to 4 in sequence. As a result, base station 100 selects systematic bits for subbands 1 and 2 and selects parity bits #1 and #2 for subbands 3 and 4, respectively, for transmission stream #A. Base station 100 selects systematic bits for subbands 3 and 4 and selects parity bits #1 and #2 for subbands 1 and 2, respectively, for transmission stream #B.

Base station 100 maps systematic bits to subbands 1 and 2 and maps parity bits #1 and #2 to subbands 3 and 4, respectively, for transmission stream #A. Base station 100 maps systematic bits to subbands 3 and 4 and maps parity bits #1 and #2 to subbands #1 and #2, respectively, for transmission stream #B.

As described above, according to Embodiment 4, effects similar to those obtained in Embodiment 1 can be obtained when multiple streams are transmitted by radio.

Embodiment 5

Next, a description will be given of Embodiment 5 of the present invention.

[Configuration of Base Station]

Figure 11:
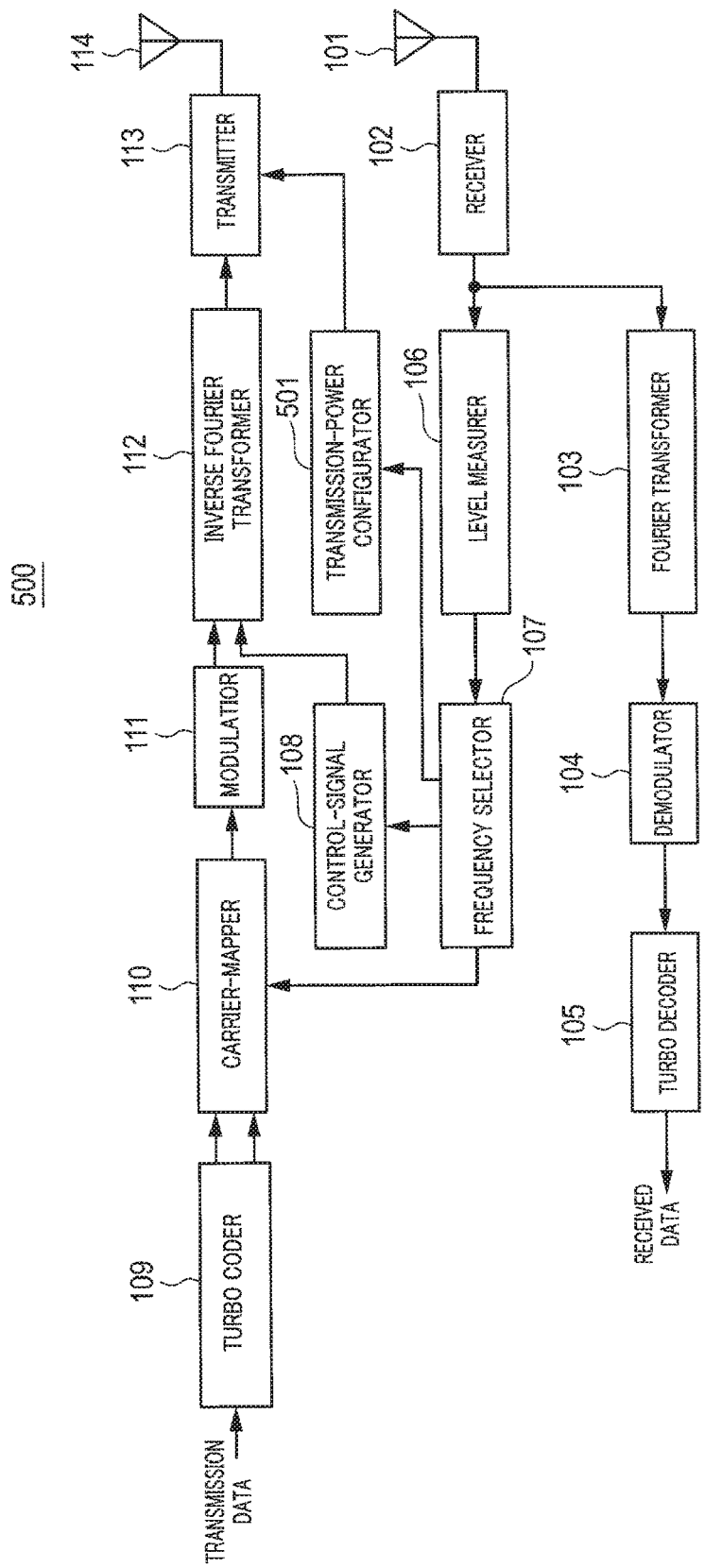
FIG. 11 is a block diagram illustrating a configuration of a base station according to Embodiment 5 of the present invention.

The configuration of base station 500 according to Embodiment 5 will be described hereinafter in detail with reference to FIG. 11. In FIG. 11, the configuration portions common to those illustrated in FIG. 1 are assigned the reference numerals identical to those in FIG. 1 and thus will not be described herein.

Base station 500 illustrated in FIG. 11 adopts a configuration obtained by adding transmission-power configurator 501 to base station 100 illustrated in FIG. 1.

Frequency selector 107 outputs frequency information to control-signal generator 108, carrier-mapper 110, and transmission-power configurator 501.

Transmission-power configurator 501 configures the transmission power for each band based on the number of subbands indicated by the frequency information and controls transmitter 113 to perform transmission using the configured transmission power.

Transmitter 113 amplifies the OFDM signal outputted from inverse Fourier transformer 112, in accordance with the control of transmission-power configurator 501, and transmits the signal via antenna 114 after performing radio transmission processing such as filtering and/or up-conversion.

[Configuration of Mobile Station]

Figure 12:
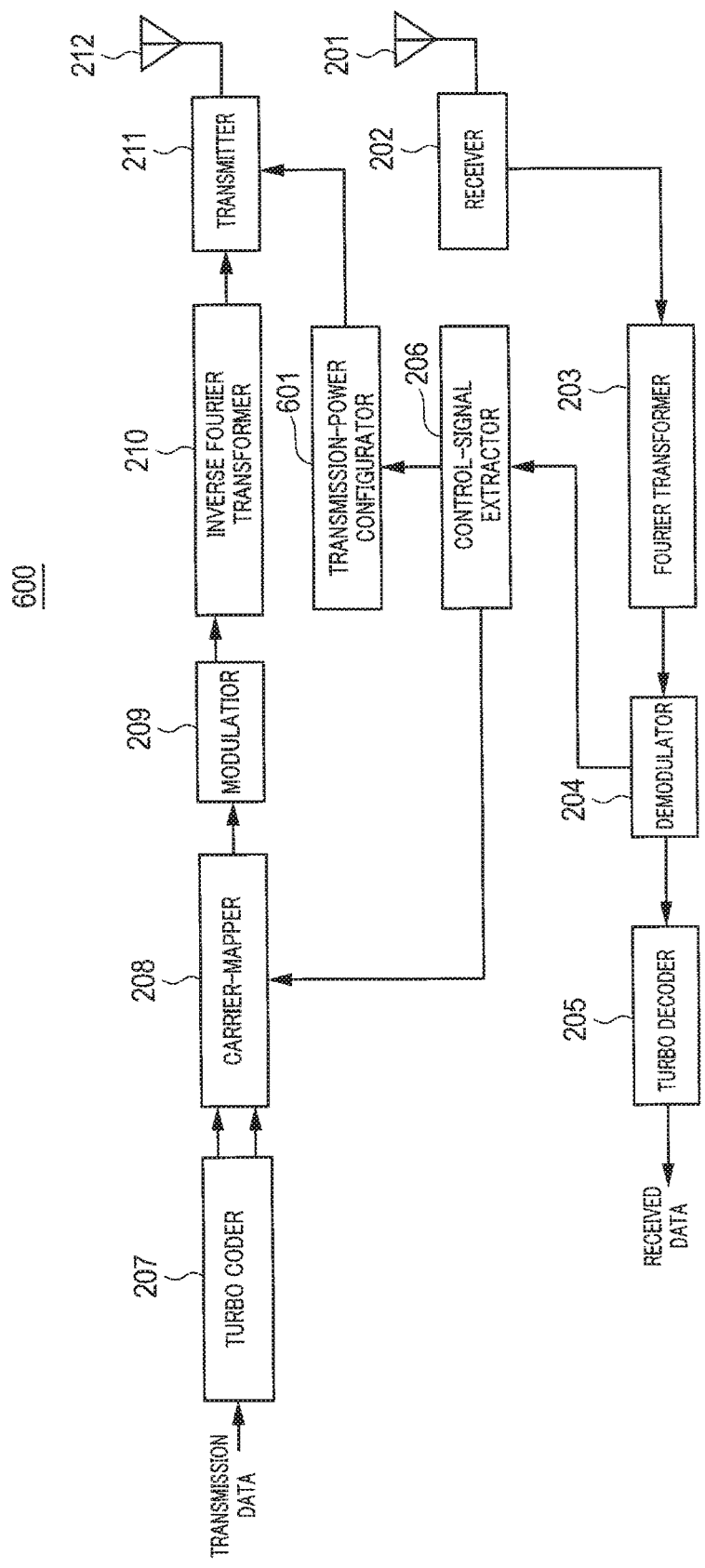
FIG. 12 is a block diagram illustrating a configuration of a mobile station according to Embodiment 5 of the present invention.

Next, the configuration of mobile station 600 according to Embodiment 5 will be described in detail hereinafter with reference to FIG. 12. In FIG. 12, the configuration portions common to those illustrated in FIG. 2 are assigned the reference numerals identical to those in FIG. 2 and thus will not be described herein.

Mobile station 600 illustrated in FIG. 12 adopts a configuration obtained by adding transmission-power configurator 601 to mobile station 200 illustrated in FIG. 2.

Control-signal extractor 206 extracts the frequency information contained in the control signal and outputs the frequency information to carrier-mapper 208 and transmission-power configurator 601.

Transmission-power configurator 601 configures the transmission power for each band based on the number of subbands indicated by the frequency information and controls transmitter 211 to perform transmission using the configured transmission power.

Transmitter 211 amplifies an OFDM signal outputted from inverse Fourier transformer 210, in accordance with the control of transmission-power configurator 601, and transmits the signal via antenna 212 after performing radio transmission processing such as filtering and/or up-conversion.

[Operation of Base Station]

Hereinafter, an operation of base station 500 according to Embodiment 5 will be described in detail with reference to FIG. 13.

First, level-measurer 106 measures the reception level (interference level) of each of multiple subbands of each band. Frequency selector 107 selects a band not used by another system based on the measurement value of the reception level inputted from level-measurer 106 (S41).

Next, frequency selector 107 determines whether the reception level (interference level) of subband i of the selected band is lower than predetermined value 1 (S42).

When the reception level is lower than predetermined value 1 (S42: YES), frequency selector 107 selects systematic bits for subband i (S43).

Meanwhile, when the reception level is equal to or greater than predetermined value 1 (S42: NO), frequency selector 107 determines whether the reception level (interference level) of subband i is smaller than predetermined value 2 (predetermined value 1<predetermined value 2) (S44).

When the reception level is lower than predetermined value 2 (S44: YES), frequency selector 107 selects parity bits for subband i (S45).

Meanwhile, when the reception level is equal to or greater than predetermined value 2 (S44: NO), frequency selector 107 selects non-transmission (S46).

Meanwhile, frequency selector 107 determines whether systematic-bit selection for all bands has been completed (S47).

Frequency selector 107 returns the flow to S42 when systematic-bit selection for all bands has not been completed (S47: NO).

Meanwhile, frequency selector 107 selects parity bits for a subband which has not been selected yet (S48), when systematic-bit selection for all bands has been completed (S47: YES).

Next, carrier-mapper 110 determines whether systematic bits have been inputted from turbo coder 109 (S49).

When systematic bits have been inputted (S49: YES), carrier-mapper 110 maps systematic bits to the subband for which systematic bits have been selected (S50).

When systematic bits have not been inputted (S49: NO), carrier-mapper 110 determines whether parity bits have been inputted from turbo coder 109 (S51).

When parity bits have been inputted (S51: YES), carrier-mapper 110 maps parity bits to the subband for which parity bits have been selected (S52).

Meanwhile, when parity bits have not been inputted (S51: NO), carrier-mapper 110 maps a null signal (S53).

Next, carrier-mapper 110 determines whether mapping for all subbands has been completed (S54).

When the mapping has not been completed (S54: NO), carrier-mapper 110 returns the flow to S49.

When the mapping has been completed (S54: YES), carrier-mapper 110 advances the flow to S55.

Control-signal generator 108 generates a control signal containing frequency information (S55).

After S55, transmission-power configurator 501 configures the transmission power for each subband based on the number of subbands indicated by the frequency information.

[Specific Example of Carrier Mapping]

Figure 14:
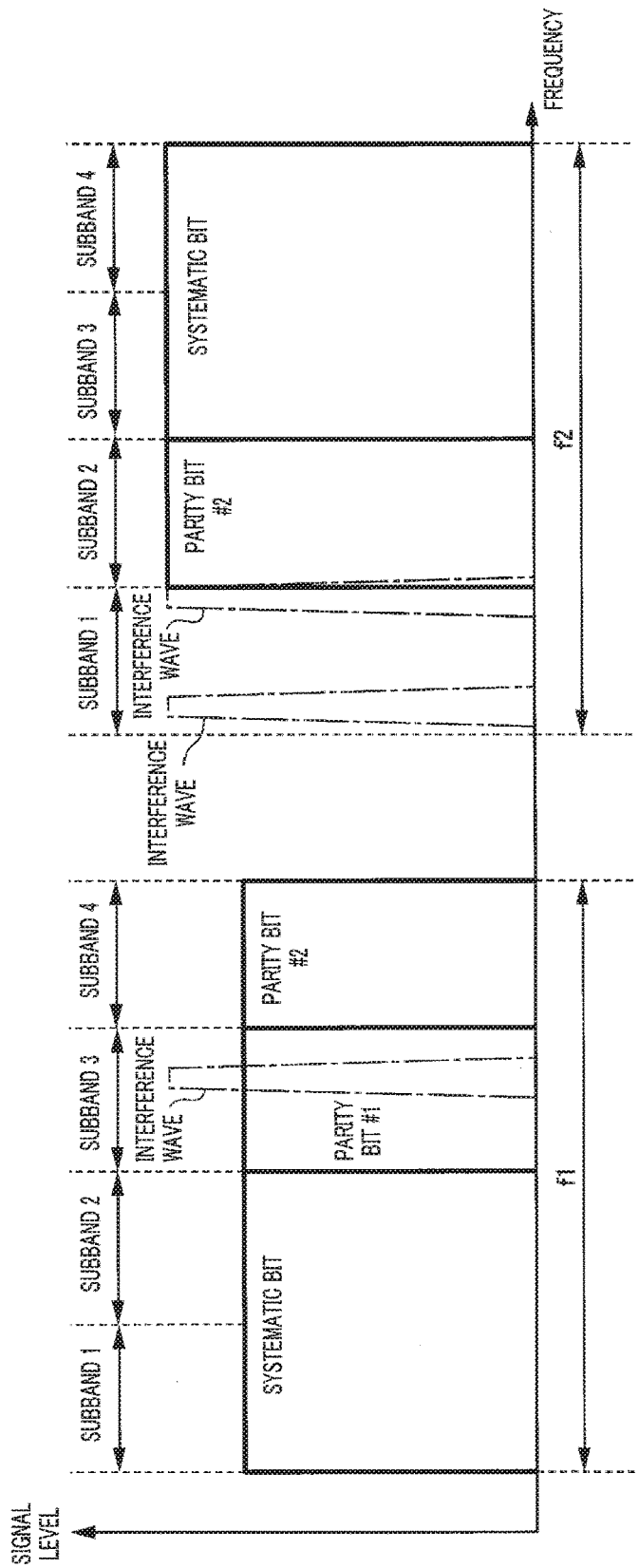
FIG. 14 illustrates a specific example of carrier mapping according to Embodiment 5 of the present invention.

Next, a description will be given of a specific example of carrier mapping in base station 500 according to Embodiment 5 with reference to FIG. 14. Note that, the example in FIG. 14 illustrates a case where there are two bands f1 and f2 to which a transmission stream can be assigned and the total number, "n" subbands of each band is four.

First, base station 500 selects band f1 as the band for assigning transmission stream #A and selects band f2 as the band for assigning transmission stream #B.

Figure 13:
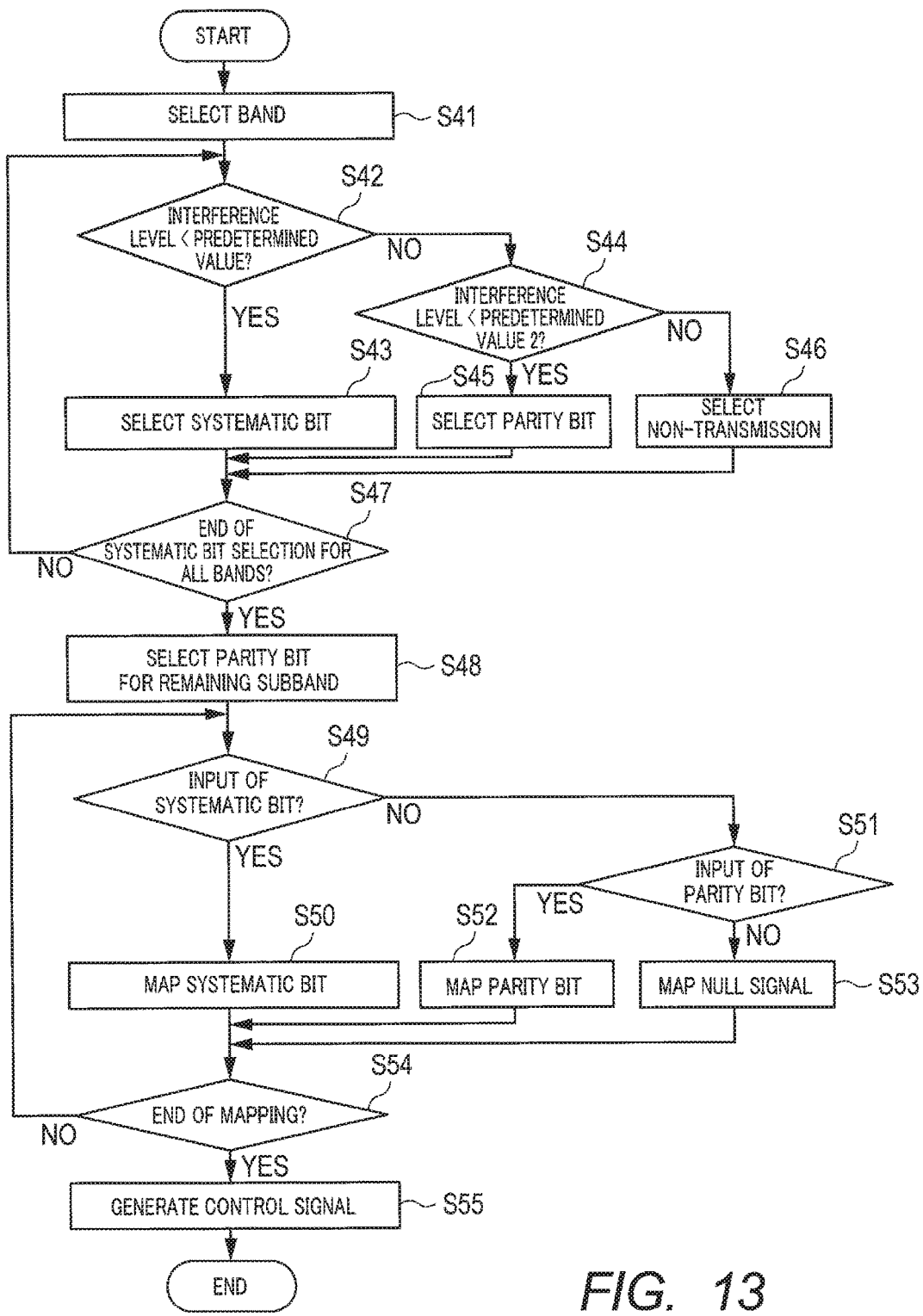
FIG. 13 is a flowchart illustrating an operation of the base station according to Embodiment 5 of the present invention.

Next, base station 500 performs processing of S42 to S48 in FIG. 13 in order of subbands 1 to 4 in sequence. As a result, base station 500 selects systematic bits for subbands 1 and 2 and selects parity bits #1 and #2 for subbands 3 and 4, respectively, for transmission stream #A. Moreover, base station 500 selects systematic bits for subbands 3 and 4 and selects parity bit #2 for subband 2 for transmission stream #B. Note that, bases station 500 selects non-transmission for subband 1 of band f2 having large interference.

Next, base station 500 performs processing of S49 to S54 in FIG. 13 in sequence, thereby mapping systematic bits to subbands 1 and 2 and mapping parity bits #1 and #2 to subbands 3 and 4, respectively, for transmission stream #A. Base station 500 maps systematic bits to subbands 3 and 4 and maps parity bit #2 to subband 2 for transmission stream #B. Base station 500 maps a null signal to subband 1.

The null signal does not make any contribution to improving the communication quality, so that the reception quality of transmission stream #B may decrease. Thus, base station 500 configures the transmission power for the systematic bits and parity bits for transmission stream #B transmitted in band f2 to be greater than the transmission power for the systematic bits and parity bits for transmission stream #A transmitted in band f1.

As described above, according to Embodiment 5, in addition to the effects obtained in Embodiment 1, it is possible to further improve the communication quality by performing transmission while increasing transmission power for another subband without using a subband having the measurement value of the reception level equal to or greater than predetermined value 2, and a large interference amount.

According to Embodiment 5, even when the transmission power is raised, interference given to another mobile station can be suppressed by configuring non-transmission by mapping a null signal to a certain subband of a band for which the transmission power is raised.

Figure 15:
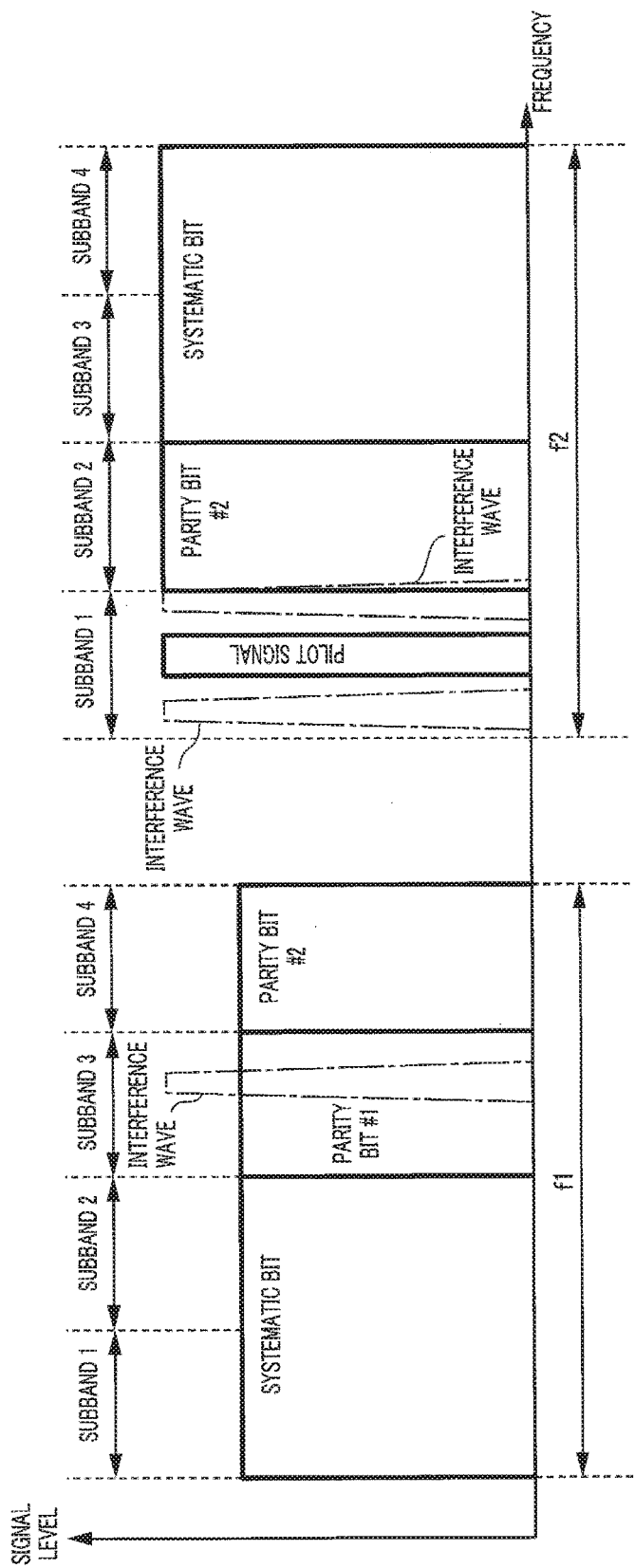
FIG. 15 illustrates a specific example of carrier mapping according to Embodiment 5 of the present invention.

Note that, in Embodiment 5, as illustrated in FIG. 15, a pilot signal may be mapped instead of mapping a null signal in a subband to which neither systematic bits nor parity bits are mapped (subband 1 of band f1 in the example of FIG. 15). In this case, the operation of base station 500 is to map a pilot signal at S53.

Accordingly, a decrease in channel estimation accuracy (frequency-domain interpolation accuracy of channel estimation) can be prevented. Note that, in the case of MIMO communication, frequency-domain interpolation of channel estimation is required, so that only a pilot signal may be transmitted at a specific time.

Embodiment 6

Next, a description will be given of Embodiment 6 of the present invention. In Embodiment 6, a case where multiple streams are transmitted will be described. Note that, the configurations of the base station and mobile station in Embodiment 6 are identical to those in FIGS. 1 and 2 and thus will not be described herein.

[Operation of Base Station]

First, a detailed description will be hereinafter given of an operation of base station 100 according to Embodiment 6 with reference to FIG. 16.

First, level measurer 106 measures the reception level (interference level) of each of multiple subbands of each band. Frequency selector 107 selects a band not used by another system based on the measurement value of the reception level inputted from level measurer 106 (S61).

Next, frequency selector 107 finds out a difference between the reception levels of bands and determines whether the found difference is lower than a predetermined value for the selected bands (S62).

Meanwhile, when the difference is equal to or greater than the predetermined value (S62: NO), frequency selector 107 determines to switch systematic bits and parity bits between bands (S63) and determines whether the reception level is smaller than the predetermined value for subband i, which is a divisional part of each band (S64).

When the difference is lower than the predetermined value (S62: YES), frequency selector 107 determines whether the reception level of subband i of each selected band is smaller than the predetermined value independently for each band (S64).

When the reception level is lower than the predetermined value and interference is small (S64: YES), frequency selector 107 selects systematic bits for subband i (S65).

Meanwhile, when the reception level is equal to or greater than the predetermined value and interference is large (S64: NO), frequency selector 107 selects parity bits (S66).

Next, frequency selector 107 determines whether systematic-bit selection for all subbands has been completed (S67).

When systematic-bit selection for all subbands has not been completed (S67: NO), frequency selector 107 returns the flow to S64.

Meanwhile, when systematic-bit selection for all subbands has been completed (S67: YES), frequency selector 107 selects parity bits for a subband which has not been selected yet (S68).

Next, carrier-mapper 110 determines whether systematic bits have been inputted from turbo coder 109 (S69).

When systematic bits have been inputted (S69: YES), carrier-mapper 110 maps systematic bits to a subband selected for systematic-bit mapping (S70).

Meanwhile, when parity bits have been inputted (S69: NO), carrier-mapper 110 maps parity bits to a subband selected for parity-bit mapping (S71).

Next, carrier-mapper 110 determines whether mapping for all subbands has been completed (S72).

When the mapping has not been completed (S72: NO), carrier-mapper 110 returns the flow to S69.

Meanwhile, when the mapping has been completed (S72: YES), carrier-mapper 110 advances the flow to S73.

Control-signal generator 108 generates a control signal containing frequency information (S73).

[Specific Example of Carrier Mapping]

Figure 17:
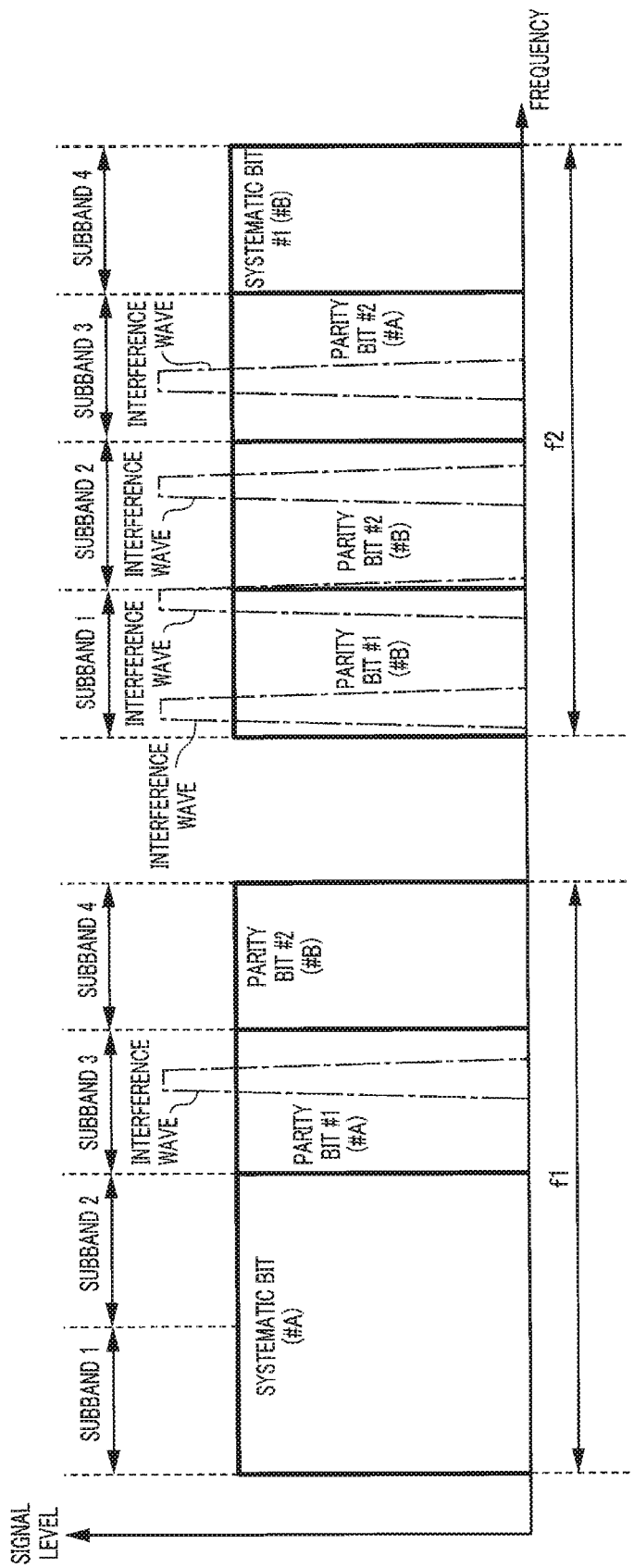
FIG. 17 illustrates a specific example of carrier mapping according to Embodiment 6 of the present invention.

Next, a description will be given of a specific example of carrier mapping in base station 100 according to Embodiment 6 with reference to FIG. 17. Note that, the example in FIG. 17 illustrates a case where two bands f1 and f2 to which a transmission stream can be assigned and the total number, "n" subbands of each band is four.

Figure 16:
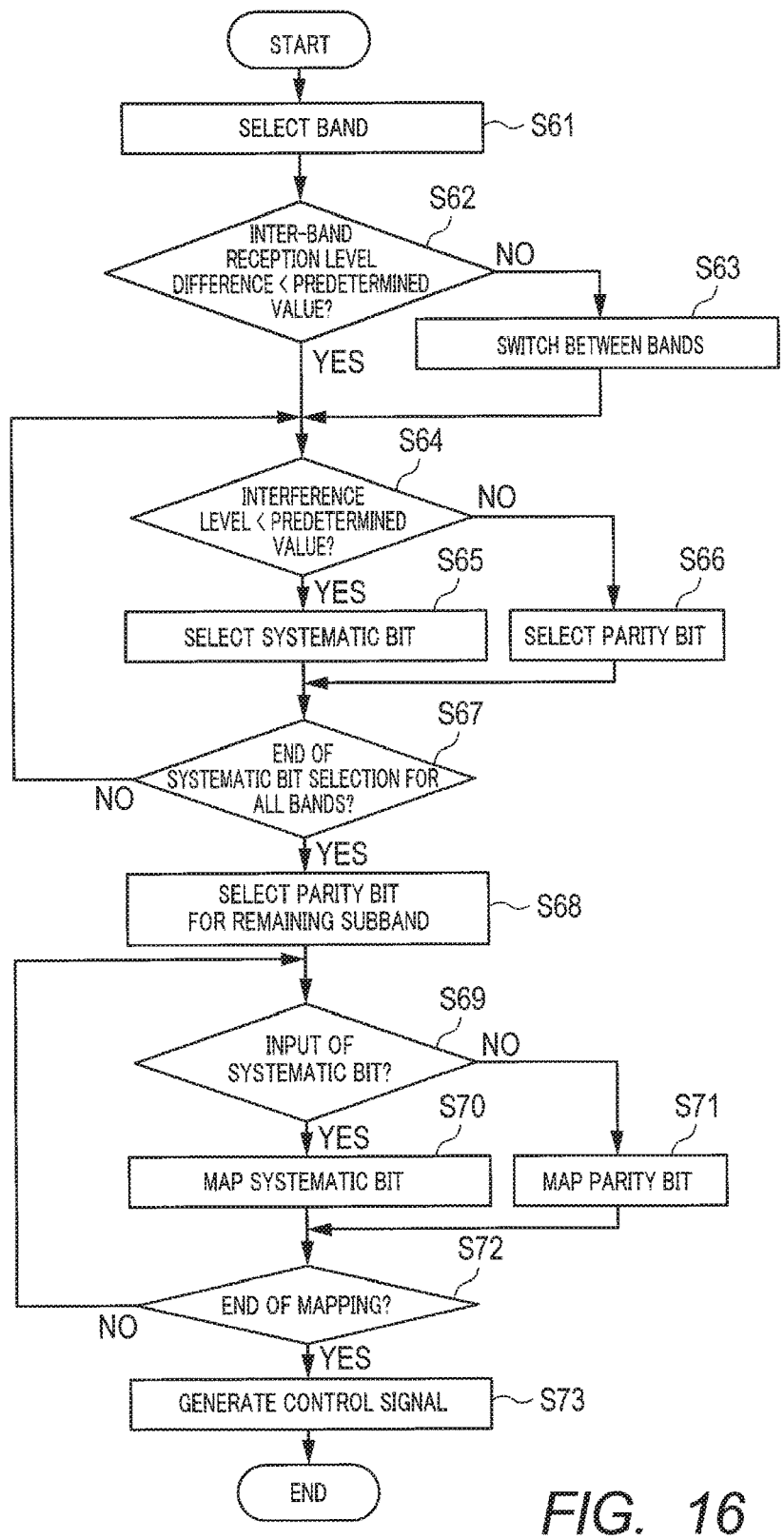
FIG. 16 is a flowchart illustrating an operation of the base station according to Embodiment 6 of the present invention.

In this example, an assumption is made that base station 100 has determined to switch systematic bits and parity bits between bands by the processing of S62 and S63 in FIG. 16.

In this case, by the processing of S64 to S68 in FIG. 16, base station 100 selects systematic bits of transmission stream #A for subbands 1 and 2 of band f1 having a reception level smaller than a predetermined value and selects systematic bits of transmission stream #B for subbands 4 of bands f1 and f2 having a reception level smaller than a predetermined value. Moreover, base station 100 selects parity bit #1 of transmission stream #A for subband 3 of band f1 having a reception level equal to or greater than the predetermined value and selects parity bit #2 of transmission stream #A for subband 3 of band f2 having a reception level equal to or greater than the predetermined value. Base station 100 selects parity bits #1 and #2 of transmission stream #B for subbands 1 and 2 of band f2 having a reception level equal to or greater than the predetermined value.

Next, by performing processing of S69 to S72 of FIG. 16 in sequence, base station 100 maps systematic bits of transmission stream #A to subbands 1 and 2 in band f1 and maps parity bit #1 of transmission stream #A in subband 3 and maps systematic bit #2 of transmission stream #B to subband 4. Base station 100 maps parity bits of transmission stream #B to subbands 1 and 2 and maps parity bit #1 of transmission stream #A to subband 3 and maps systematic bit #1 of transmission stream #B to subband 4.

[Configuration of Control Signal]

Next, a description will be given of a configuration of a control signal transmitted from base station 100 according to Embodiment 6. Note that, in this embodiment, when there is no change in carrier mapping, the control signal is generated in the format illustrated in FIG. 5A.

Figure 18:
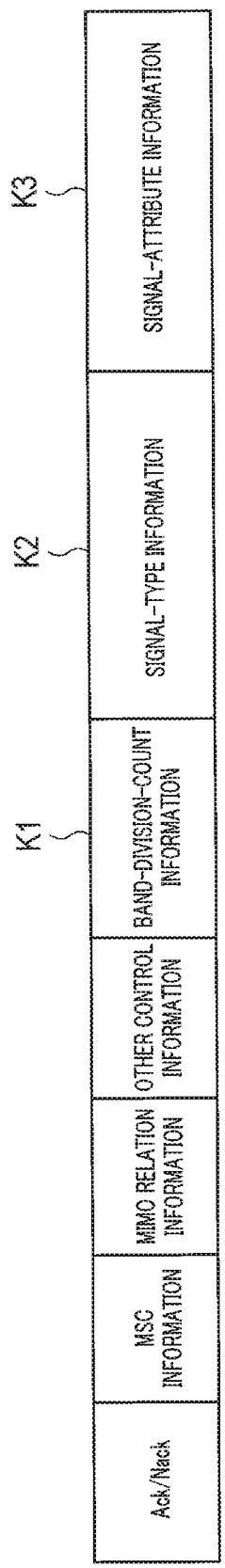
FIG. 18 is a diagram illustrating a control signal format according to Embodiment 6 of the present invention.

When there is a change in carrier mapping, the control signal is generated in the format illustrated in FIG. 18.

The control signal in the format in FIG. 18 includes band-division-count information K1, signal-type information K2, and signal-attribute information K3 indicating in which band the mapped signal is transmitted in a normal situation, in addition to the format illustrated in FIG. 5A. Band-division-count information K1, signal-type information K2, and signal-attribute information K3 are frequency information. More specifically, in the case of FIG. 18, band-division-count information K1 requires two bits while signal-type information K2 requires four bits, and signal-attribute information K3 requires eight bits resulting from multiplication of the number of subbands, four, by one bit indicating two signal types and from multiplication of the result by the number of selected bands, two.

As described above, according to Embodiment 6, an unused frequency band is selected for each of multiple streams, and when the carrier frequency for systematic-bit mapping is insufficient in a certain unused frequency band, the carrier frequency for systematic-bit mapping can be selected in another unused frequency band. Thus, in addition to the effects obtained in Embodiment 1, it is possible to prevent a decrease in communication quality even when a specific frequency has large interference, because systematic bits or parity bits of each transmission stream can be switched between bands for transmission.

In Embodiment 6, for application to MIMO communication, transmission can be performed using another antenna.

Embodiment 7

Next, a description will be given of Embodiment 7 of the present invention. In Embodiment 7, a case will be described where carrier mapping during retransmission is changed from the carrier mapping during the last transmission. Note that, the configurations of a base station and mobile station according to Embodiment 7 are identical to those in FIGS. 1 and 2, and thus will not be described herein.

[Operation of Base Station]

For transmission or reception of new data, base station 100 performs the operation illustrated in FIG. 3 periodically, i.e., once in n frames. Meanwhile, for retransmission or re-reception of data, base station 100 performs the operation illustrated in FIG. 3 for each time.

[Specific Example of Carrier Mapping]

Next, a specific example of carrier-mapping in base station 100 according to Embodiment 7 will be described with reference to FIGS. 19A to 22B. Note that, FIGS. 19A, 20A, 21A and 22A indicate carrier-mapping before switching (during the last transmission), and FIGS. 19B, 20B, 21B and 22B indicate carrier-mapping after switching (during retransmission).

Figure 19A:
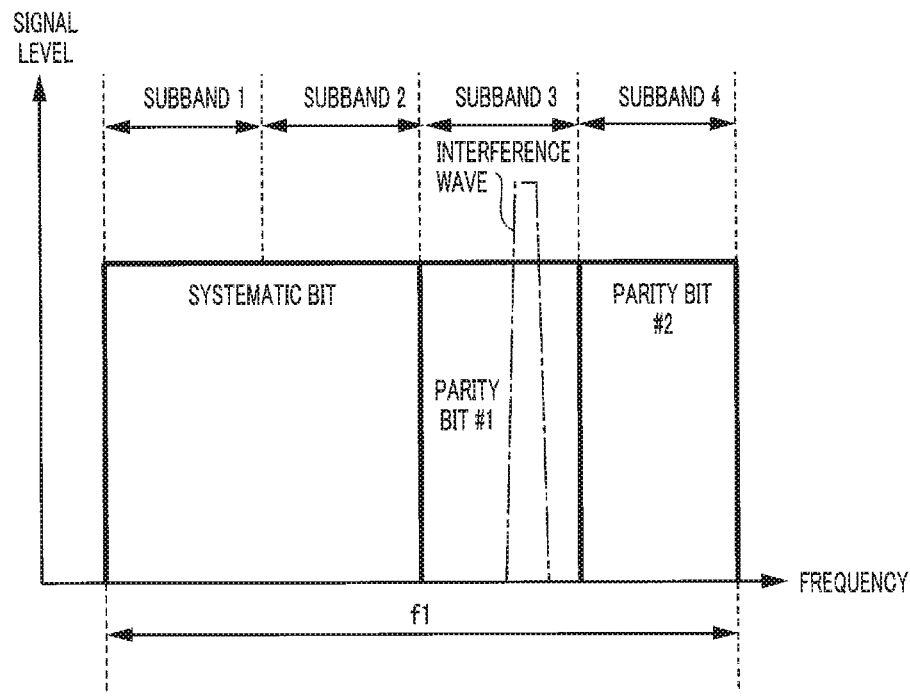
FIGS. 19A and 19B illustrate a specific example of carrier mapping according to Embodiment 7 of the present invention.
Figure 19B:
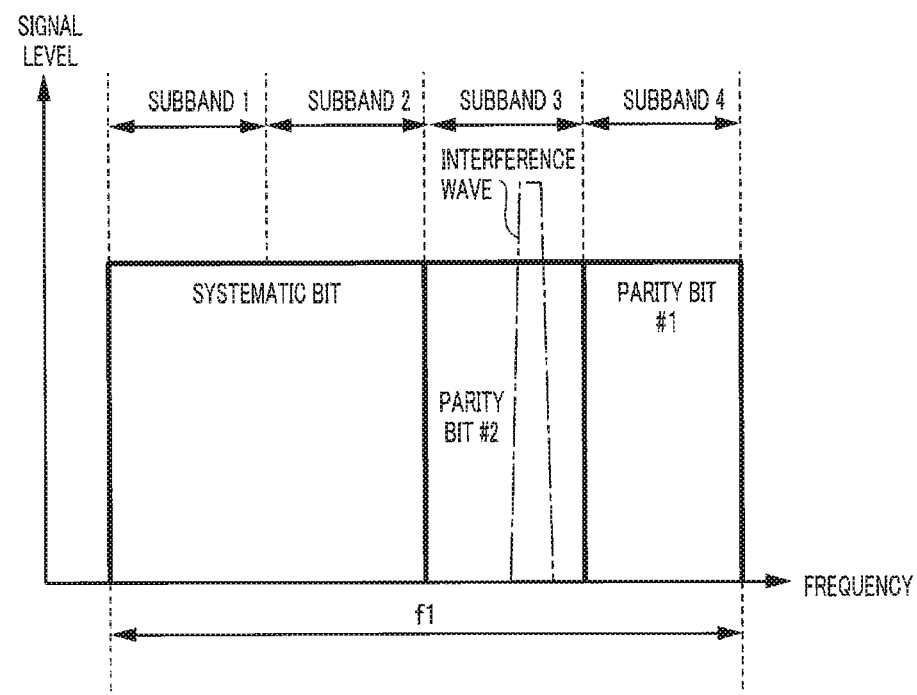

As illustrated in FIGS. 19A and 19B, base station 100 can switch only mapping of parity bits within the same band between the last transmission and the retransmission. FIGS. 19A and 19B illustrate an example in which parity bits #1 and #2 are switched in subbands 3 and 4 between the last transmission and the retransmission. In this case, parity bit

1 transmitted in subband 3 having large interference during the last transmission can be retransmitted in subband 4 having small interference. Moreover, regarding the systematic bits, transmission can be performed in subbands 1 and 2 having small interference during both the last transmission and the retransmission.

Figure 20A:
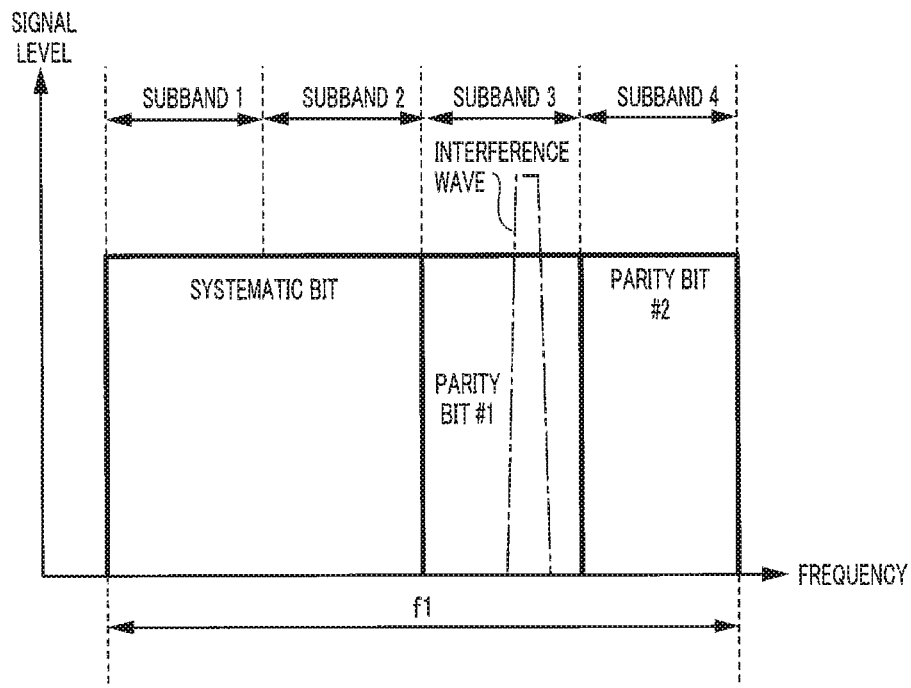
FIGS. 20A and 20B illustrate a specific example of the carrier mapping according to Embodiment 7 of the present invention.
Figure 20B:
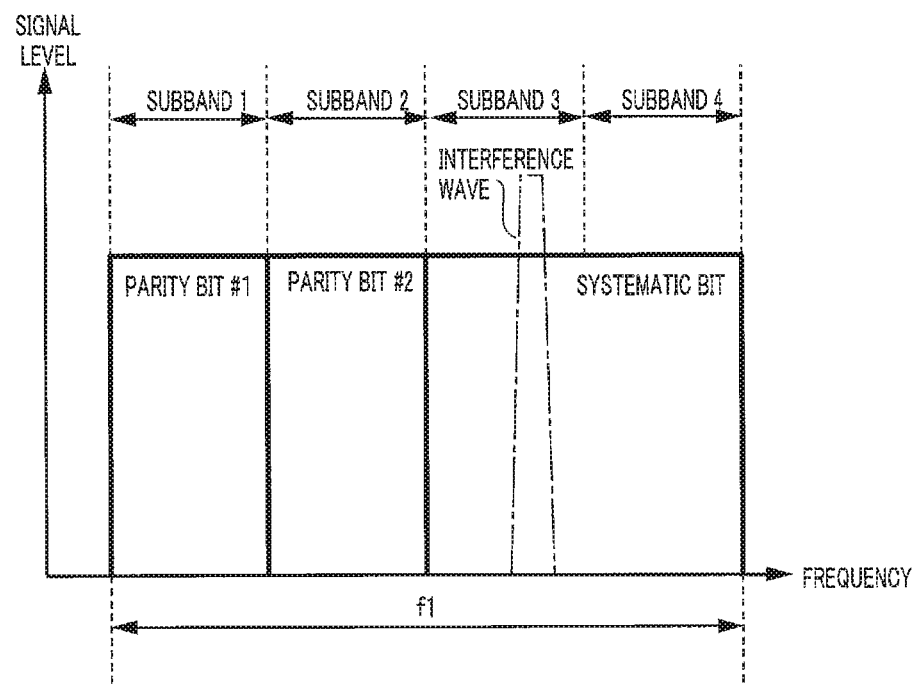

As illustrated in FIGS. 20A and 20B, base station 100 can switch all the mapping of systematic bits and parity bits in the same band between the last transmission and the retransmission. FIGS. 20A and 20B illustrate an example in which the systematic bits and parity bits are switched in subbands 1 to 4 between the last transmission and the retransmission. In this case, parity bit #1 transmitted in subband 3 having large interference during the last transmission can be retransmitted in subband 1 having small interference. In this case, although some of the systematic bits are transmitted in subband 3 having large interference, during the retransmission, the systematic bits are already transmitted in subbands 1 and 2 having small interference during the last transmission, so that there is no decrease in reception quality.

Figure 21A:
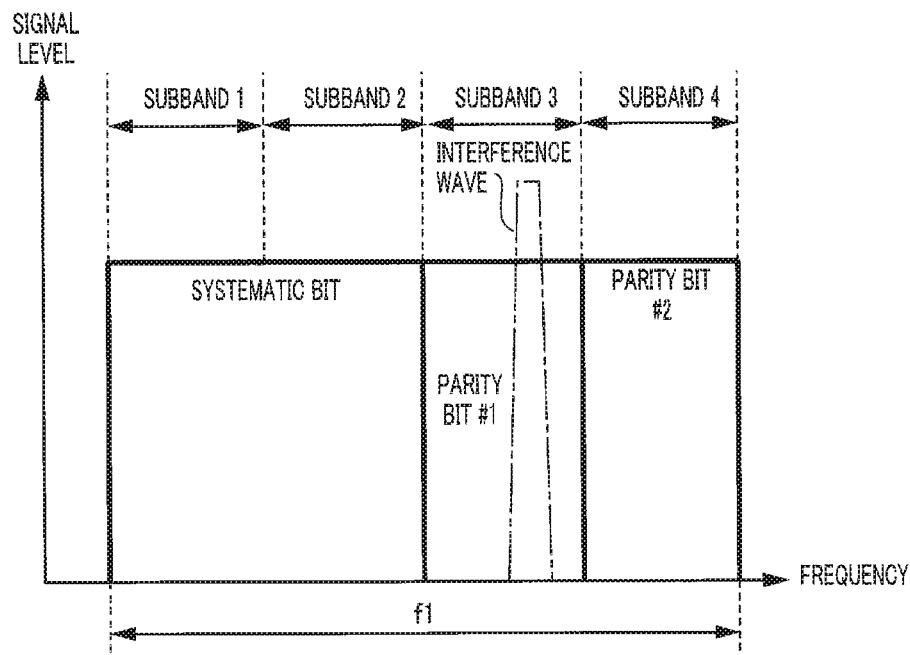
FIGS. 21A and 21B illustrate a specific example of the carrier mapping according to Embodiment 7 of the present invention.
Figure 21B:
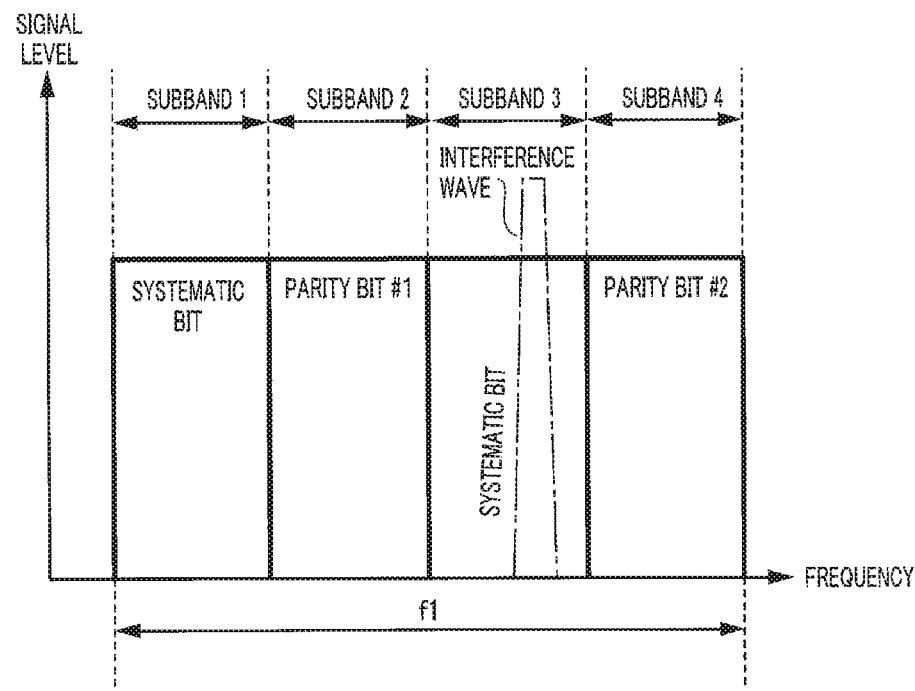

Moreover, as illustrated in FIGS. 21A and 21B, base station 100 can switch all the mapping of systematic bits and parity bits in the same band between the last transmission and the retransmission. FIGS. 21A and 21B illustrate an example in which some of the systematic bits and some of the parity bits are switched in subbands 2 and 3 between the last transmission and the retransmission. In this case, parity bit #1 transmitted in subband 3 having large interference during the last transmission can be retransmitted in subband 2 having small interference. In this case, although some of the systematic bits are transmitted in subband 3 having large interference during the retransmission, systematic bits are already transmitted in subbands 1 and 2 having small interference during the last transmission, so that there is no decrease in reception quality.

As illustrated in FIGS. 22A and 22B, base station 100 can switch mapping of all or some of the systematic bits and parity bits among multiple bands between the last transmission and the retransmission. FIGS. 22A and 22B illustrate an example in which some of the systematic bits of transmission stream #A and some of the parity bits of transmission stream #A are switched in subband 2 of band f1 and subband 2 of band f2 between the last transmission and the retransmission. In this case, even when one of the bands has large interference, switching between bands during the retransmission can prevent a decrease in reception quality.

[Configuration of Control Signal]

Next, a description will be given of the configuration of a control signal transmitted from base station 100 according to Embodiment 7 with reference to FIG. 23. Note that, the control signal is transmitted periodically, i.e., once in n frames.

For transmission or reception of new data, base station 100 transmits the control signal of the format illustrated in FIG. 5A, periodically, i.e., once in n frames. Meanwhile, for retransmission or re-reception of data, base station 100 transmits a control signal of the format illustrated in FIG. 23, for each time.

Figure 23:
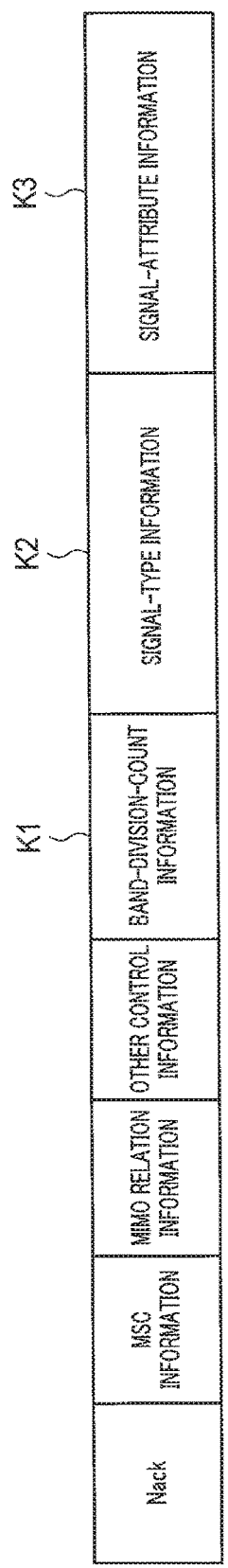
FIG. 23 is a diagram illustrating a control signal format according to Embodiment 7 of the present invention.

The control signal of the format illustrated in FIG. 23 contains Nack indicating a retransmission request as Ack/Nack information and further contains band-division-count information K1, signal-type information K2, and signal-attribute information K3 indicating in which band the mapped signal is transmitted in a normal situation.

Band-division-count information K1, signal-type information K2, and signal-attribute information K3 are frequency information. More specifically, in case of FIG. 23, band-division-count information K1 requires two bits, signal-type information K2 requires four bits, and signal-attribute information K3 requires eight bits resulting from multiplication of the number of subbands, four, by one bit indicating two signal types, and from multiplication of the result by the number of selected bands, two.

Hereinafter, a case will be illustrated where signal assignment is changed in the initial transmission simultaneously at the time of data retransmission.

In this case, the control signal for data retransmission is transmitted, first, and the control signal indicating a change in signal assignment in the initial transmission can be transmitted after n frames. Note that, the control signal indicating a change in signal assignment in the initial transmission may be transmitted in a frame right after (the following frame) the frame in which the control signal for data retransmission is transmitted.

The control signal for data retransmission and the control signal indicating a change in signal assignment in the initial transmission can be transmitted in the same frame. In this case, band-division-count information K1, signal-type information K2, and signal-attribute information K3 for both of the data retransmission and the initial transmission are to be transmitted in the same frame.

As described above, according to Embodiment 7, the mapping of systematic bits or parity bits can be changed between the last transmission and the retransmission, so that in addition to the effects obtained in Embodiment 1, it is possible to improve the communication quality by retransmission.

Note that, in Embodiment 7, bit mapping during retransmission may be changed in accordance with rules previously determined between base station 100 and mobile station 200. In this case, base station 100 does not have to transmit the control signal illustrated in FIG. 23 to mobile station 200.

Embodiment 8

Next, a description will be given of Embodiment 8 of the present invention. In Embodiment 8, carrier-mapping for reducing the impact of out-of-band leakage from an adjacent channel used by another system will be described. Note that, the configurations of the base station and mobile station are identical to those illustrated in FIGS. 1 and 2, and thus will not be described herein.

[Operation of Base Station]

First, a detailed description will be hereinafter given of an operation of base station 100 according to Embodiment 8 with reference to FIG. 24. Note that, in FIG. 24, the steps identical to those in FIG. 3 are assigned the same reference numerals and will not be described herein. The flow illustrated in FIG. 24 adopts a configuration obtained by adding step S81 between step S2: YES and step S3 in FIG. 3.

Frequency selector 107 determines whether the reception level of each subband i of the selected band is lower than a predetermined value (S2).

When the reception level is lower than the predetermined value (S2: YES), frequency selector 107 determines whether the width of the selected band is greater than a predetermined value (S81).

When the width of the selected bandwidth is greater than the predetermined value (S81: YES), frequency selector 107 selects systematic bits for subband i (S3).

Meanwhile, the width of the selected band is equal to or less than the predetermined value (S81: NO), frequency selector 107 selects parity bits for subband i (S4).

[Specific Example of Carrier-Mapping]

Figure 25:
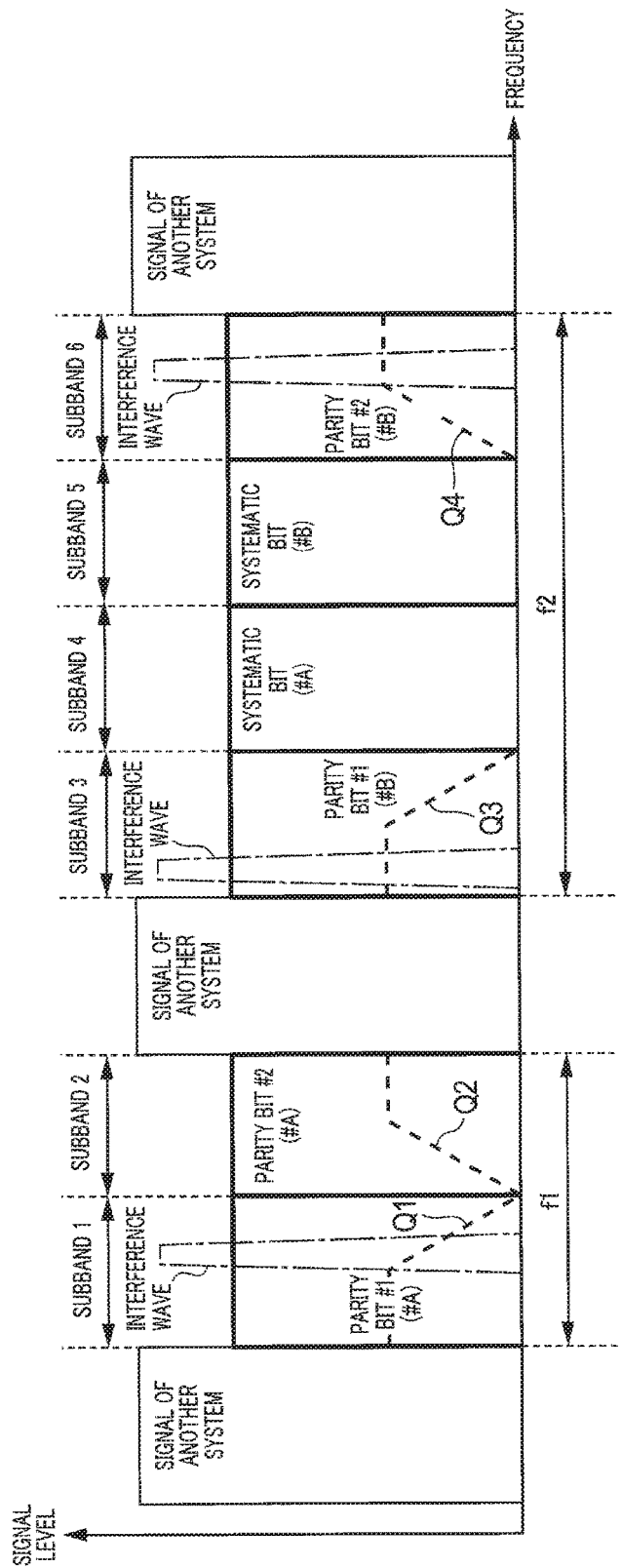
FIG. 25 is a specific example of carrier mapping according to Embodiment 8 of the present invention.

Next, a description will be given of a specific example of carrier-mapping in base station 100 according to Embodiment 8 with reference to FIG. 25.

Figure 24:
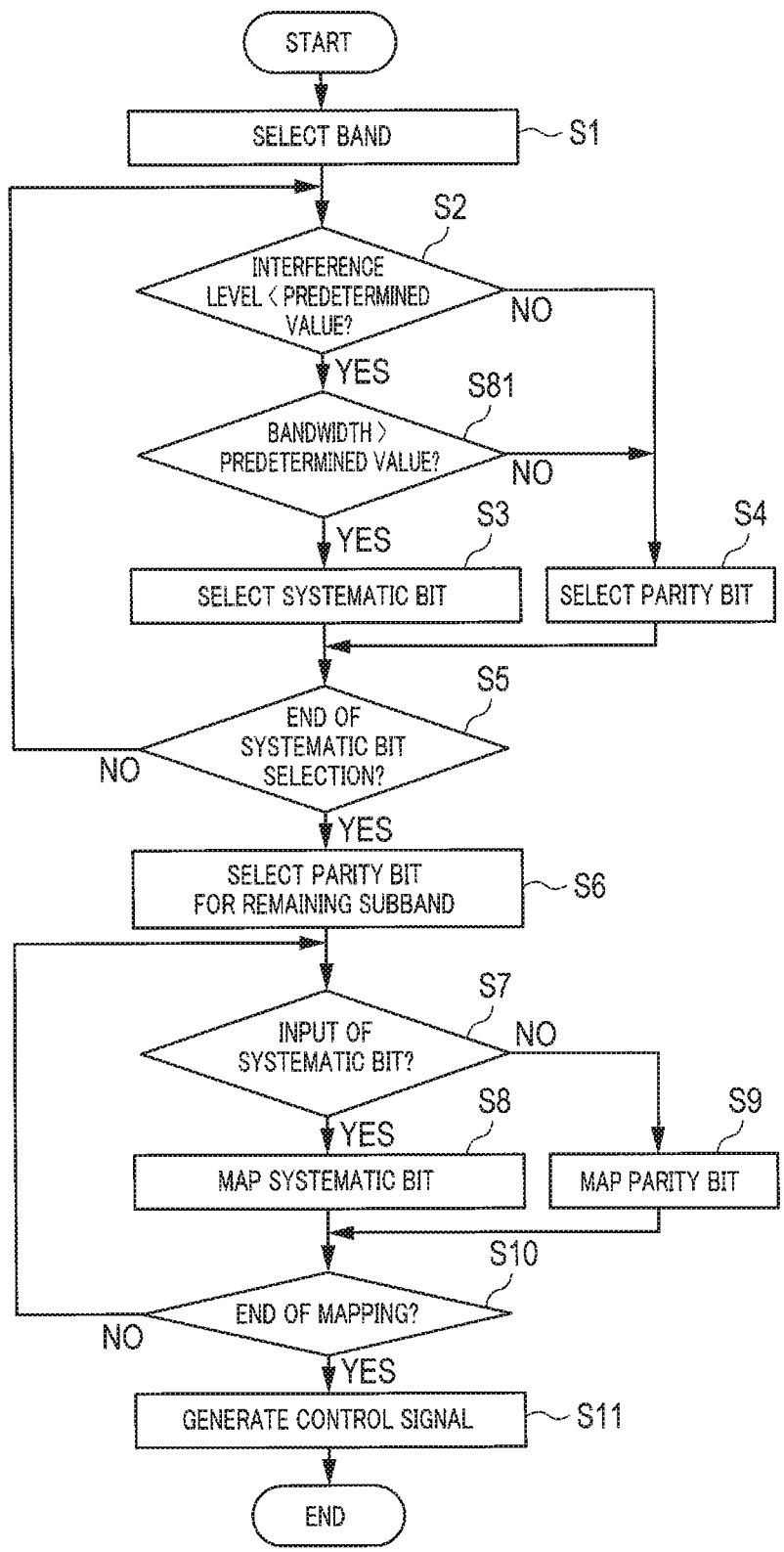
FIG. 24 is a flowchart illustrating an operation of a base station according to Embodiment 8 of the present invention.

By the processing of S2 to S6 and S81 of FIG. 24, base station 100 selects systematic bits of transmission streams #A and #B for subbands 4 and 5 having a reception level lower than the predetermined value and not being adjacent to a channel used by another system in band f2 having a bandwidth larger than the predetermined value. Thus, it is possible to reduce the interference to systematic bits from components Q1, Q2, Q3, and Q4, which leak to the out-of-band from an adjacent channel used by another system.

Base station 100 selects parity bits of transmission stream #A for subbands 1 and 2 of band f1 adjacent to a channel used by another system and selects parity bits of transmission stream #B for subbands 3 and 6 of band f2 adjacent to a channel used by another system.

By performing the processing of S7 to S10 of FIG. 24 in sequence, base station 100 maps systematic bits to subbands 4 and 5 and maps parity bits to subbands 1, 2, 3, and 6.

As described above, according to Embodiment 8, in addition to the effects obtained in Embodiment 1, it is possible to reduce the impact of out-of-band leakage from an adjacent channel used by another system and thus to prevent a decrease in communication quality.

As in the case of white space, for example, a system requiring very high-quality transmission may be assigned to an adjacent frequency. In this case, in order to prevent from giving interference to the other system requiring very high-quality transmission, the transmission power of the own system may need to be kept low. Mapping of systematic bits to such a frequency band may significantly decrease the transmission quality. For this reason, no systematic bits may be mapped to a specific frequency band such as white space, for example.

In Embodiment 8, a base station and a mobile station are used to map systematic bits or parity bits and also generate and transmit a control signal, but a mobile station may map systematic bits or parity bits based on the control signal received by the mobile station from a base station.

Embodiment 9

[Configuration of Communication System]

Figure 26:
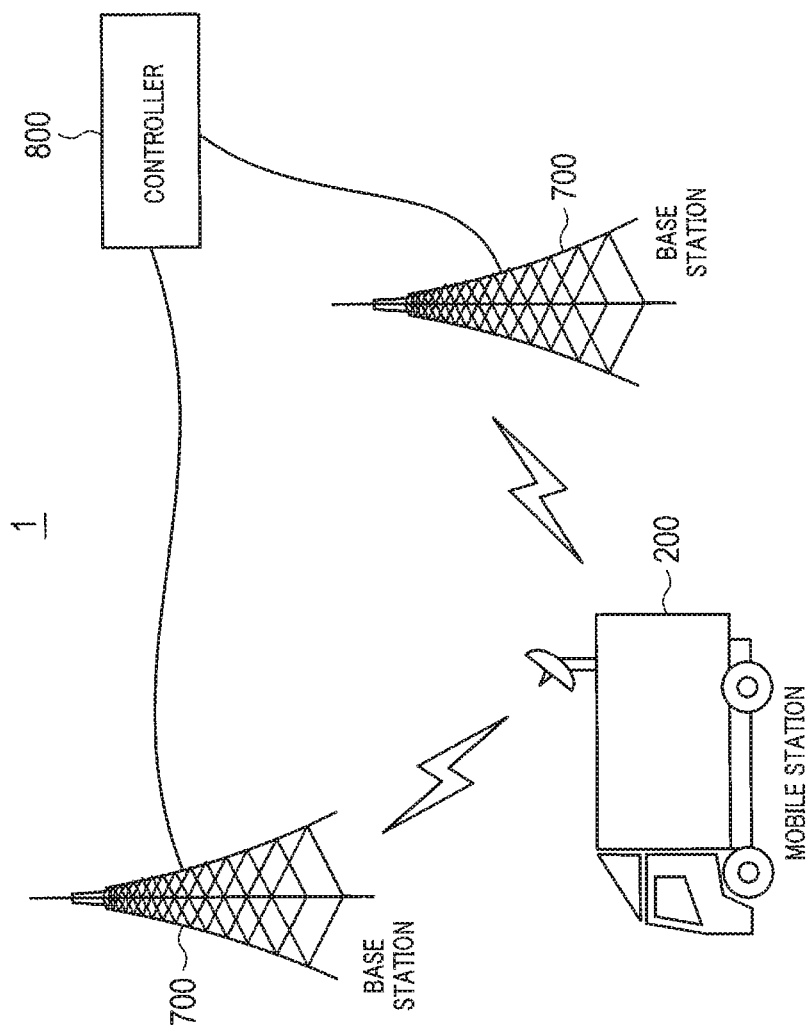
FIG. 26 is a block diagram illustrating a configuration of a communication system according to Embodiment 9 of the present invention.

A detailed description will be hereinafter given of the configuration of communication system 1 according to Embodiment 9 of the present invention with reference to FIG. 26. As illustrated in FIG. 26, communication system 1 is composed of a plurality of base stations 700, controller 800, and mobile station 200.

Each base station 700 is connected to controller 800 by wire or radio. Each base station 700 performs radio communication with mobile station 200 using some subbands of a frequency band shared by another system.

Mobile station 200 transmits turbo code (systematic bits, parity bits) to a communication counterpart base station. Moreover, mobile station 200 performs a handover between base stations 700 based on an instruction from controller 800. Handover types include: "hard handover" in which connection of the communication interface before switching is disconnected and connection is made by communication interface after switching; and "soft handover" in which the communication interface after switching is used for connection but the communication interface before switching is also kept during the handover. The present invention can be applied to both the hard handover and soft handover.

<Configuration of Base Station>

Figure 27:
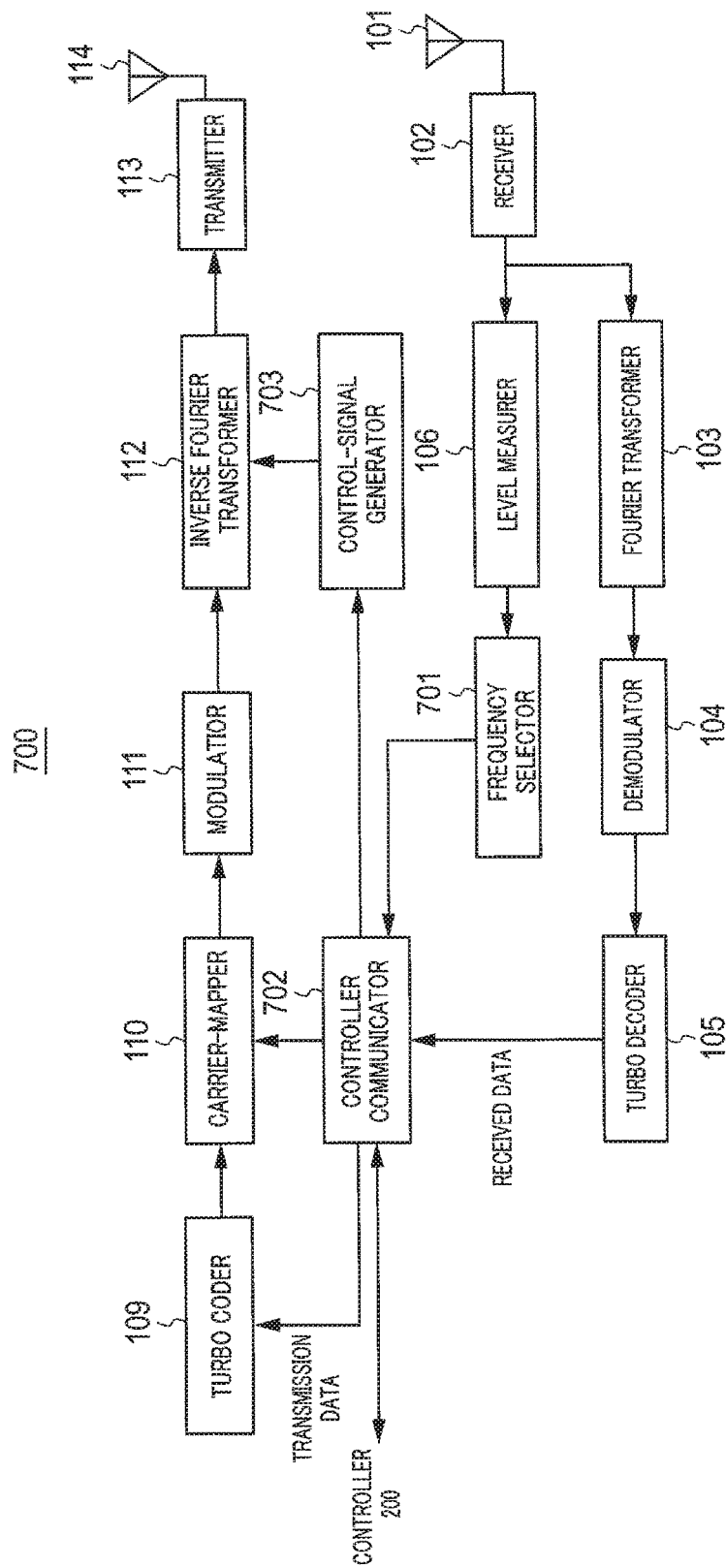
FIG. 27 is a block diagram illustrating a configuration of a base station according to Embodiment 9 of the present invention.

The configuration of base station 700 according to Embodiment 9 will be hereinafter described in detail with reference to FIG. 27. In FIG. 27, the configuration portions common to those illustrated in FIG. 1 are assigned the same reference numerals and will not be described herein.

As illustrated in FIG. 27, base station 700 is different from base station 100 in that the processing details of frequency selector 701 are different from those of frequency selector 107. Moreover, controller communicator 702 is added to base station 700 as compared with base station 100. Base station 700 is different from base station 100 in that the processing details of control-signal generator 703 are different from those of control-signal generator 109.

Turbo decoder 105 outputs received data to controller communicator 702. Level measurer 106 measures the reception level of the received signal outputted from receiver 102 and outputs the measurement value to frequency selector 701.

Frequency selector 701 selects a band not used by another system based on the measurement value of the reception level outputted from level measurer 106. The band to be selected herein is a frequency band that is shared with another system but is an unused frequency band not used by the other system. Frequency selector 701 outputs the selected band and reception quality information indicating a reception level of the band to controller communicator 702.

Frequency selector 701 compares the measurement value of the reception level inputted from level measurer 106 with a predetermined value (threshold) to find out their magnitude relationship for each subband (carrier frequency) of the selected band and selects a subband having a measurement value of the reception level lower than the predetermined value and having small interference.

When base station 700 is in communication with mobile station 200 (handover source), a subband for mapping systematic bits (systematic-bit mapping subband) is selected from among subbands having a measurement value of the reception level lower than the predetermined value, and a subband for mapping parity bits (parity-bit mapping subband) is selected from among subbands other than the systematic-bit mapping subband.

When base station 700 is in communication with mobile station 200, frequency selector 701 outputs the frequency information indicating a subband having an interference level lower than the predetermined value, the systematic-bit mapping subband, and the parity-bit mapping subband (first frequency information) to controller communicator 702. When base station 700 is the handover destination, frequency selector 701 outputs the frequency information indicating a subband having an interference level lower than the predetermined value (second frequency information) to controller communicator 702.

Controller communicator 702 transmits the received data outputted from turbo decoder 105 to controller 800 and outputs the data transmitted from controller 800 to turbo coder 109.

Controller communicator 702 transmits the reception quality information outputted from frequency selector 701 to controller 800. Upon reception of an indication signal indicating transmission of frequency information from controller 800 after transmission of the reception quality information, controller communicator 702 transmits the frequency information to controller 800. When receiving signal assignment information indicating a systematic-bit mapping subband and a parity-bit mapping subband from controller 800 (during handover) after transmitting the frequency information, controller communicator 702 outputs the signal assignment information to control-signal generator 703 and carrier-mapper 110.

Meanwhile, when not receiving the signal assignment information from controller 800 (during non-handover), controller communicator 702 outputs the frequency information (first frequency information) to control-signal generator 703 and carrier-mapper 110.

Control-signal generator 703 generates a control signal containing the signal assignment information outputted from controller communicator 702 and outputs the control signal to inverse Fourier transformer 112.

Turbo coder 109 performs turbo coding processing on the transmission data outputted from controller communicator 702 to generate parity bits and systematic bits and transmits the bits to carrier-mapper 110.

Carrier-mapper 110 assigns the systematic bits and parity bits to the subbands based on the signal assignment information outputted from controller communicator 702 and outputs the signal to modulator 111.

Inverse Fourier transformer 112 generates an OFDM signal by performing inverse Fourier transform processing on the control signal outputted from control-signal generator 703 and the modulation signal outputted from modulator 111 and outputs the OFDM signal to transmitter 113.

[Configuration of Base Station]

Figure 28:
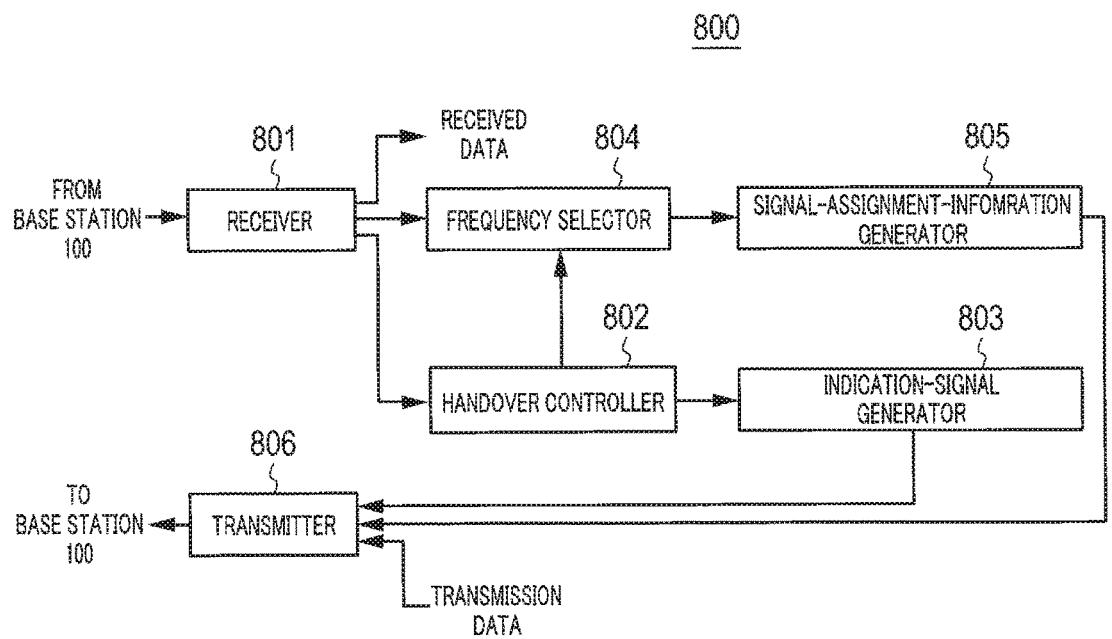
FIG. 28 is a block diagram illustrating a configuration of a controller according to Embodiment 9 of the present invention.

Next, a detailed description will be hereinafter given of the configuration of controller 800 according to Embodiment 9 with reference to FIG. 28. As illustrated in FIG. 28, controller 800 includes receiver 801, handover controller 802, indication-signal generator 803, frequency selector 804, signal-assignment-information generator 805, and transmitter 806.

Receiver 801 outputs the received data to an upper-layer station (not illustrated) among the signals received from base stations 700, outputs the reception quality information to handover controller 802 and outputs the frequency information to frequency selector 804.

Handover controller 802 determines whether a handover is necessary based on the reception quality information on base stations 700 outputted from receiver 801, then selects handover-destination base station 700 when a handover is necessary, and outputs a signal indicating the result of selection to indication-signal generator 803 and frequency selector 804.

Indication-signal generator 803 generates, with reference to the result of selection outputted from handover controller 802, an indication signal indicating transmission of the frequency information to handover source base station 700 (first base station) and handover destination base station 700 (second base station) and outputs the signal to transmitter 806.

Frequency selector 804 selects a systematic-bit mapping subband and a parity-bit mapping subband based on the frequency information on handover source base station 700 and handover destination base station 700 outputted from receiver 801 with reference to the result of selection outputted from handover controller 802, and outputs the signal indicating the result of selection to signal-assignment-information generator 805. Note that, a specific example of selection processing in frequency selector 804 will be described hereinafter.

Signal-assignment-information generator 805 generates signal assignment information indicating a systematic-bit mapping subband and a parity-bit mapping subband selected by frequency selector 804 and outputs the information to transmitter 806.

Transmitter 806 transmits transmission data to base station 700 in communication with mobile station 200. Transmitter 806 transmits an indication signal indicating transmission of frequency information outputted from indication-signal generator 803 to handover source and handover destination base stations 700. Transmitter 806 transmits the signal assignment information outputted from signal-assignment-information generator 805 to handover destination and handover source base stations 700.

Figure 29:
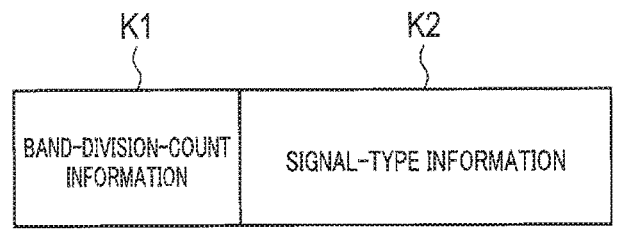
FIG. 29 is a diagram illustrating a format of signal assignment information according to Embodiment 9 of the present invention.

As illustrated in FIG. 29, the signal assignment information contains band-division-count information K1 indicating the number of subbands into which a band is divided, and signal-type information K2 indicating a signal type of each subband as to whether the assigned signal is systematic bits or parity bits. This signal assignment information may be always indicated by base station 700 to mobile station 200, or controller 800 may instruct base station 700 to indicate the information only when mobile station 200 is in the vicinity of a cell boundary. However, in terms of reducing the amount of control signals between controller 800 and base station 700, it is favorable to indicate the information only when mobile station 200 exists in the vicinity of the cell boundary.

Moreover, the present invention can be applied to the case where multiple data streams are transmitted simultaneously using multiple frequencies. In this case, for the purpose of switching streams to be assigned between frequencies, it is preferable that the signal assignment information illustrated in FIG. 29 include information indicating to which frequencies the signals assigned to subbands are originally assigned (signal-attribute information).

[Operation of Base Station in Communication with Mobile Station]

Figure 30:
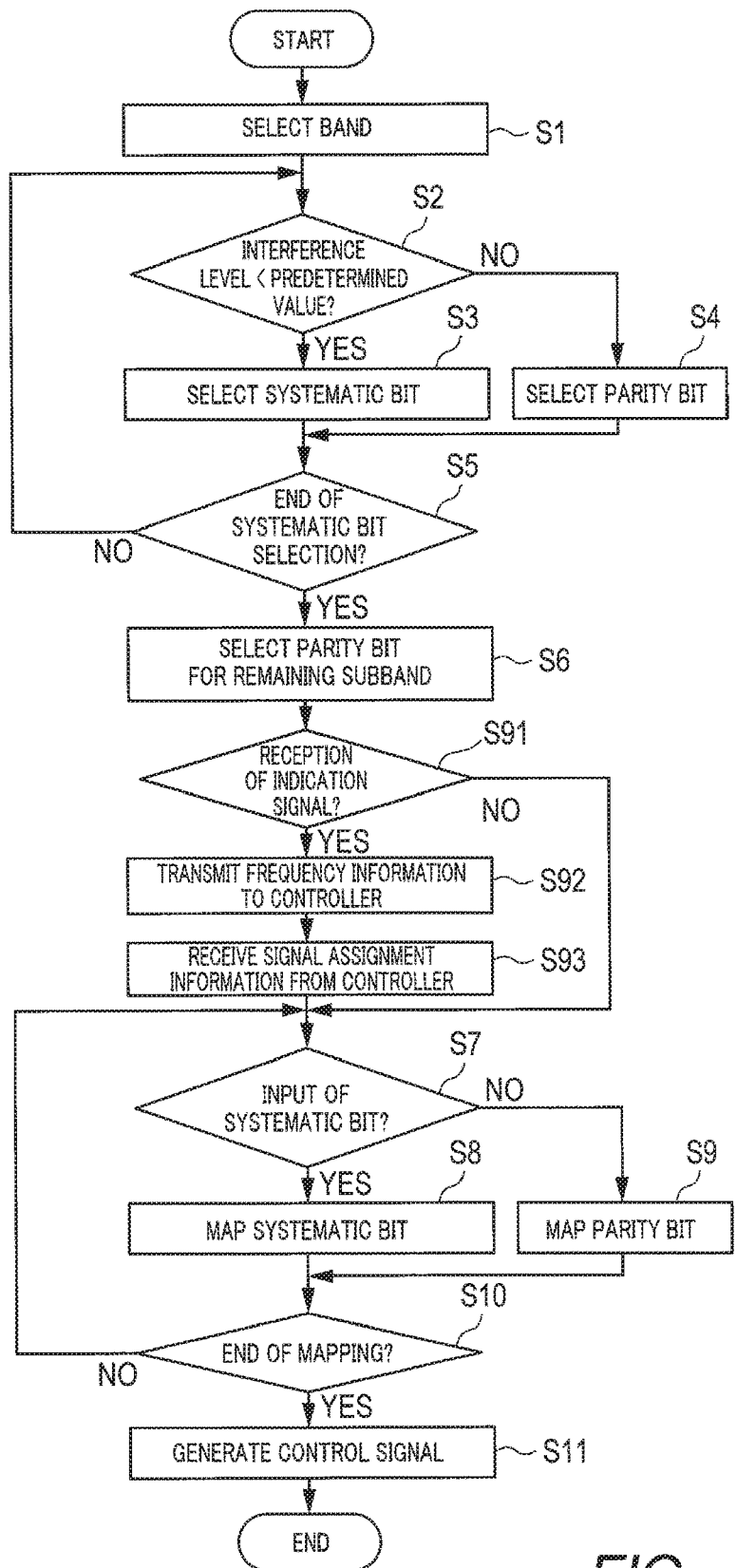
FIG. 30 is a flowchart illustrating an operation of a handover source base station according to Embodiment 9 of the present invention.

Hereinafter, a detailed description will be given of an operation of base station 700 in communication with mobile station 200 according to Embodiment 9 with reference to FIG. 30. Base station 700 in communication with mobile station 200 is a handover source base station. Note that, in FIG. 30, the steps identical to those in FIG. 3 are assigned the same reference numerals and will not be described herein. The flow illustrated in FIG. 30 adopts a configuration obtained by adding steps S91, S92, and S93 between steps S6 and S7 in FIG. 3.

After S6, frequency selector 701 outputs frequency information indicating a systematic-bit mapping subband and a parity-bit mapping subband (first frequency information) to controller communicator 702.

When receiving an indication signal from controller 800 (S91: YES), controller communicator 702 transmits the frequency information (first frequency information) to controller 800 (S92).

Next, controller communicator 702 receives signal assignment information from controller 800 (S93).

Note that, when not receiving an indication signal from controller 800 (S91: NO), controller communicator 702 uses the frequency information as the signal assignment information and advances the flow to S7.

[Operation of Controller]

Figure 31:
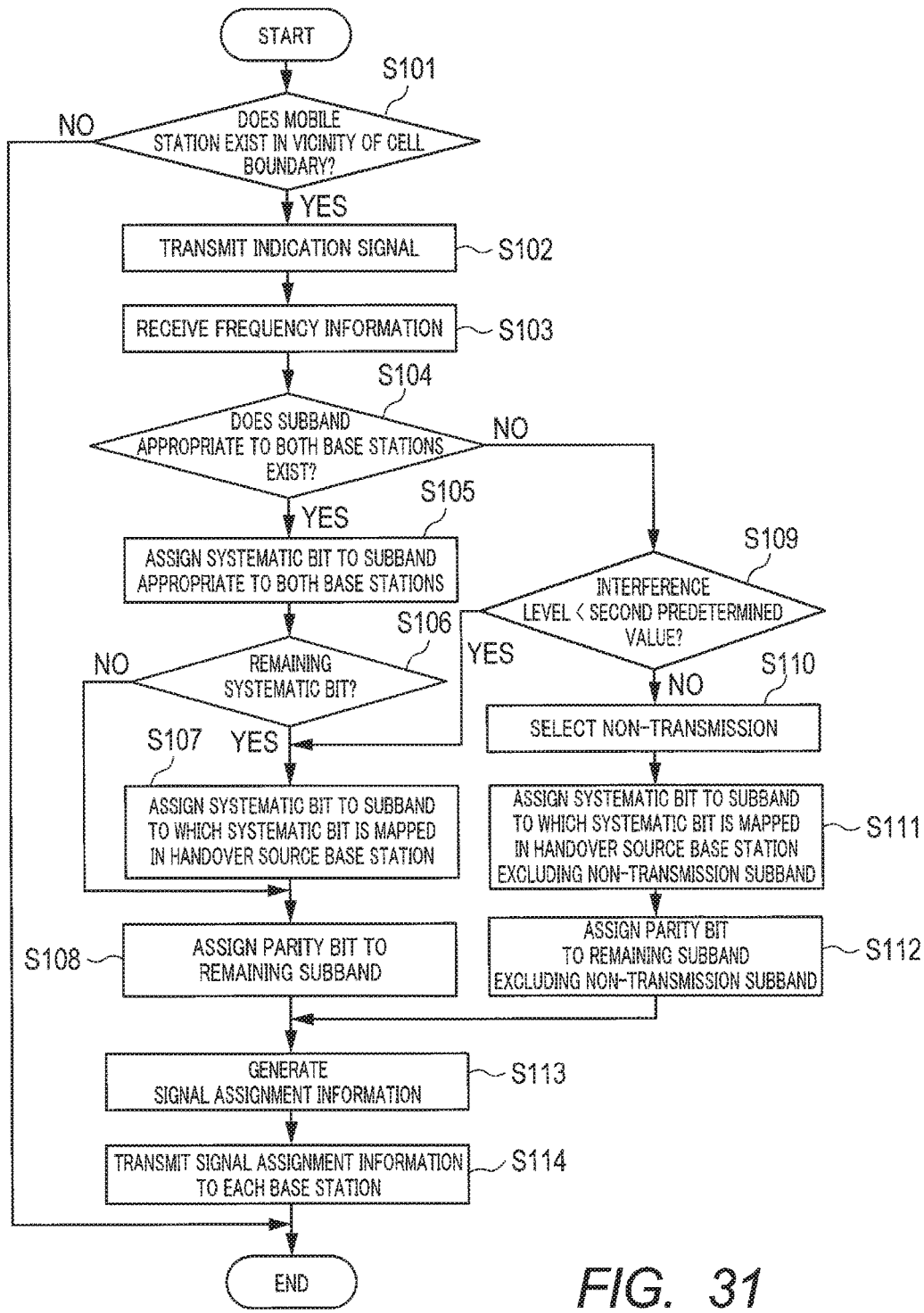
FIG. 31 is a flowchart illustrating an operation of the controller according to Embodiment 9 of the present invention.

Hereinafter, a detailed description will be given of an operation of controller 800 according to Embodiment 9 with reference to FIG. 31.

Handover controller 802 determines whether mobile station 200 within the cell of each base station 700 exists in the vicinity of the cell boundary based on the reception quality information acquired from each base station 700 via receiver 801 (S101).

Controller 800 ends the operation when mobile station 200 within the cell of each base station 700 does not exist in the vicinity of the cell boundary (S101: NO).

Meanwhile, when mobile station 200 within the cell of each base station 700 exists in the vicinity of the cell boundary (S101: YES), controller 800 transmits an indication signal to base station 700 in communication with mobile station 200, and handover destination base station 700 (S102). Whether mobile station 200 exists in the vicinity of the cell boundary can be determined based on reception power information and/or position information (e.g., position detected by a GPS or the like) of mobile station 200.

Next, receiver 801 receives frequency information of handover source base station 700 and handover destination base station 700 (S103).

Next, frequency selector 804 determines whether a subband appropriate to both base stations 700 is present with reference to the frequency information on both of the selected base stations 700 (S104). The subband appropriate to both base stations 700 is a systematic-bit mapping subband of handover source base station 700 and has an interference level lower than a predetermined value in handover destination base station 700 (hereinafter, referred to as a "condition-1 satisfying subband") or a subband having an interference level lower than the predetermined value in both base stations 700 (hereinafter, referred to as a "condition-2 satisfying subband").

When a subband appropriate to both base stations 700 is present (S104: YES), frequency selector 804 assigns systematic bits to the subband (S105). In this case, frequency selector 804 assigns systematic bits preferentially to a condition-1 satisfying subband over a condition-2 satisfying subband.

Next, frequency selector 804 determines whether there are remaining systematic bits that have not been assigned to any subband yet (S106).

When there are remaining systematic bits (S106: YES), frequency selector 804 assigns systematic bits to a subband to which systematic bits are mapped in handover source base station 700, with reference to the frequency information on handover source base station 700 (S107).

Meanwhile, frequency selector 804 advances the flow to S108 when there are no remaining systematic bits (S106: NO).

Next, frequency selector 804 assigns parity bits to a remaining subband to which no systematic bits have been assigned (S108), and advances the flow to S113.

When there is no subband appropriate to both base stations 700 (S104: NO), frequency selector 804 determines whether the interference level of each subband is less than a second predetermined value (second predetermined value>predetermined value) for each subband, with reference to the frequency information on both base stations 700 (S109).

Next, when the interference levels of all subbands are less than the second predetermined value (S109: YES), frequency selector 804 advances the flow to S107.

Next, when there is a subband having an interference level equal to or greater than the second predetermined value (S109: NO), frequency selector 804 selects non-transmission for the subband (S110).

Next, frequency selector 804 assigns, with reference to the frequency information on handover source base station 700, systematic bits to a subband to which systematic bits are mapped in handover source base station 700 excluding the subband for which non-transmission has been selected (S111).

Next, frequency selector 804 assigns systematic bits to a remaining subband to which no systematic bits have been assigned, excluding a subband for which non-transmission has been selected (S112).

Next, signal-assignment-information generator 805 generates signal assignment information (S113).

Next, transmitter 806 transmits signal assignment information to handover source base station 700 and handover destination base station 700 (S114).

[Specific Example of Selection Processing in Frequency Selector]

Next, a description will be given of a specific example of selection processing in frequency selector 804 with reference to FIGS. 32A to 35C.

Figure 32A:
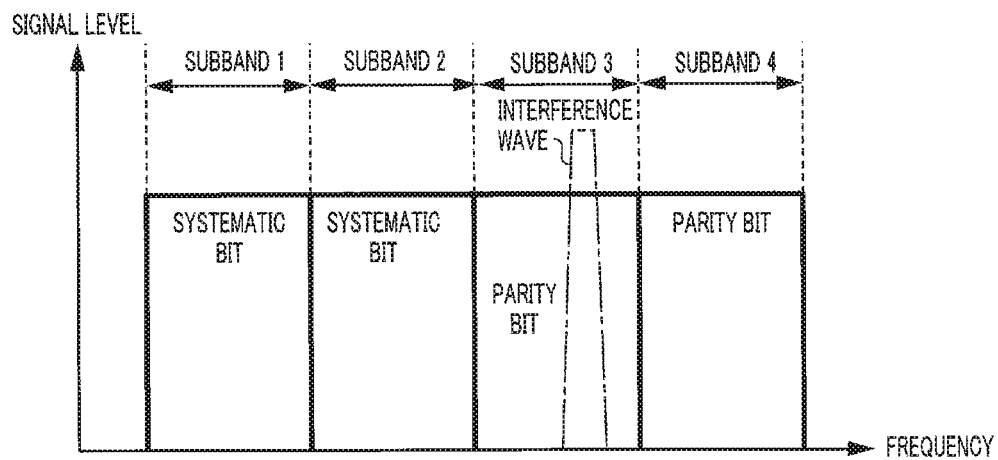
FIGS. 32A, 32B, and 32C illustrate a first specific example of subband assignment according to Embodiment 9 of the present invention.
Figure 32B:
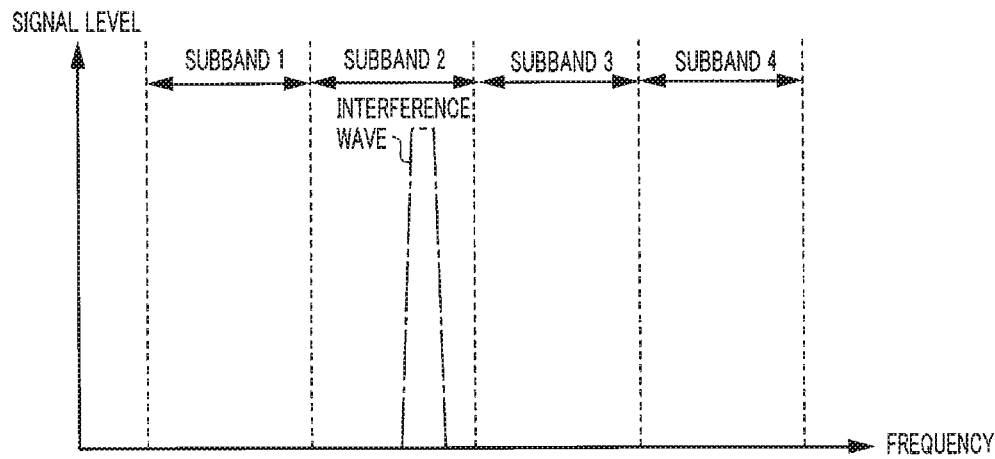
Figure 32C:
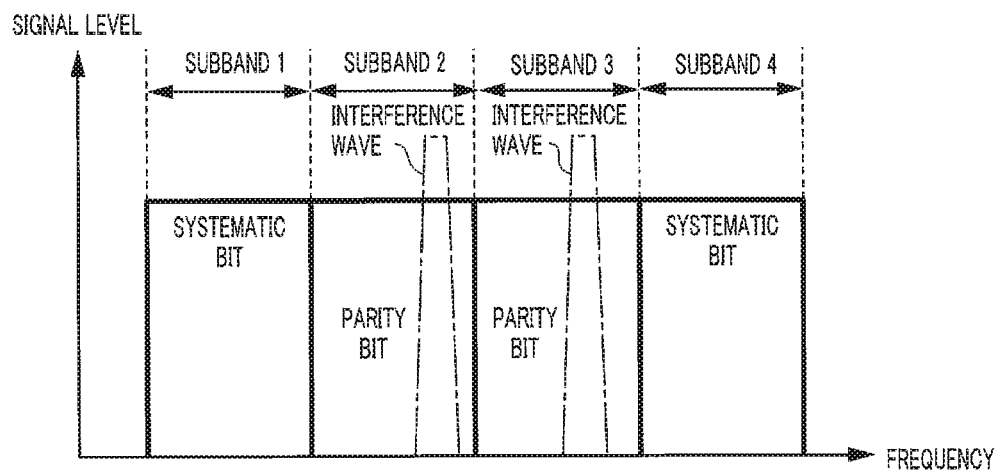

FIGS. 32A to 32C illustrate an example of a case where the number of subbands having an interference level less than a predetermined value is equal to or greater than the number required for assigning systematic bits ("two" in FIGS. 32A to 32C). FIG. 32A indicates frequency information on current (before handover starts) handover source base station 700 (first frequency information), while FIG. 32B indicates frequency information on handover destination base station 700 (second frequency information), and FIG. 32C illustrates assignment of frequency information when the handover starts.

FIG. 32A illustrates a case where only the interference level of subband 3 is equal to or greater than a predetermined value, while FIG. 32B illustrates a case where only the interference level of subband 2 is equal to or greater than a predetermined value. In these cases, frequency selector 804 selects subband 1 which is a condition-1 satisfying subband, and also selects subband 4 which is a condition-2 satisfying subband. Frequency selector 804 assigns systematic bits to selected subbands 1 and 4 as illustrated in FIG. 32C. Frequency selector 804 assigns parity bits to remaining subbands 2 and 3 to which no systematic bits have been assigned.

In this case, it is possible to always assign systematic bits to a subband having an interference level less than a predetermined value in both handover source and handover destination base stations 700 during handover. Thus, it is possible to suppress a decrease in communication quality.

Figure 33A:
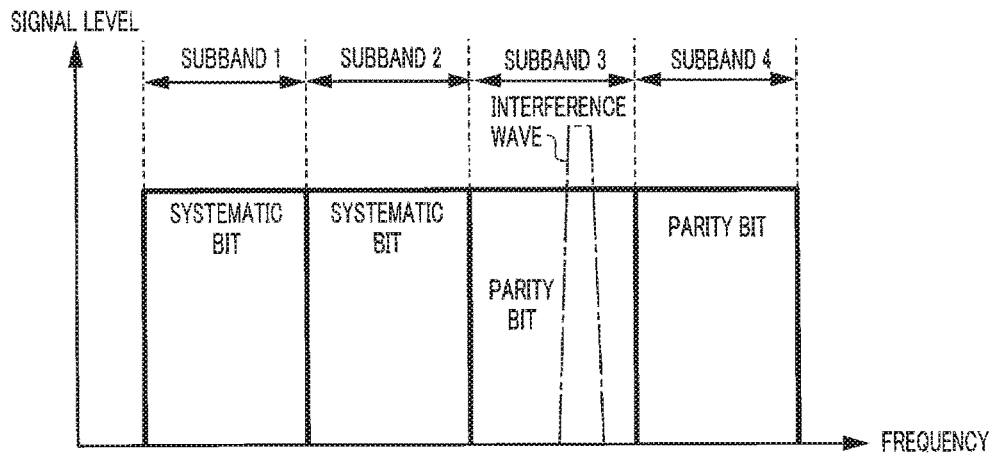
FIGS. 33A, 33B, and 33C illustrate a second specific example of the subband assignment according to Embodiment 9 of the present invention.
Figure 33B:
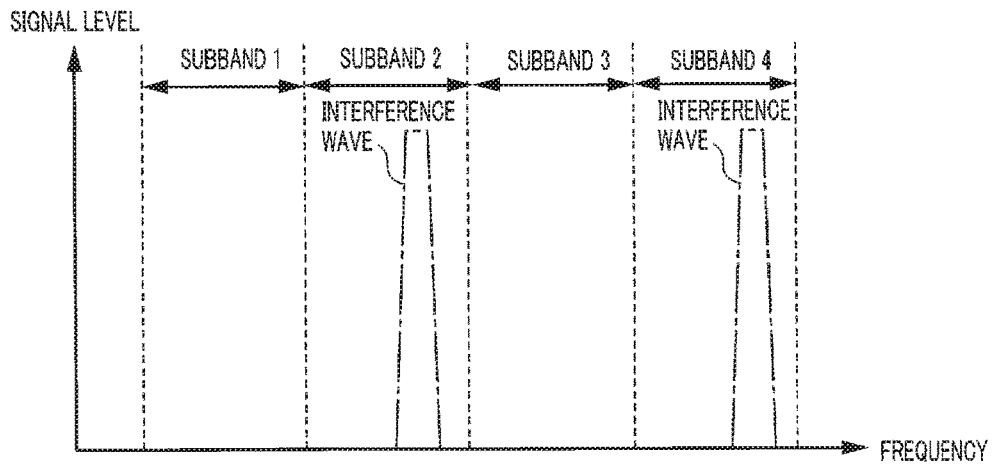
Figure 33C:
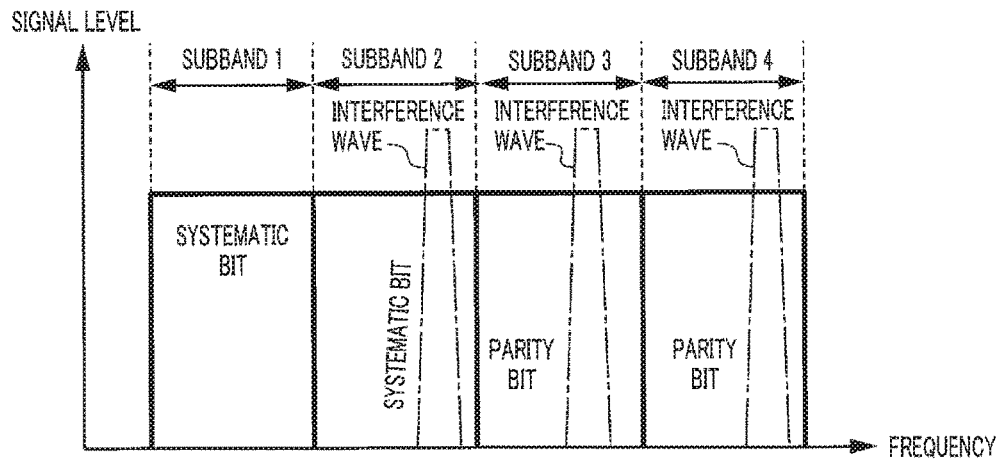

FIGS. 33A to 33C illustrate a case where the number of subbands having an interference level less than a predetermined value is less than the number required for assigning systematic bits ("two" in FIGS. 33A to 33C). FIG. 33A indicates frequency information on current (before handover starts) handover source base station 700 (first frequency information), while FIG. 33B indicates frequency information on handover destination base station 700 (second frequency information), and FIG. 33C illustrates assignment of frequency information when the handover starts.

FIG. 33A illustrates a case where the interference level of subband 3 is equal to or greater than a predetermined value, while FIG. 33B illustrates a case where only the interference levels of subbands 2 and 4 are equal to or greater than a predetermined value. In these cases, frequency selector 804 selects subband 1 which is a condition-1 satisfying subband as a subband appropriate to both base stations 700. Frequency selector 804 assigns systematic bits to selected subband 1 as illustrated in FIG. 33C.

In case of FIGS. 33A to 33C, there is no appropriate subband except for subband 1 while remaining systematic bits are present. Thus, frequency selector 804 assigns remaining systematic bits to subband 2 to which systematic bits are mapped in handover source base station 700. Frequency selector 804 assigns parity bits to remaining subbands 3 and 4 to which no systematic bits have been assigned.

In this case, some systematic bits are assigned to a subband having an interference level less than a predetermined value, and the mapping of remaining systematic bits is not changed from the mapping before handover. Thus, it is possible to suppress a decrease in communication quality and to reduce the processing to change mapping, thus making it possible to reduce the processing load.

Figure 34A:
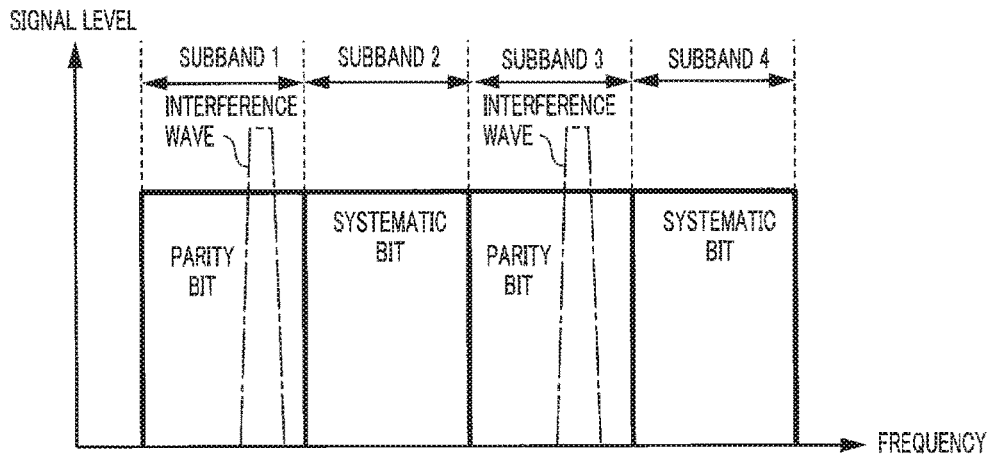
FIGS. 34A, 34B, and 34C illustrate a third specific example of the subband assignment according to Embodiment 9 of the present invention.
Figure 34B:
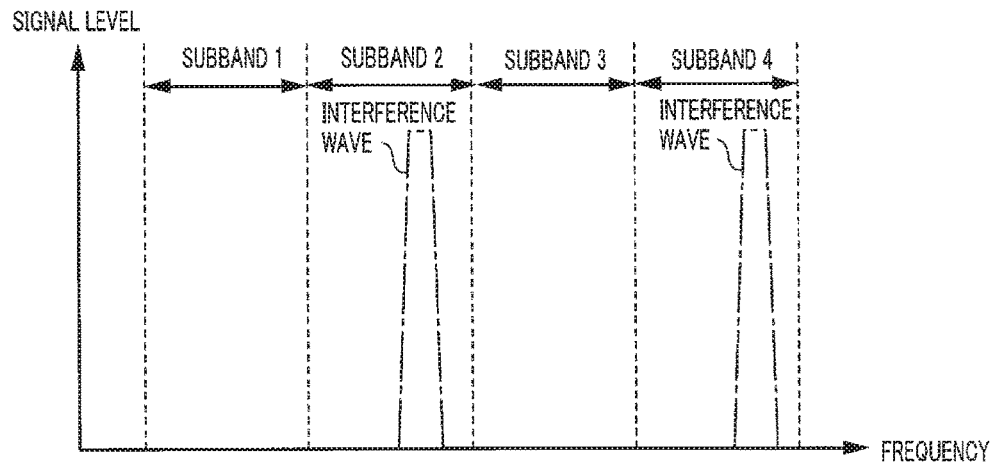
Figure 34C:
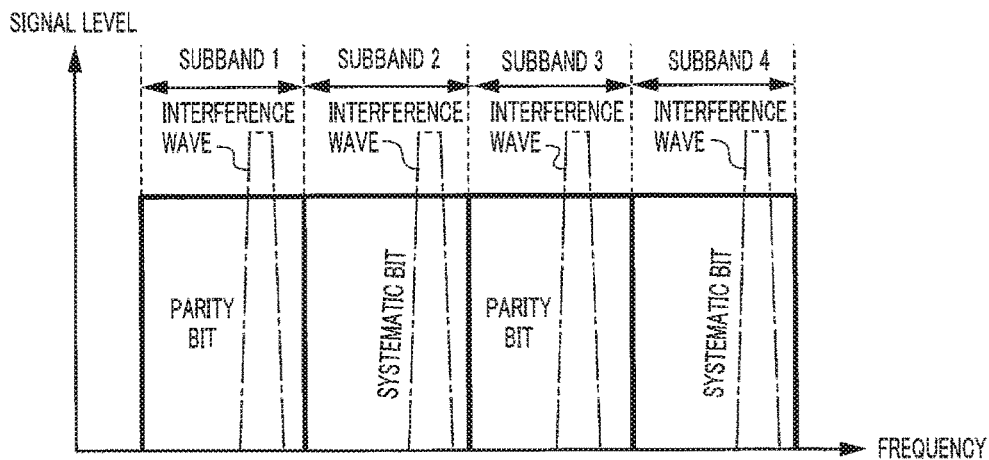

FIGS. 34A to 34C illustrate an example of a case where there is no subband having an interference level less than a predetermined value in either one of base stations 700. FIG. 34A illustrates the frequency information on current (before handover starts) handover source base station 700 (first frequency information), while FIG. 34B indicates frequency information on handover destination base station 700 (second frequency information), and FIG. 34C illustrates assignment of frequency information when the handover starts.

FIG. 34A illustrates a case where the interference levels of subbands 1 and 3 are equal to or greater than a predetermined value, while FIG. 34B illustrates a case where the interference levels of subbands 2 and 4 are equal to or greater than a predetermined value. In these cases, as illustrated in FIG. 34C, frequency selector 804 assigns systematic bits to subbands 2 and 4 to which systematic bits are mapped in handover source base station 700. Frequency selector 804 assigns parity bits to remaining subbands 1 and 3 to which no systematic bits are assigned.

In this case, during handover, the mapping of all systematic bits is not changed from the mapping before handover, so that it is possible to reduce the processing to change mapping, thus making it possible to reduce the processing load.

Figure 35A:
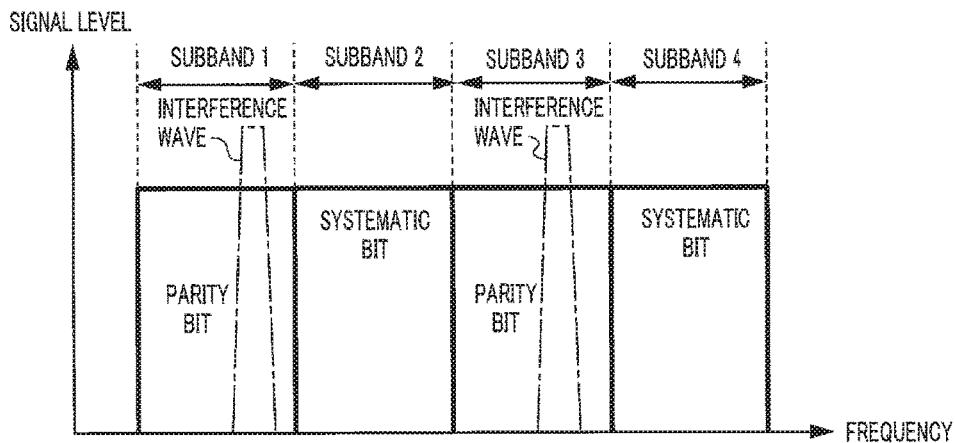
FIGS. 35A, 35B, and 35C illustrate a fourth specific example of the subband assignment according to Embodiment 9 of the present invention.
Figure 35B:
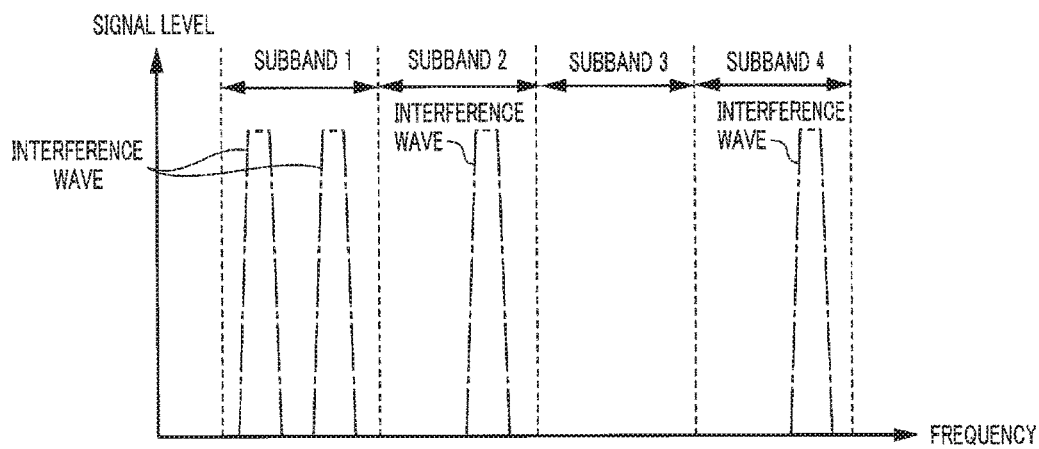
Figure 35C:
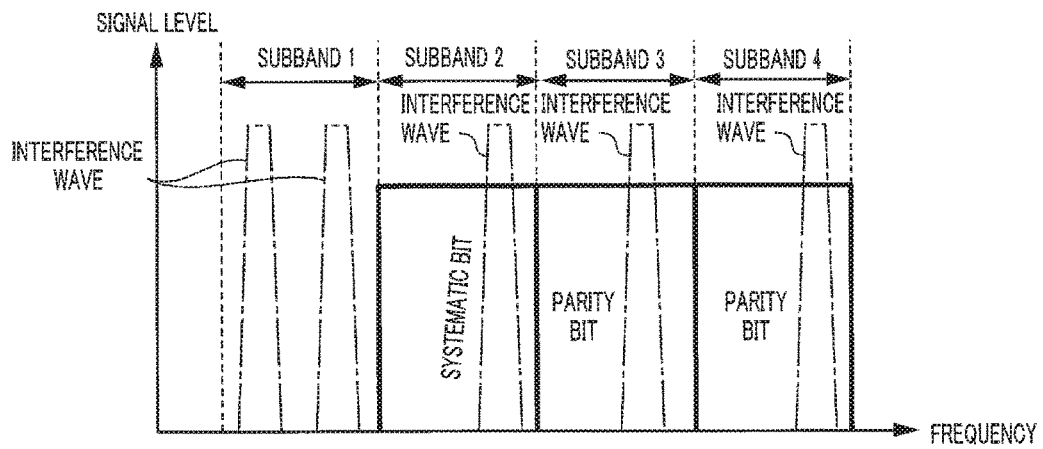

FIGS. 35A to 35C illustrate an example of a case where there is no subband having an interference level less than a predetermined value in either one of base stations 700, but a subband having an interference level equal to or greater than a second predetermined value is present. FIG. 35A illustrates the frequency information on current (before handover starts) handover source base station 700 (first frequency information), while FIG. 35B indicates frequency information on handover destination base station 700 (second frequency information), and FIG. 35C illustrates assignment of frequency information when the handover starts.

FIG. 35A illustrates a case where the interference levels of subbands 1 and 3 are equal to or greater than a predetermined value while FIG. 35B illustrates a case where the interference levels of subbands 1, 2, and 4 are equal to or greater than a predetermined value, and the interference level of subband i is equal to or greater than a second predetermined value. In these cases, as illustrated in FIG. 35C, frequency selector 804 selects non-transmission (i.e., neither systematic bits nor parity bits are mapped) for subband 1 having an interference level equal to or greater than the second predetermined value. As illustrated in FIG. 35C, frequency selector 804 assigns systematic bits to, other than subband 1, subband 2 to which systematic bits are mapped in handover source base station 700, and assigns parity bits to remaining subbands 3 and 4.

In this case, base station 700 lowers the transmission rate of transmission data or raises the transmission power in association with a reduction in the number of subbands to which systematic bits are mapped. Thus, it is possible to suppress a decrease in communication quality.

[Effects]

As described above, according to Embodiment 9, the carrier frequency for systematic-bit mapping and the carrier frequency for parity-bit mapping are selected based on the frequency information indicating a carrier frequency having an interference level lower than a threshold among the carrier frequencies of an unused frequency band, received from base station 700 in communication with a mobile station, and handover destination base station 700. Accordingly, it is possible to suppress a decrease in communication quality and to improve the communication quality even when some of the frequency band to be used has interference in a case where turbo coding and handover are combined with multicarrier communication using some of a frequency band shared with another system.

According to Embodiment 9, when the number of carrier frequencies having an interference level lower than a threshold in both handover source and handover destination base stations does not satisfy the number required for assigning systematic bits, for example, preferentially assigning systematic bits to carrier frequencies used for mapping by the handover source base station makes it possible to reduce the processing to change the mapping as much as possible to reduce the processing load in the handover source base station, and to suppress a decrease in communication quality since a change in mapping of systematic bits from the mapping before handover is avoided as much as possible.

Note that, in Embodiment 9, although a description has been given of a case where both base station 700 and mobile station 200 individually transmit data (OFDM signals), the present invention is not limited to this case and can be applied to a case where the base station transmits only a control signal to the mobile station without transmitting data in downlink while the mobile station transmits data to the base station in the uplink.

Embodiment 10

In Embodiment 10, a description will be given of a case where the frequency of handover is taken into consideration when a mobile station selects a systematic-bit mapping subband and a parity-bit mapping subband.

In Embodiment 10, the descriptions of the configurations of a communication system, a base station, and a mobile station, and the operation of the base station in communication with the mobile station are identical to those illustrated in Embodiment 9, and thus will not be described herein.

[Configuration of Controller]

Figure 36:
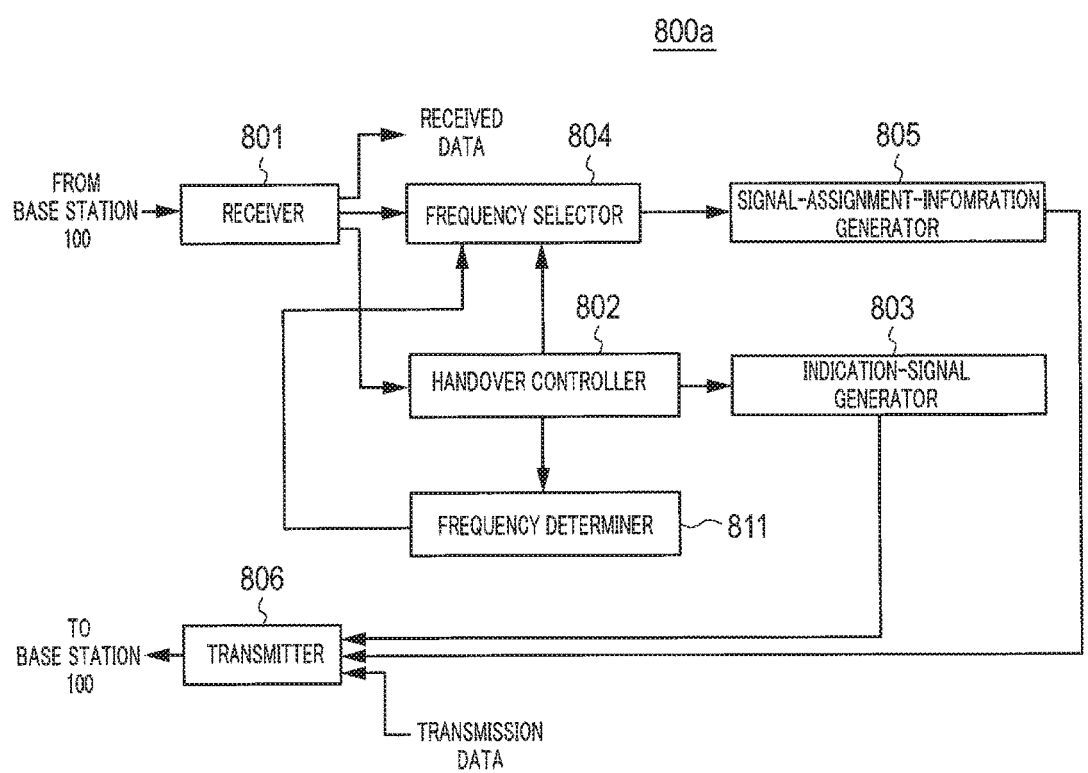
FIG. 36 is a block diagram illustrating a configuration of a controller according to Embodiment 10 of the present invention.

Next, a detailed description will be hereinafter given of the configuration of controller 800a according to Embodiment 10 with reference to FIG. 36. Note that, in controller 800a illustrated in FIG. 36, the configuration portions common to controller 800 illustrated in FIG. 28 are assigned the reference numerals identical to those used in FIG. 28, and thus will not be described herein. Controller 800a illustrated in FIG. 36 adopts a configuration obtained by adding frequency determiner 811 to the configuration of controller 800 illustrated in FIG. 28.

Handover controller 802 has a function to output, when determining that handover is necessary, a signal for indicating handover source base station 700, handover destination base station 700, and execution of handover to frequency determiner 811, in addition to the functions described in Embodiment 9.

Frequency determiner 811 calculates the frequency of handover executed between handover source base station 700 and handover destination base station 700 (time from the last handover until the handover this time and/or the number of handovers executed within a predetermined time, for example) from handover controller 802. Frequency determiner 811 determines whether the frequency of handover is equal to or greater than reference frequency and outputs the result of determination to frequency selector 804.

Frequency selector 804 selects a systematic-bit mapping subband and a parity-bit mapping subband based on the frequency information on handover source base station 700 and handover destination base station 700 outputted from receiver 801, and the result of determination of frequency determiner 811, and outputs a signal indicating the result of selection to signal-assignment-information generator 805. Note that, a specific example of the selection processing in frequency selector 804 will be described hereinafter.

[Operation of Controller]

Hereinafter, a detailed description will be given of an operation of controller 800a according to Embodiment 10 with reference to FIGS. 37A and 37B. Note that, in the flow of FIGS. 37A and 37B, the steps common to the flow illustrated in FIG. 31 are assigned the reference numerals identical to those in FIG. 31 and thus will not be described herein. Steps S121, S122, S123, and S124 illustrated in FIG. 31 are added to the flow of FIGS. 37A and 37B.

When the result of determination in step S106 is "YES," or when the result of determination in step S109 is "YES," frequency selector 804 determines whether or not the result of determination indicates that the frequency of handover is equal to or greater than a reference frequency (S121).

When the frequency of handover is less than the reference frequency (S121: NO), the flow advances to step S107. Meanwhile, when the frequency of handover is equal to or greater than the reference frequency (S121: YES), frequency selector 804 assigns systematic bits alternately to a subband to which systematic bits are mapped in handover source base station 700 and a subband appropriate to handover destination base station 700, with reference to the frequency information on handover source base station 700 and handover destination base station 700 (S122). After step S122, the flow advances to step S108.

After step S110, frequency selector 804 determines whether or not the result of determination of frequency determiner 811 indicates that the frequency of handover is equal to or greater than the reference frequency (S123).

When the frequency of handover is less than the reference frequency (S123: NO), the flow advances to step S111. Meanwhile, when the frequency of handover is equal to or greater than the reference frequency (S123: YES), frequency selector 804 assigns systematic bits alternately to a subband to which systematic bits are mapped in handover source base station 700 and a subband appropriate to handover destination base station 700 except for a subband for which non-transmission has been selected, with reference to the frequency information on handover source base station 700 and handover destination base station 700 (S124). After step S124, the flow advances to step S112.

[Specific Example of Selection Processing in Frequency Selector]

Next, a description will be given of a specific example of selection processing in frequency selector 804 with reference to FIGS. 38A to 38D.

FIGS. 38A to 38D illustrate a case where there is no subband having an interference level less than a predetermined value in either one of base stations 700. FIG. 38A indicates frequency information on current (before handover starts) handover source base station 700 (first frequency information), while FIG. 38B indicates frequency information on handover destination base station 700 (second frequency information). FIG. 38C illustrates assignment of frequency information at the start of handover when the frequency of handover is less than the reference frequency, and FIG. 38D illustrates assignment of frequency information at the start of handover when the frequency of handover is equal to or greater than the reference frequency.

In FIG. 38A, as in FIG. 34A, the interference levels of subbands 1 and 3 are equal to or greater than a predetermined value, and in FIG. 38B, as in FIG. 34B, the interference levels of subbands 2 and 4 are equal to or greater than a predetermined value.

In these cases, when the frequency of handover is less than the reference frequency, frequency selector 804 assigns systematic bits to subbands 2 and 4 to which systematic bits are mapped in handover source base station 700 as illustrated in FIG. 38C (as in the case of FIG. 34C). Furthermore, frequency selector 804 assigns systematic bits to remaining subbands 1 and 3 to which no systematic bits have been assigned.

Meanwhile, when the frequency of handover is equal to or greater than the reference frequency, frequency selector 804 assigns systematic bits to subband 2 to which systematic bits are mapped in handover source base station 700 and to subband 3 having an interference level less than a predetermined value in handover destination base station 700 as illustrated in FIG. 38D. Frequency selector 804 assigns parity bits to remaining subbands 1 and 4 to which no systematic bits have been assigned.

In a case where most appropriate subbands are present in both handover source base station 700 and handover destination base station 700, systematic bits may be assigned to the most appropriate subbands in both base stations 700, first, and the operation described in Embodiment 10 may be performed when there are remaining systematic bits.

[Effects]

As described above, according to Embodiment 10, when the frequency of handover is equal to or greater than the reference frequency, systematic bits are alternately assigned to a subband to which systematic bits are mapped in handover source base station 700 and a subband appropriate to handover destination base station 700. Thus, no change in signal mapping to be triggered by handover occurs, so that, even when a handover is frequently performed between adjacent cells, there is no increase in the amount of control signals. Moreover, the frequency of degradation of transmission quality right after a handover can be reduced.

Embodiment 11

In the embodiments described above, a case has been described where controller 800 transmits an indication signal to base station 700 for each time in order to receive the frequency information from base station 700. In contrast to this, in Embodiment 11, a case will be described where transmitting an indication signal to base station 700 from controller 800 once allows for continuous reception of the frequency information from base station 700 that has received the indication signal.

[Operation of Base Station in Communication with Mobile Station]

Figure 39A:
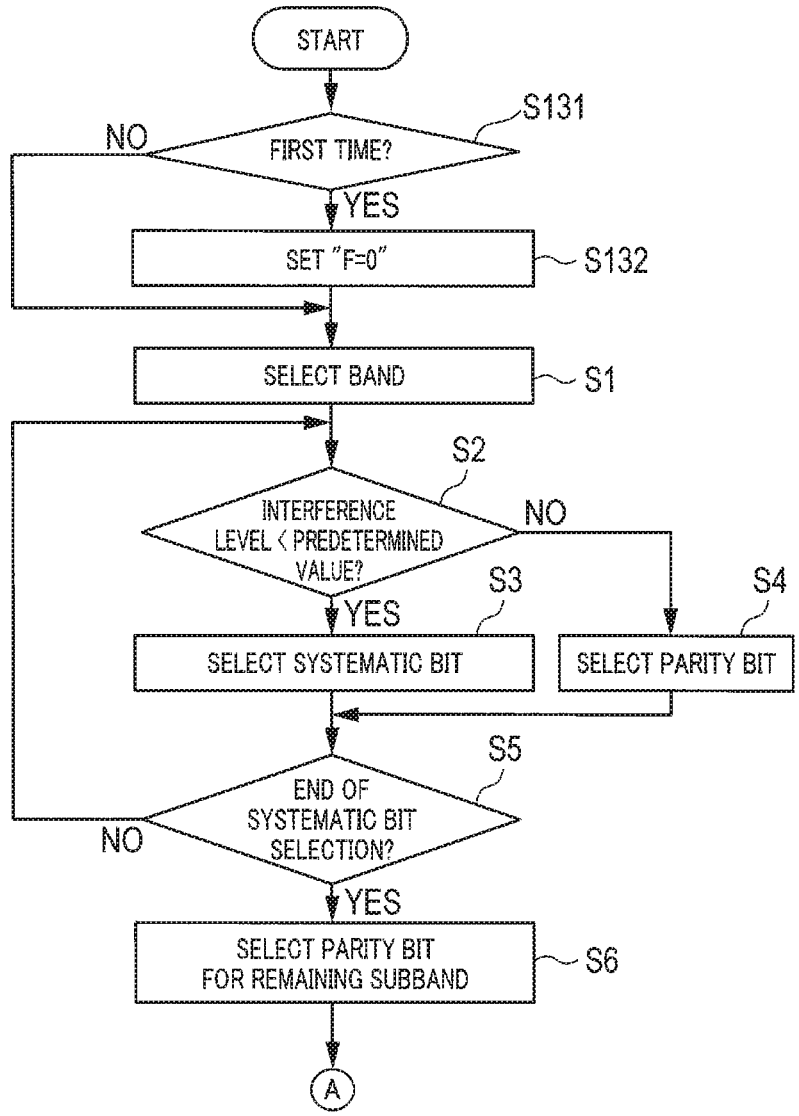
FIGS. 39A and 39B illustrate a flowchart of an operation of a handover source base station according to Embodiment 11 of the present invention.
Figure 39B:
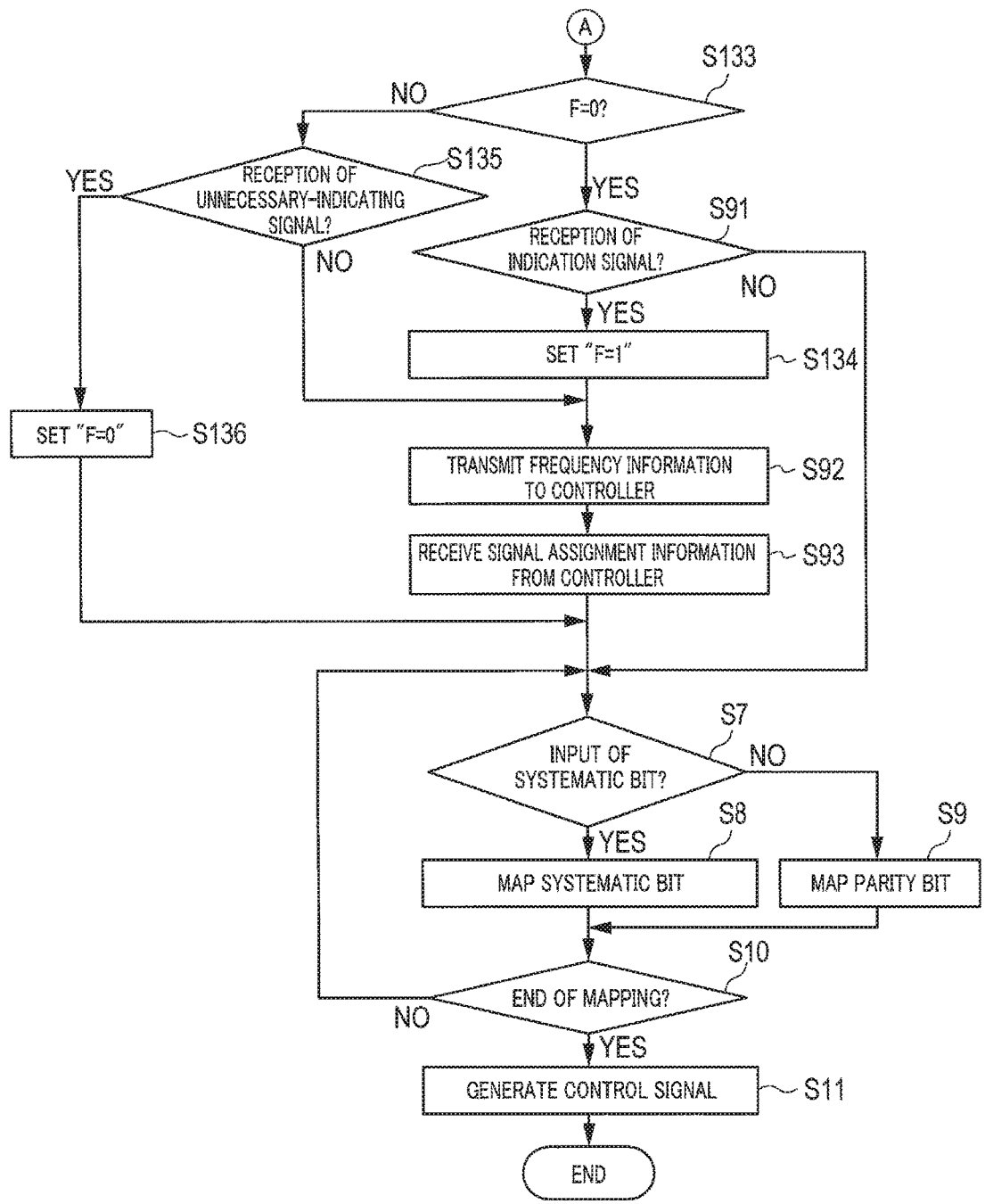

Hereinafter, a detailed description will be given of an operation of base station 700 according to Embodiment 11 with reference to FIGS. 39A and 39B. Note that, in the flow of FIGS. 39A and 39B, the steps common to the flow illustrated in FIG. 30 are assigned the reference numerals identical to those in FIG. 30 and thus will not be described herein. Steps S131, S132, S133, S134, S135, and S136 illustrated in FIG. 30 are added to the flow of FIGS. 39A and 39B. The reference sign "F" in FIGS. 39A and 39B denotes a flag. The term "F=0" indicates a state where base station 700 has not received the indication signal and a state where base station 700 receives an unnecessity-indicating signal that indicates transmission of frequency information has become unnecessary and returns to the state where base station 700 has not received the indication signal. The term "F=1" indicates a state where base station 700 has received the indication signal.

In the initial band selection (S131: YES), controller communicator 702 sets flag F to "0" (S132). In the second and subsequent band selection (S131: NO), the last set value of flag F is kept. In this state, the flow proceeds to step S1.

When "F=0" (the state where the indication signal has not been received) after S6 (S133: YES), as in FIG. 30, the flow advances to step S91, and upon reception of an indication signal from controller 800 (S91: YES), controller communicator 702 sets flag F to "1" (S134) and transmits frequency information (first frequency information) to control station 800 (S92).

Meanwhile, when "F=1" (the state where the indication signal has been received) after S6 (S133: NO), and when an unnecessity-indicating signal has not been received from controller 800 (S135: NO), the flow proceeds to step 92, and controller communicator 702 transmits the frequency information (first frequency information) to controller 800 (S92). Note that, when receiving an unnecessity-indicating signal from controller 800 (S135: YES), controller communicator 702 sets flag F to "0" (S136) and does not transmit the frequency information (first frequency information) to controller 800. In this case, the flow proceeds to step S7.

[Operation of Controller]

Figure 40A:
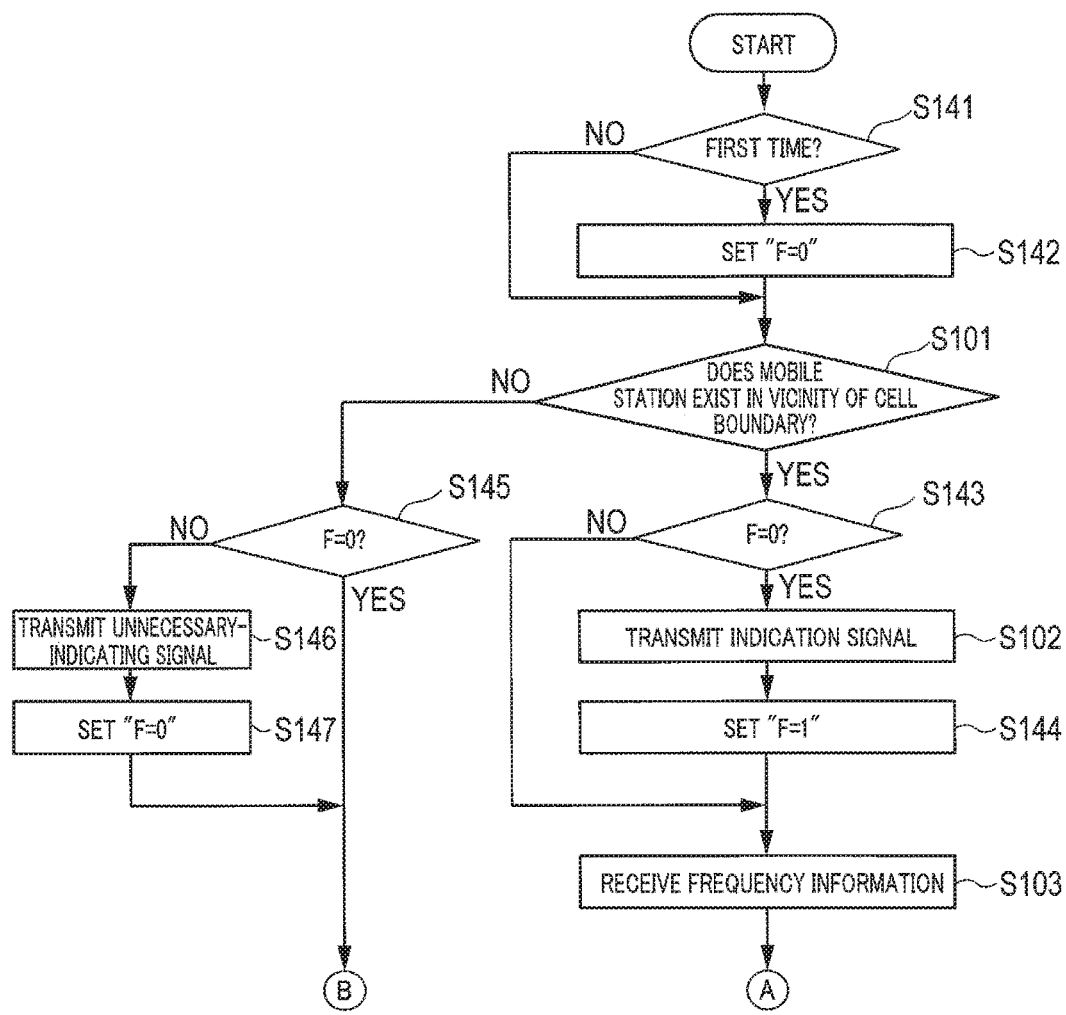
FIGS. 40A and 40B illustrate a flowchart of an operation of a controller base station according to Embodiment 11 of the present invention.
Figure 40B:
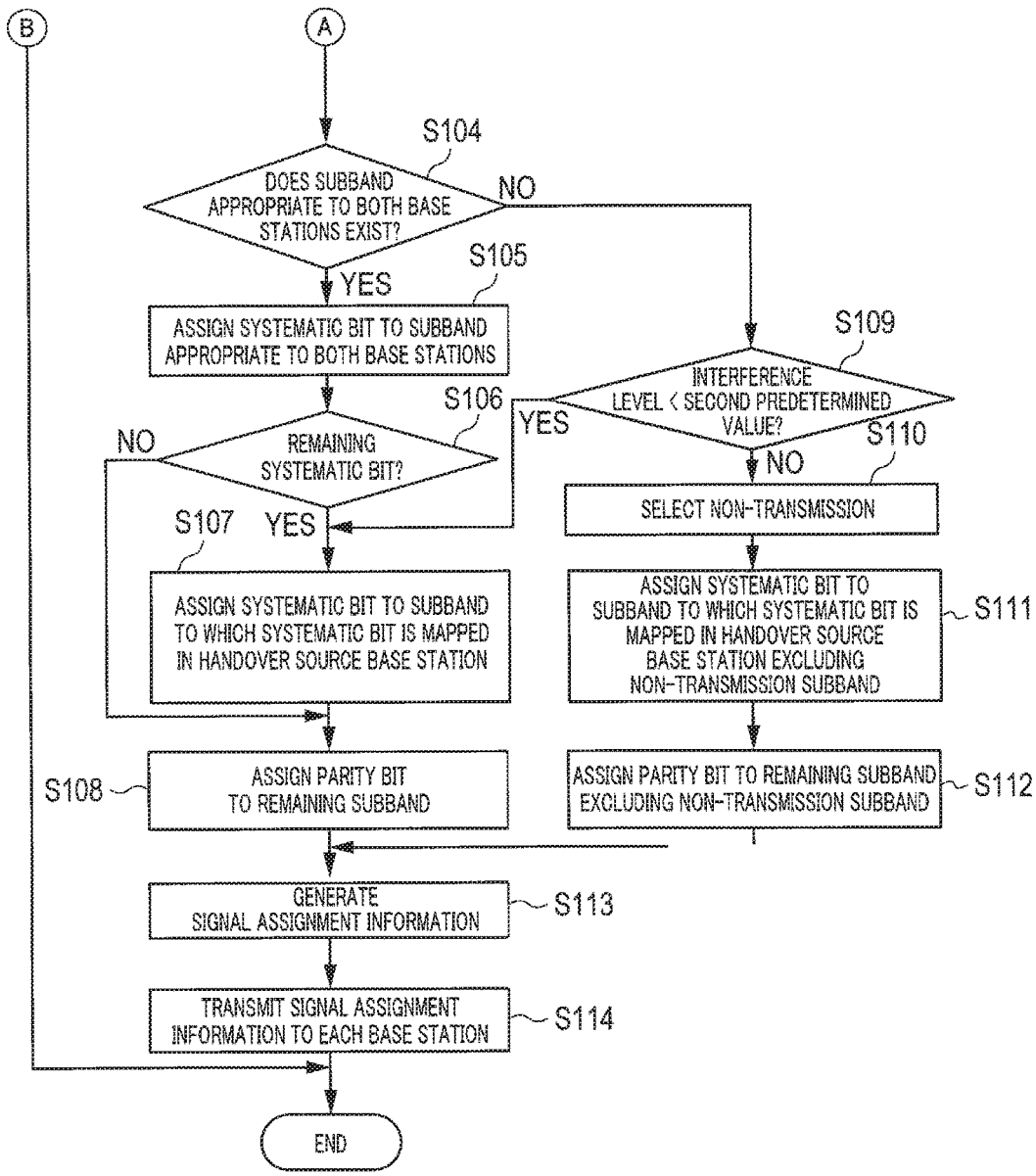

Hereinafter, a detailed description will be given of an operation of controller 800 according to Embodiment 11 with reference to FIGS. 40A and 40B. Note that, in the flow of FIGS. 40A and 40B, the steps common to the flow illustrated in FIG. 31 are assigned the reference numerals identical to those in FIG. 31 and thus will not be described herein. Steps S141, S142, S143, S144, S145, S146, and S147 illustrated in FIG. 31 are added to the flow of FIGS. 40A and 40B. The reference sign "F" in FIGS. 40A and 40B denotes a flag. The term "F=0" indicates a state where controller 800 has not transmitted an indication signal and indicates a state where controller 800 transmits an unnecessity-indicating signal and returns to the state where controller 800 has not transmitted an indication signal. The term "F=1" indicates a state where controller 800 has transmitted an indication signal.

In the initial band selection (S141: YES), controller 800 sets flag F to "0" (S142). In the second and subsequent band selection (S141: NO), the last set value of flag F is kept. In this state, the flow proceeds to step S101.

In a case where mobile station 200 within the cell of each base station 700 exists in the vicinity of the cell boundary (S101: YES), when "F=0" (the state where the indication signal has not been transmitted) (S143: YES), as in FIG. 31, the flow advances to step S102, and controller 800 transmits an indication signal to base station 700 in communication with mobile station 200 and handover destination base station 700 (S102), sets flag F to "1" (S144) and receives frequency information from base station 700 (S103).

Meanwhile, when "F=1" (the state where the indication signal has been transmitted) (S143: NO), the flow proceeds to step S103, and controller 800 receives frequency information from base station 700 (S103).

When "F=0" (the state where the indication signal has not been transmitted) (S145: YES) in a case where mobile station 200 within the cell of each base station 700 does not exist in the vicinity of the cell boundary (S101: NO), the operation ends as in FIG. 31.

Meanwhile, when "F=1" (the state where the indication signal has been transmitted) (S145: NO), controller 800 transmits an unnecessity-indicating signal to base station 700 (S146), sets flag F to "0" (S147) and ends the operation.

[Effects]

As described above, according to Embodiment 11, when controller 800 transmits an indication signal to base station 700 once, controller 800 can continuously receive the frequency information from base station 700 that has received the indication signal. Thus, the number of times of transmission and/or reception of the indication signal can be reduced when mobile station 200 in communication with base station 700 stays in the vicinity of the cell edge for a long time.

According to Embodiment 11, no transmission or reception of an indication signal to be triggered by handover occurs in any of the following cases where mobile station that has been handed over to an adjacent cell moves to the vicinity of the center of the cell from the vicinity of the cell edge of the handover destination, returns to the cell of the handover source, and moves in the vicinity of the boundary between the cells of the handover source and handover destination. Thus, an increase in the amount of control signals due to a handover can be prevented.

Figure 37A:
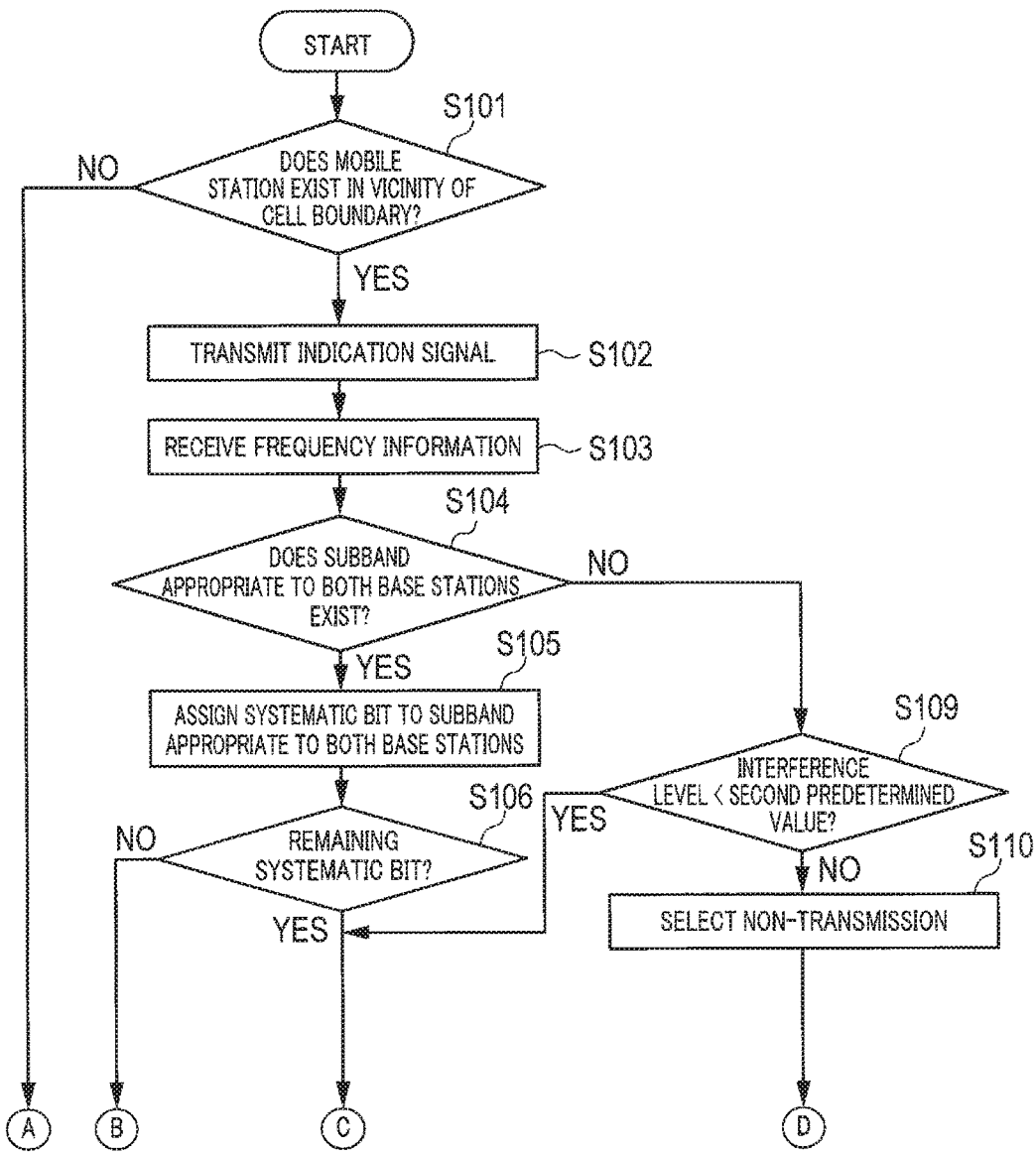
FIGS. 37A and 37B illustrate a flowchart of an operation of the controller according to Embodiment 10 of the present invention.
Figure 37B:
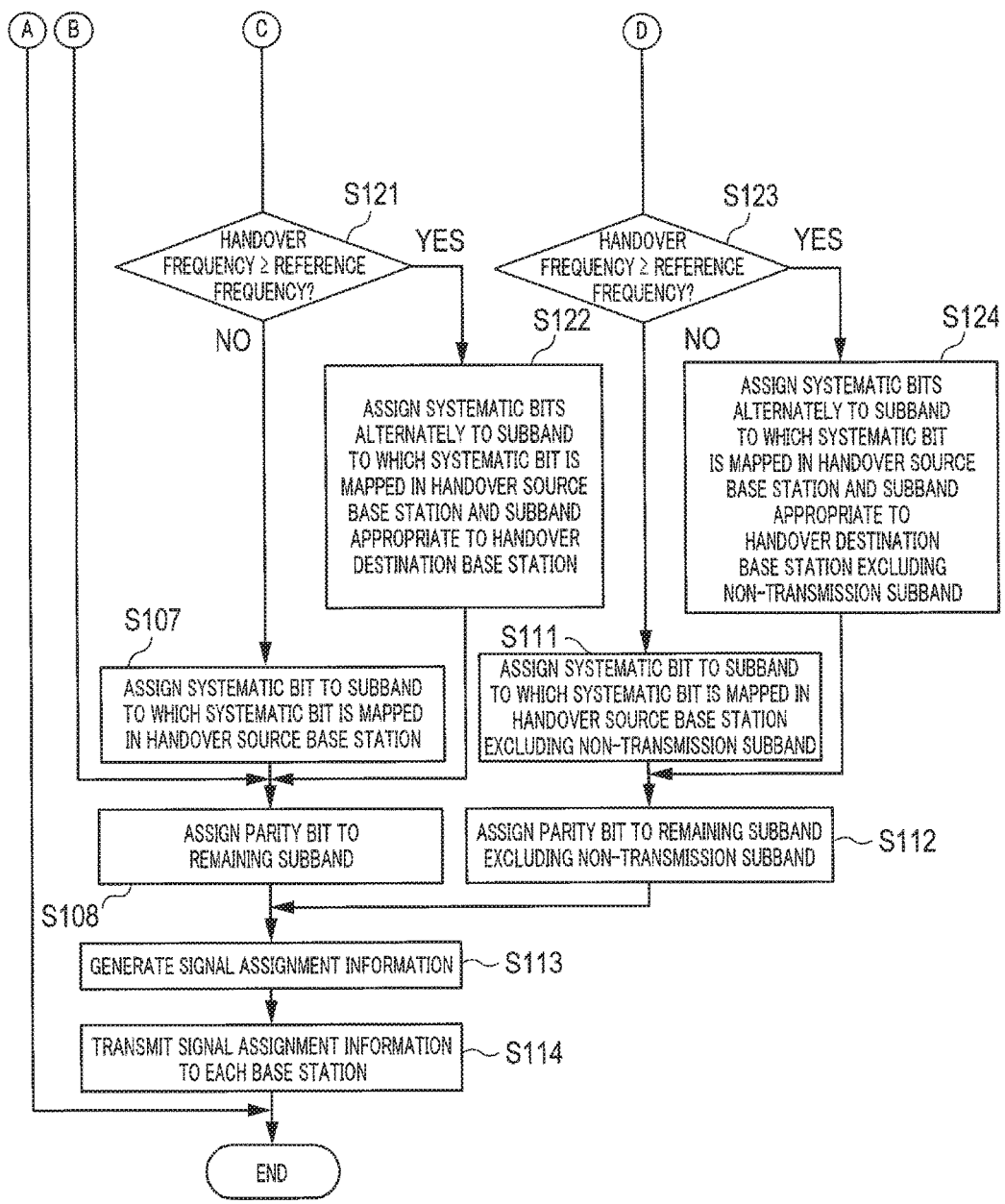

Note that, Embodiment 11 can be combined with Embodiment 10 by adding steps S141, S142, S143, S144, S145, S146, and S147 to the flow indicated by FIGS. 37A and 37B.

The present invention is by no means limited to the types or arrangement of components or the number of components mentioned in the embodiments described above, and can be modified as appropriate, such as replacement of configuration elements that bring about similar effects, within a range not departing from the gist of the invention.

INDUSTRIAL APPLICABILITY

The present invention is suitable for use in a base station that performs multicarrier communication using some carrier frequencies of a frequency band shared with another system.

REFERENCE SIGNS LIST 100, 300, 500, 700 Base station
101, 114, 201, 212 Antenna
102, 202, 801 Receiver
103, 203 Fourier transformer
104, 204 Demodulator
105, 205 Turbo decoder
106 Level measurer
107, 701 Frequency selector
108, 703 Control-signal generator
109, 207 Turbo coder
110, 208 Carrier-mapper
111, 209 Modulator
112, 210 Inverse Fourier transformer
113, 211, 806 Transmitter
200, 400, 600 Mobile station
206 Control-signal extractor
501, 601 Transmission-power configurator 702 Controller communicator
800, 800a Controller
802 Handover controller
803 Indication-signal generator
804 Frequency selector
805 Signal-assignment-information generator
811 Frequency determiner

The invention claimed is:

1. A base station that transmits an OFDM signal to a mobile station, using some carrier frequencies of a frequency band shared with another system, the base station comprising:
   a frequency selector that selects an unused frequency band not used by the other system in the frequency band, based on an interference level of the frequency band, selects a carrier frequency for systematic-bit mapping from among carrier frequencies each having the interference level lower than a threshold and selects a carrier frequency for parity-bit mapping from among carrier frequencies other than the carrier frequency for systematic-bit mapping in carrier frequencies of the unused frequency band;
   a turbo coder that performs turbo coding processing on transmission data and outputs a systematic bit and a parity bit;
   a carrier-mapper that maps the systematic bit to the carrier frequency for systematic-bit mapping and maps the parity bit to the carrier frequency for parity-bit mapping;
   a control-signal generator that generates a control signal containing frequency information indicating the carrier frequency for systematic-bit mapping and the carrier frequency for parity-bit mapping;
   an orthogonal frequency division multiplexer that generates the OFDM signal by performing orthogonal frequency division multiplexing processing on the systematic bit and the parity bit mapped to the carrier frequencies, and the control signal; and
   a transmitter that transmits the OFDM signal to the mobile station,
   wherein the frequency selector changes carrier mapping for data retransmission from carrier mapping for a last transmission, and
   the control-signal generator generates the control signal once in n frames, where "n" is an integer equal to or greater than two, for new data transmission and generates the control signal each time for data retransmission.

2. An interference avoidance method in a base station that transmits an OFDM signal to a mobile station, using some carrier frequencies of a frequency band shared with another system, the method comprising:
   selecting an unused frequency band not used by the other system in the frequency band, based on an interference level of the frequency band, selecting a carrier frequency for systematic-bit mapping from among carrier frequencies having the interference level lower than a threshold and selecting a carrier frequency for parity-bit mapping from among carrier frequencies other than the carrier frequency for systematic-bit mapping in carrier frequencies of the unused frequency band;
   performing turbo coding processing on transmission data and outputting a systematic bit and a parity bit;
   mapping the systematic bit to the carrier frequency for systematic-bit mapping and mapping the parity bit to the carrier frequency for parity-bit mapping;
   generating a control signal containing frequency information indicating the carrier frequency for systematic-bit mapping and the carrier frequency for parity-bit mapping;
   generating the OFDM signal by performing orthogonal frequency division multiplexing processing on the systematic bit and the parity bit mapped to the carrier frequencies, and the control signal; and
   transmitting the OFDM signal to the mobile station,
   wherein carrier mapping is changed for data retransmission from carrier mapping for a last transmission, and
   the control signal is generated once in n frames, where "n" is an integer equal to or greater than two, for new data transmission and generates the control signal each time for data retransmission.

3. A communication system that transmits an OFDM signal from a base station to a mobile station, using some carrier frequencies of a frequency band shared with another system, wherein the base station comprises: a frequency selector that selects an unused frequency band not used by the other system in the frequency band, based on an interference level of the frequency band, selects a carrier frequency for systematic-bit mapping from among carrier frequencies each having the interference level lower than a threshold and selects a carrier frequency for parity-bit mapping from among carrier frequencies other than the carrier frequency for systematic-bit mapping in carrier frequencies of the unused frequency band; a turbo coder that performs turbo coding processing on transmission data and outputs a systematic bit and a parity bit; a carrier-mapper that maps the systematic bit to the carrier frequency for systematic-bit mapping and maps the parity bit to the carrier frequency for parity-bit mapping; a control-signal generator that generates a control signal containing frequency information indicating the carrier frequency for systematic-bit mapping and the carrier frequency for parity-bit mapping; and an orthogonal frequency division multiplexer that generates the OFDM signal by performing orthogonal frequency division multiplexing processing on the systematic bit and the parity bit mapped to the carrier frequencies, and on the control signal; and a transmitter that transmits the OFDM signal to the mobile station; wherein the frequency selector changes carrier mapping for data retransmission from carrier mapping for a last transmission, and the control-signal generator generates the control signal once in n frames, where "n" is an integer equal to or greater than two, for new data transmission and generates the control signal each time for data retransmission.

* * * * *